US009763223B2

(12) United States Patent
Patil et al.

(10) Patent No.: US 9,763,223 B2
(45) Date of Patent: Sep. 12, 2017

(54) COMMUNICATION BETWEEN DEVICES OF A NEIGHBOR AWARE NETWORK

(71) Applicant: QUALCOMM Incorporated, San Diego, CA (US)

(72) Inventors: Abhishek Pramod Patil, San Diego, CA (US); Santosh Paul Abraham, San Diego, CA (US); George Cherian, San Diego, CA (US); Alireza Raissinia, Monte Sereno, CA (US); James Cho, Mountain View, CA (US); Guido Frederiks, Watsonville, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 14/883,523

(22) Filed: Oct. 14, 2015

(65) Prior Publication Data
US 2016/0112987 A1  Apr. 21, 2016

Related U.S. Application Data

(60) Provisional application No. 62/064,904, filed on Oct. 16, 2014, provisional application No. 62/109,530, (Continued)

(51) Int. Cl.
*H04B 7/00* (2006.01)
*H04W 68/02* (2009.01)
(Continued)

(52) U.S. Cl.
CPC ......... *H04W 68/02* (2013.01); *H04W 4/008* (2013.01); *H04W 8/005* (2013.01); *H04W 48/12* (2013.01);
(Continued)

(58) Field of Classification Search
CPC ... H04W 84/18; H04W 4/008; H04W 68/005; H04W 8/005; H04W 48/16;
(Continued)

(56) References Cited

U.S. PATENT DOCUMENTS 7,573,841 B2   8/2009 Lee et al.
8,195,152 B1   6/2012 Edwards
(Continued)

FOREIGN PATENT DOCUMENTS

WO    2014035603 A1    3/2014

OTHER PUBLICATIONS

International Search Report and Written Opinion for International Application No. PCT/US2015/055820, ISA/EPO, dated Jan. 21, 2016, 11 pgs.

*Primary Examiner* — Shaima Q Aminzay
(74) *Attorney, Agent, or Firm* — Toler Law Group, PC.

(57) ABSTRACT

A method includes generating a paging message at a first device of a data link group of a neighbor aware network (NAN). The paging message includes a paged device list. The paged device list identifies a subset of devices of the data link group, the subset of devices scheduled to receive data from the first device during a transmission window. The paging message includes a receiver address field having a particular receiver address value. The method also includes transmitting, during the paging window, the paging message from to at least one device of the data link group other than the first device.

30 Claims, 25 Drawing Sheets

Related U.S. Application Data filed on Jan. 29, 2015, provisional application No. 62/205,472, filed on Aug. 14, 2015.

(51) Int. Cl.

| | | |
|---|---|---|
| *H04W 4/00* | (2009.01) | |
| *H04W 8/00* | (2009.01) | |
| *H04W 76/02* | (2009.01) | |
| *H04W 48/12* | (2009.01) | |
| *H04W 84/18* | (2009.01) | |
| *H04L 12/801* | (2013.01) | |
| *H04W 84/12* | (2009.01) | |

(52) U.S. Cl.
CPC ........... *H04W 76/023* (2013.01); *H04L 47/12* (2013.01); *H04W 84/12* (2013.01); *H04W 84/18* (2013.01)

(58) Field of Classification Search
CPC . H04W 52/0216; H04W 68/02; H04W 84/12; H04W 4/06; H04W 72/0446; H04W 72/12; H04W 74/06; H04W 28/18
USPC .... 455/515, 41.2, 432.1, 458, 466; 370/235, 370/252, 254, 324, 329, 336, 338
See application file for complete search history.

(56) References Cited

U.S. PATENT DOCUMENTS

| | | | |
|---|---|---|---|
| 8,274,894 | B2 | 9/2012 | Kneckt et al. |
| 8,326,332 | B2 | 12/2012 | Collins et al. |
| 2005/0036475 | A1 | 2/2005 | Nishiyama et al. |
| 2005/0089001 | A1 | 4/2005 | Nishikawa |
| 2007/0141988 | A1 | 6/2007 | Kuehnel et al. |
| 2009/0049168 | A1 | 2/2009 | Galvin et al. |
| 2009/0210729 | A1 | 8/2009 | Adams et al. |
| 2010/0254290 | A1 | 10/2010 | Gong et al. |
| 2012/0083264 | A1 | 4/2012 | Ramasamy et al. |
| 2012/0157153 | A1 | 6/2012 | Song |
| 2014/0003636 | A1 | 1/2014 | Bodvarsson et al. |
| 2014/0082205 | A1 | 3/2014 | Abraham et al. |
| 2014/0120962 | A1 | 5/2014 | Merlin et al. |
| 2014/0146678 | A1 | 5/2014 | Merlin et al. |
| 2014/0169247 | A1 | 6/2014 | Jafarian et al. |
| 2014/0198724 | A1* | 7/2014 | Abraham ................ H04L 67/16 370/328 |
| 2014/0254426 | A1 | 9/2014 | Abraham et al. |
| 2014/0254569 | A1 | 9/2014 | Abraham et al. |
| 2014/0269555 | A1* | 9/2014 | Sadasivam ........ H04W 72/0406 370/329 |
| 2014/0357192 | A1 | 12/2014 | Azogui et al. |
| 2014/0376519 | A1* | 12/2014 | Yang ................ H04W 74/0816 370/336 |
| 2015/0139052 | A1 | 5/2015 | Maizlish et al. |
| 2015/0341811 | A1 | 11/2015 | Deshpande et al. |
| 2015/0365818 | A1 | 12/2015 | Mese et al. |
| 2016/0021495 | A1 | 1/2016 | Segev et al. |
| 2016/0057807 | A1 | 2/2016 | Tirronen et al. |
| 2016/0112984 | A1 | 4/2016 | Patil et al. |
| 2016/0112986 | A1 | 4/2016 | Patil et al. |
| 2016/0119894 | A1 | 4/2016 | Patil et al. |

* cited by examiner

| NDL Index | Channel No. | Offset (x 16TUs) from DW |
|---|---|---|
| 0 | 6 | 1 |
| 1 | 6 | 1, 8, 16, 24 |
| 2 | 36 | 2 |
| 3 | 36 | 2, 18 |
| 4 | 36 | 2, 10, 18, 26 |
| 5 | 52 | 2, 18 |
| 6 | 52 | 2, 10, 18, 26 |
| 7 | 100 | 2, 18 |
| 8 | 100 | 2, 10, 18, 26 |
| 9 | 116 | 2, 18 |
| 10 | 116 | 2, 10, 18, 26 |
| 11 | 132 | 2, 18 |
| 12 | 149 | 9 |
| 13 | 149 | 9, 25 |
| 14 | 149 | 1, 9, 17, 25 |

FIG. 2

| Field | Size (octets) | Description |
|---|---|---|
| Attribute ID | 1 | Identifies the type of NAN attribute |
| Length | 2 | Length of the following fields in the attribute |
| Data Link Group ID | 6 | Data link group (e.g., NDL) identifier |
| Page Control | 1 | Indicates which fields are present in the attribute |
| Paged Device List (e.g., traffic indicator) | Variable | List of devices being paged |
| Traffic Type Indicator (e.g., QoS Type) | 1 | Indicates the type (e.g., the QoS category) of traffic scheduled for transmission |

Page Attribute 1200

| Paged Device List (e.g., Traffic Indicator) | Traffic Type Indicator Present | Reserved |
|---|---|---|
| 3 | 1 | 4 |

Bits

Page Control Field 1208

| Field | Size (octets) | Description |
|---|---|---|
| Attribute ID | 1 | Identifies the type of NAN attribute |
| Length | 2 | Length of the following fields in the attribute |
| Data Link Group ID | 6 | Data link group (e.g., NDL) identifier |
| Paged Device List (e.g., traffic indicator) | Variable | Type Length Value (TLV) carrying a traffic announcement for multiple recipients. A "type" field indicates the type of the paged device list (e.g., a TIM, a Bloom filter, or a list of MAC addresses), the "length" field indicates the length of the "value" field that carries the paged device list |

Traffic Announcement Attribute 1230

*FIG. 12*

COMMUNICATION BETWEEN DEVICES OF A NEIGHBOR AWARE NETWORK

I. CROSS REFERENCE TO RELATED APPLICATIONS

This application claims priority from U.S. Provisional Patent Application No. 62/064,904, filed Oct. 16, 2014 and entitled "COMMUNICATION BETWEEN DEVICES OF A DATA PATH GROUP OF A NEIGHBOR AWARE NETWORK", U.S. Provisional Patent Application No. 62/109,530, filed Jan. 29, 2015 and entitled "COMMUNICATION BETWEEN DEVICES OF A NEIGHBOR AWARE NETWORK", and U.S. Provisional Patent Application No. 62/205,472, filed Aug. 14, 2015 and entitled "COMMUNICATION BETWEEN DEVICES OF A NEIGHBOR AWARE NETWORK"; the contents of each of the aforementioned applications are expressly incorporated herein by reference in their entirety.

II. FIELD

The present disclosure is generally related to communications between devices of a neighbor aware network (NAN).

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Electronic devices, such as wireless telephones, may use wireless connections to access networks in order to transmit and receive data or to exchange information. For example, mobile electronic devices that are in close proximity to each other may form an infrastructure-less, peer-to-peer wireless network, such as a mesh network, to perform data exchanges via the wireless network. The data exchanges are performed without involving wireless carriers, Wi-Fi access points, and/or the Internet. To enable functionality of the wireless network, a particular wireless channel may be reserved for transferring data between electronic devices of the wireless network. For example, a first electronic device of the wireless network may share a service, such as a music service, with other electronic devices in the wireless network. As an example, the first electronic device may transmit music data to a second electronic device in the wireless network. Messaging traffic, such as a polling message, associated with the first electronic device determining whether the second electronic device is available to receive the music data, may consume network bandwidth. Further, messaging traffic, such as an acknowledgment message, associated with the second electronic device providing an indication of availability to receive the music data, may consume network bandwidth.

IV. SUMMARY

The present disclosure is directed to systems and methods to provide an indication of availability for communication in a neighbor aware network (NAN). For example, during an association phase of communication of the NAN that includes an exchange of device capability information, a device may provide availability information for subsequent communication(s) in the NAN. Alternatively, a device may provide availability information for subsequent communication(s) in the NAN during a NAN discovery window. In this case, device(s) may not exchange device capability information during the association phase. Further, device(s) may use the availability information received during the NAN discovery window to determine whether to associate with the particular NAN. In some cases, messaging traffic may be reduced in the NAN based on the availability information. For example, messaging traffic may be reduced during paging windows and/or data windows.

As an illustrative example, during an association phase of communication of the NAN (or during a NAN discovery window), a first device may receive availability information from a second device that provides an indication that the second device is available to communicate during a subsequent data window of a data link group of the NAN. The first device may be referred to as a provider device and the second device may be referred to as a subscriber device. Responsive to receiving the availability information, when the first device sends a paging message (during a paging window) that includes a traffic indication message (also referred to as a traffic indicator, which may include a traffic indication map (TIM)) identifying the second device as a recipient of data, the first device may send data to the second device during a data window without waiting to receive an indication that the second device is available or without determining (e.g., via mechanisms such as PS-POLL) the availability of the second device, based on the availability information indicating availability of the second device during the data window. In this example, polling message traffic and ACK message traffic in the NAN may be reduced. Further, if a device indicates, via the capabilities exchange during the association phase, that the device is "always" available, a transmitter may refrain from sending a PS-POLL message for each data frame. Rather, the data frames may be aggregated, for each Aggregated Mac Protocol Data Unit (A-MPDU). In some systems, the transmitter determines a receiver's availability before sending each data frame (i.e., not just for the first frame). In such systems, the transmitter sends a PS-POLL message, and the receiver sends an ACK to the transmitter before transmitter sends the MPDU. In the present disclosure, if the receiver indicates (during the association phase of the NAN) that the receiver is available during a data window of a data link group of the NAN, such a PS-POLL/ACK scheme may be eliminated.

As another illustrative example, during an association phase of communication of the NAN (or during a NAN discovery window), a first device may send availability information to a second device that provides an indication that the first device is available to communicate during subsequent data windows of a data link group of the NAN. The first device may be referred to as a subscriber device and the second device may be referred to as a provider device.

The first device may receive a paging message from the second device that includes a TIM identifying the first device as a recipient of data. The first device may receive data from the second device during the data window without responding to the paging message. In this example, polling message traffic and ACK message traffic in the NAN may be reduced.

The present disclosure is also directed to systems and methods to enable electronic devices in a data link group of a neighbor aware network (NAN) to provide an indication of availability or unavailability for "future" channels. Future channels may refer to logical channels that are subsequent to a first logical channel in an index of logical channels, as further described herein. In some cases, an indication of availability may allow a provider device to refrain from providing traffic announcements during particular time periods. Instead of providing future traffic announcements, the provider device may perform data transmission. In other cases, an indication of unavailability may allow a subscriber device to refrain from monitoring subsequent logical channels. Instead of monitoring subsequent logical channels, the subscriber device may transition to a low-power operating mode, such as a sleep mode, or perform operation(s) associated with other data link group(s).

The present disclosure is further directed to systems and methods to enable electronic devices in a data link group of a NAN to perform data transmission during a paging window portion of a transmission window. For example, in some cases, one or more contention window parameters may be adjusted such that priority is given to paging messages during the paging window portion of the transmission window. In such cases, transmission of paging messages may finish before a paging window boundary (PWB). As such, data transmission may begin before the PWB as well as during a data transmission portion of the transmission window. In other cases, a transmission window may include a trigger window portion that separates the transmission window into a paging window portion and a data transmission portion. One or more contention window parameters may be adjusted such that acknowledgments, such as trigger messages, are given higher priority than a data transmission. In some cases, a provider device may receive acknowledgments (ACKs) from each of one or more subscriber devices before a trigger window boundary (TrWB). As such, a provider device may begin data transmission before the TrWB as well as during the data transmission portion of the transmission window.

The present disclosure is further related to systems, apparatus, and methods to enable devices in a data link group of a NAN to send a paging message to indicate upcoming scheduled traffic. The paging message includes a particular receiver address. Devices of the data link group may identify a message that includes the particular receiver address value as a paging message. To illustrate, a first device may have traffic scheduled for transmission to a subset of devices of the data link group, and the first device may transmit a paging message to at least one other device of the data link group. The paging message may include multiple fields including a receiver address field that has a particular value. The particular value may be a value that is stored at a memory of a device during production or a value that corresponds to the NAN or to the data link group, such as a NAN cluster identifier (ID) or a data link group ID. Devices that receive a message may initially process the receiver address field (and not other portions) of the message to determine whether the received message is a paging message. Because paging messages have a particular value for the receiver address field, devices that receive messages may quickly and reliably determine whether a message is a paging message by processing the portion of the message that contains the receiver address field without processing the rest of the message (or the rest of a header of the message).

If the receiver address field of a received message matches the particular value, one or more devices determine that the received message is a paging message. In response to receiving the paging message, the one or more devices may transmit an acknowledgment (ACK) to the first device. The one or more devices may transmit the ACK to the first device prior to determining whether the respective device is included in the subset of devices indicated by the paging message. In some implementations, devices that are not part of the data link group may transmit the ACK based on identifying the particular value of the receiver address field. Because any device that is capable of recognizing the particular value of the receiver address may transmit the ACK, a likelihood that the first device receives the ACK is increased. In response to receiving at least one ACK, the first device determines that the paging message has been transmitted without issue.

After processing the portion of the paging message including the receiver address field, if the receiver address field has the particular value, a second device may continue to process the paging message to determine if the second device is included in the subset of devices. The subset of devices may be indicated by a paged device list (e.g., a representation of paged devices) included in the paging message. If the second device is included in the subset of devices, the second device may send a trigger frame to the first device. The trigger frame may include a quality of service null (QoS_NULL) frame or a power save poll (PS_POLL) frame formed in accordance with a wireless communication standard, such as an Institute of Electrical and Electronics Engineers (IEEE) 802.11 standard. The trigger frame indicates that the second device is scheduled to be in an active operating mode during an upcoming transmission window corresponding to the paging message. In response to receiving the trigger frame, the first device may transmit a portion of the data to the second device during the transmission window. In some implementations, contention mitigation techniques may be performed by devices of the data link group to reduce collision between ACKs and trigger frames. Additionally, in some implementations, the paging message includes additional information. For example, a paged device list control field in the paging message may include a traffic type indicator that identifies a type (e.g., a quality of service (QoS) type) of the data. As another example, the paging message may include a page control field that indicates a type of the paged device list. To illustrate, the paged device list may include a traffic indication map (TIM), a Bloom filter, or a list of media access control (MAC) addresses.

As referred to herein, a data link group refers to one or more electronic devices that share a time period, such as a paging window, corresponding to an active operating mode of the electronic devices and that have common security credentials. For example, a data link group may form a wireless mesh network (e.g., a "social wireless fidelity (wi-fi) mesh"). As another example, the data link group may form an infrastructure-less peer-to-peer (p2p) network. The data link group may include each of the electronic devices in the NAN or may include a subset of the electronic devices in the NAN.

As referred to herein, a logical channel refers to a particular communication channel and one or more time periods during which the electronic devices of the data link group may communicate regarding a particular service. The time period(s) may include one or more transmission windows. Each transmission window may include a portion of time, referred to as a paging window, during which a first electronic device of the data link group may send a paging message via the particular communication channel to one or more other electronic devices of the data link group indicating that the first electronic device has data to be sent. A remaining portion of the transmission window may be used to exchange the data and may be referred to as a data transmission window.

The data link group may be formed in response to a provider device of the NAN sending a message, such as a service advertisement or an announcement message, to electronic devices of the NAN during a discovery window. The message may indicate that the provider device is available to communicate via a plurality of logical channels. For example, a service advertisement may indicate that the particular service is available via the plurality of logical channels. As referred to herein, a discovery window refers to a time period corresponding to an active operating mode of the electronic devices of the NAN. During the discovery window, the electronic devices of the NAN may listen to (e.g., monitor) a particular wireless channel referred to as a NAN communication channel for service advertisements. A subscriber device of the NAN may respond to a service advertisement by sending a subscribe message to the provider device.

A particular data link group may correspond to a particular logical channel. For example, the particular data link group may include the provider device and one or more subscriber devices that sent a subscribe message indicating the particular logical channel. Electronic devices of a particular data link group may monitor a communication channel of a corresponding logical channel during at least a portion of one or more paging windows associated with the logical channel.

Each electronic device in the NAN may synchronize an internal clock based on synchronization beacons received from at least one electronic device of the NAN. Because the internal clock of each electronic device in the data link group is synchronized, each electronic device may determine a common time period, such as the discovery window, to transition to an active operating mode and monitor the NAN communication channel for a service advertisement. Each electronic device of a data link group may determine a common time period, such as a paging window, to transition to the active operating mode and monitor a particular communication channel corresponding to a particular logical channel for a paging message. In a particular implementation, the data link group may be a "multi-hop" data link group, and the paging message may be transmitted from a first electronic device of the data link group to other electronic devices of the data link group during the paging window. In another particular implementation, the data link group may be a "single-hop" data link group, and the paging message may be transmitted via the particular logical channel by a provider device to one or more devices of the data link group.

In a particular aspect, a method of communication includes receiving, at a first device, availability information from a second device during a connection set-up phase of communication of a neighbor aware network (NAN) or during a NAN discovery window. The connection set-up phase includes an exchange of device capability information. The method also includes, based on the availability information indicating availability of the second device during the transmission window, sending data from the first device to the second device during a transmission window without performing a message exchange to determine an availability of the second device.

In another aspect, an apparatus includes a processor and a memory coupled to the processor. The memory stores instructions that are executable by the processor to perform various operations. The operations include receiving availability information from a device during a connection set-up phase of communication of a neighbor aware network (NAN) or during a NAN discovery window. The connection set-up phase includes an exchange of device capability information. The operations also include, based on the availability information indicating availability of the device during the transmission window, sending data to the device during a transmission window without performing a message exchange to determine an availability of the device.

In another aspect, a non-transitory computer-readable medium stores instructions that are executable by a processor to perform various operations. The operations may include receiving availability information from a device during a connection set-up phase of communication of a neighbor aware network (NAN) or during a NAN discovery window. The connection set-up phase includes an exchange of device capability information. The operations further include, based on the availability information indicating availability of the device during the transmission window, sending data to the device during a transmission window without performing a message exchange to determine an availability of the device.

In another aspect, an apparatus includes means for receiving availability information from a device during a connection set-up phase of communication of a neighbor aware network (NAN) or during a NAN discovery window. The connection set-up phase includes an exchange of device capability information. The apparatus further includes means for sending data to the device during a transmission window without performing a message exchange to determine an availability of the second device based on the availability information indicating availability of the device during the transmission window.

In another aspect, a method of communication includes sending availability information from a first device to a second device during a connection set-up phase of communication of a NAN or during a NAN discovery window. The connection set-up phase includes an exchange of device capability information, and the availability information indicates an availability of the first device during a transmission window. The method further includes, based on the availability information indicating availability of the first device during the transmission window, receiving, at the first device, data from the second device during the transmission window without performing a message exchange to provide an indication of availability to the second device.

In another aspect, a device includes a processor and a memory coupled to the processor. The memory stores instructions that are executable by the processor to perform various operations. The operations include sending availability information to a second device during a connection set-up phase of communication of a NAN or during a NAN discovery window. The connection set-up phase includes an exchange of device capability information, and the availability information indicates an availability of the device during a transmission window. The operations also include, based on the availability information indicating availability of the device during the transmission window, receiving data from the second device during the transmission window without performing a message exchange to provide an indication of availability to the second device.

In another aspect, a non-transitory computer-readable medium stores instructions that are executable by a processor to perform various operations. The operations may include sending availability information from a first device to a second device during a connection set-up phase of communication of a NAN or during a NAN discovery window. The connection set-up phase includes an exchange of device capability information, and the availability information indicates an availability of the first device during a transmission window. The operations also include, based on the availability information indicating availability of the device during the transmission window, receiving data from the second device during the transmission window without performing a message exchange to provide an indication of availability to the second device.

In a further aspect, a device includes means for sending availability information to a second device during a connection set-up phase of communication of a NAN or during a NAN discovery window. The connection set-up phase includes an exchange of device capability information, and the availability information indicates an availability of the device during a transmission window. The device further includes means for receiving data from the second device during the transmission window without performing a message exchange to provide an indication of availability to the second device based on the availability information indicating availability of the device during the transmission window.

In another aspect, a method of communication includes generating a paging message at a first device of a data link group of a neighbor aware network (NAN). The paging message includes a paged device list. The paged device list identifies a subset of devices of the data link group. The subset of devices is scheduled to receive data from the first device during a transmission window. The paging message includes a particular receiver address value. The method further includes transmitting, during a paging window, the paging message to at least one device of the data link group other than the first device.

In another aspect, an apparatus includes a processor and a memory coupled to the processor. The memory stores instructions that are executable by the processor to perform operations including generating a paging message. The paging message includes a paged device list. The paged device list identifies a subset of devices of a data link group of a neighbor aware network (NAN). The subset of devices is scheduled to receive data during a transmission window. The paging message includes a particular receiver address value. The operations further include initiating transmission, during a paging window, of the paging message to at least one device of the data link group.

In another aspect, an apparatus includes means for generating a paging message at a first device of a data link group of a neighbor aware network (NAN). The paging message includes a paged device list. The paged device list identifies a subset of devices of the data link group. The subset of devices is scheduled to receive data from the first device during a transmission window. The paging message includes a particular receiver address value. The apparatus further includes means for transmitting, during a paging window, the paging message to devices other than the first device.

In another aspect, a non-transitory computer-readable medium stores instructions that, when executed by a processor, cause the processor to generate a paging message at a first device of a data link group of a neighbor aware network (NAN). The paging message includes a paged device list. The paged device list identifies a subset of devices of the data link group. The subset of devices is scheduled to receive data from the first device during a transmission window. The paging message includes a particular receiver address value. The instructions further cause the processor to initiate transmission, during a paging window, of the paging message to devices other than the first device.

In another aspect, a method of communication includes monitoring, at a first device of a data link group of a neighbor aware network (NAN), a wireless network during a paging window. The method further includes receiving, at the first device, a paging message from a second device of the data link group during the paging window. The paging message includes a paged device list. The paged device list identifies a subset of devices of the data link group. The subset of devices is scheduled to receive data from the second device during a transmission window. The paging message includes a particular receiver address value.

In another aspect, an apparatus includes a processor and a memory coupled to the processor. The memory stores instructions that are executable by the processor to perform operations including monitoring a wireless network during a paging window. The operations further include receiving a paging message from a second device of a data link group of a neighbor aware network (NAN) during the paging window. The paging message includes a paged device list. The paged device list identifies a subset of devices of the data link group. The subset of devices is scheduled to receive data from the second device during a transmission window. The paging message includes a particular receiver address value.

In another aspect, an apparatus includes means for monitoring, at a first device of a data link group of a neighbor aware network (NAN), a wireless network during a paging window. The apparatus further includes means for receiving, at the first device, a paging message from a second device of the data link group during the paging window. The paging message includes a paged device list. The paged device list identifies a subset of devices of the data link group. The subset of devices is scheduled to receive data from the second device during a transmission window. The paging message includes a particular receiver address value.

In another aspect, a non-transitory computer-readable medium stores instructions that, when executed by a processor, cause the processor to monitor, at a first device of a data link group of a neighbor aware network (NAN), a wireless network during a paging window. The instructions further cause the processor to receive, at the first device, a paging message from a second device of the data link group during the paging window. The paging message includes a paged device list. The paged device list identifies a subset of devices of the data link group. The subset of devices is scheduled to receive data from the second device during a transmission window. The paging message includes a particular receiver address value.

In another aspect, a method of communication includes generating, at a first device, a message including an indication of whether the first device is available during a particular time period during which devices of a data link group of a neighbor aware network (NAN) are configured to operate in an active operating mode. As non-limiting examples, the particular time period may include a paging window of the data link group or a discovery window of the NAN. The method also includes sending the message from the first device to one or more devices of the data link group.

In another aspect, an apparatus includes a processor and a memory coupled to the processor. The memory stores instructions that are executable by the processor to perform operations including generating, at a first device, a message including an indication of whether the first device is available during a particular time period during which devices of a data link group of a neighbor aware network (NAN) are configured to operate in an active operating mode. The operations also include initiating transmission of the message from the first device to one or more devices of the data link group.

In another aspect, a method of communication includes receiving, at a second device of a data link group of a neighbor aware network (NAN), a message including an indication of whether a first device corresponding to a particular service is available during a particular time period corresponding to the data link group or corresponding to the NAN. The method also includes transitioning to a low-power operating mode during one or more transmission windows corresponding to the particular time period in response to determining that the first device is unavailable during the particular time period.

In another aspect, an apparatus includes a processor and a memory coupled to the processor. The memory stores instructions that are executable by the processor to perform operations including receiving, at a second device of a data link group of a neighbor aware network (NAN), a message including an indication of whether a first device corresponding to a particular service is available during a particular time period corresponding to the data link group or corresponding to the NAN. The operations also include transitioning to a low-power operating mode during one or more transmission windows corresponding to the particular time period in response to determining that the first device is unavailable during the particular time period.

In another aspect, a method of communication includes generating, at a provider device, an indication of unavailability for a number of logical channels (e.g., next N logical channels referenced in an index of logical channels) associated with a data link group of a neighbor aware network (NAN). The method further includes sending the paging message from the provider device to one or more subscriber devices of a data link group of the NAN during a paging window portion of a transmission window.

In another aspect, a method of communication includes receiving, at a subscriber device of a data link group of a NAN, a paging message that includes an indication of unavailability of a provider device associated with a particular service for a number of logical channels (e.g., next N logical channels referenced in an index of logical channels) associated with the data link group. In some cases, the method also includes transitioning to a low-power operating mode during one or more transmission windows associated with the next N logical channels. In other cases, the method includes performing one or more operations associated with another provider device associated with another service during one or more transmission windows associated with the next N logical channels. To illustrate, the provider device that provides the indication of unavailability may provide a first service (e.g., a music service), and the subscriber device may subscribe to a second service (e.g., a gaming service) of another provider device. In this example, the subscriber device may perform one or more operations associated with the gaming service during the unavailability of the provider device of the first service.

In another aspect, a method of communication includes generating, at a first device, a paging message. The method further includes sending the paging message from the first device to one or more devices of a data link group of a neighbor aware network (NAN). The method also includes, in response to detecting, at the first device, one or more acknowledgments from each of the one or more devices, refraining from sending traffic announcements in paging windows corresponding to a particular time period and sending data traffic prior to a beginning portion of a data window corresponding to the particular time period.

In a further aspect, a method of communication includes monitoring, at a second device of a data link group of a neighbor aware network (NAN), a particular communication channel corresponding to the data link group during a first time period. The method includes receiving, at the second device, a paging message from a first device corresponding to a particular service. The method includes sending an acknowledgment from the second device to the first device. The method includes monitoring, at the second device, a first logical channel identified by an index of logical channels corresponding to the data link group. The method further includes receiving data traffic at the second device prior to a beginning portion of a data window corresponding to the next logical channel.

In another aspect, a method of communication includes generating, at a provider device, a paging message during a paging window portion of a transmission window. The method includes sending the paging message from the provider device to one or more subscriber devices of a data link group of a neighbor aware network (NAN). The method further includes determining, at the provider device, whether one or more acknowledgments have been received from each of the one or more subscriber devices during a trigger window portion of the transmission window that follows the paging window portion of the transmission window. In response to determining that the one or more acknowledgments have been received, the method includes sending data traffic during at least a portion of the trigger window portion of the transmission window.

In a further aspect, a method of communication includes monitoring, at a subscriber device of a data link group of a neighbor aware network (NAN), a particular logical channel of a plurality of logical channels associated with the data link group. The method includes receiving, at the subscriber device, a paging message from a provider device associated with a particular service. The paging message is received during a paging window portion of a transmission window associated with the particular logical channel. The method also includes sending an acknowledgment from the subscriber device to the provider device during a trigger window portion of the transmission window that follows the paging window portion. The method further includes receiving, at the subscriber device, data traffic from the provider device during the trigger window portion of the transmission window and during a data traffic portion of the transmission window that follows the trigger window portion.

One advantage of the present disclosure is a reduction in message traffic during a transmission window of the NAN based on the availability information that is provided during the association phase of communication of the NAN. A provider device may refrain from performing a message exchange to determine an availability of a subscriber device when the subscriber device has provided an indication (during the association phase) of availability during a data window, resulting in a reduction of message traffic. The reduction of message traffic may include a reduction of polling messages, responses to polling messages, trigger frames, or a combination thereof. Further, a subscriber device may refrain from performing a message exchange to provide an indication of availability to a provider device in response to receiving a paging message that includes a traffic indicator that identifies the subscriber device as scheduled to receive data (e.g., as an intended recipient of data), resulting in a reduction of message traffic. Another advantage is exchange of paging messages with a reduced processing burden on receiving devices. For example, because a device that receives a message processes a portion of the message (the portion that includes the receiver address) instead of a larger portion (or entirety) of the message to determine whether the message is a paging message, power consumption and processing capability used by the device may be reduced. To illustrate, if the receiver address field of a NAN-related message does not have the particular value, a device that receives the message may discard the message without further processing.

Other aspects, advantages, and features of the present disclosure will become apparent after a review of the entire application, including the following sections: Brief Description of the Drawings, Detailed Description, and the Claims.

V. BRIEF DESCRIPTION OF THE DRAWINGS

FIG. 2 is a table illustrating an example of logical channels;

FIG. 12 is a diagram of a second illustrative page attribute including a PDL and an illustrative traffic announcement attribute including a PDL;

VI. DETAILED DESCRIPTION

Particular aspects of the present disclosure are described below with reference to the drawings. In the description, common features are designated by common reference numbers throughout the drawings.

Figure 1:
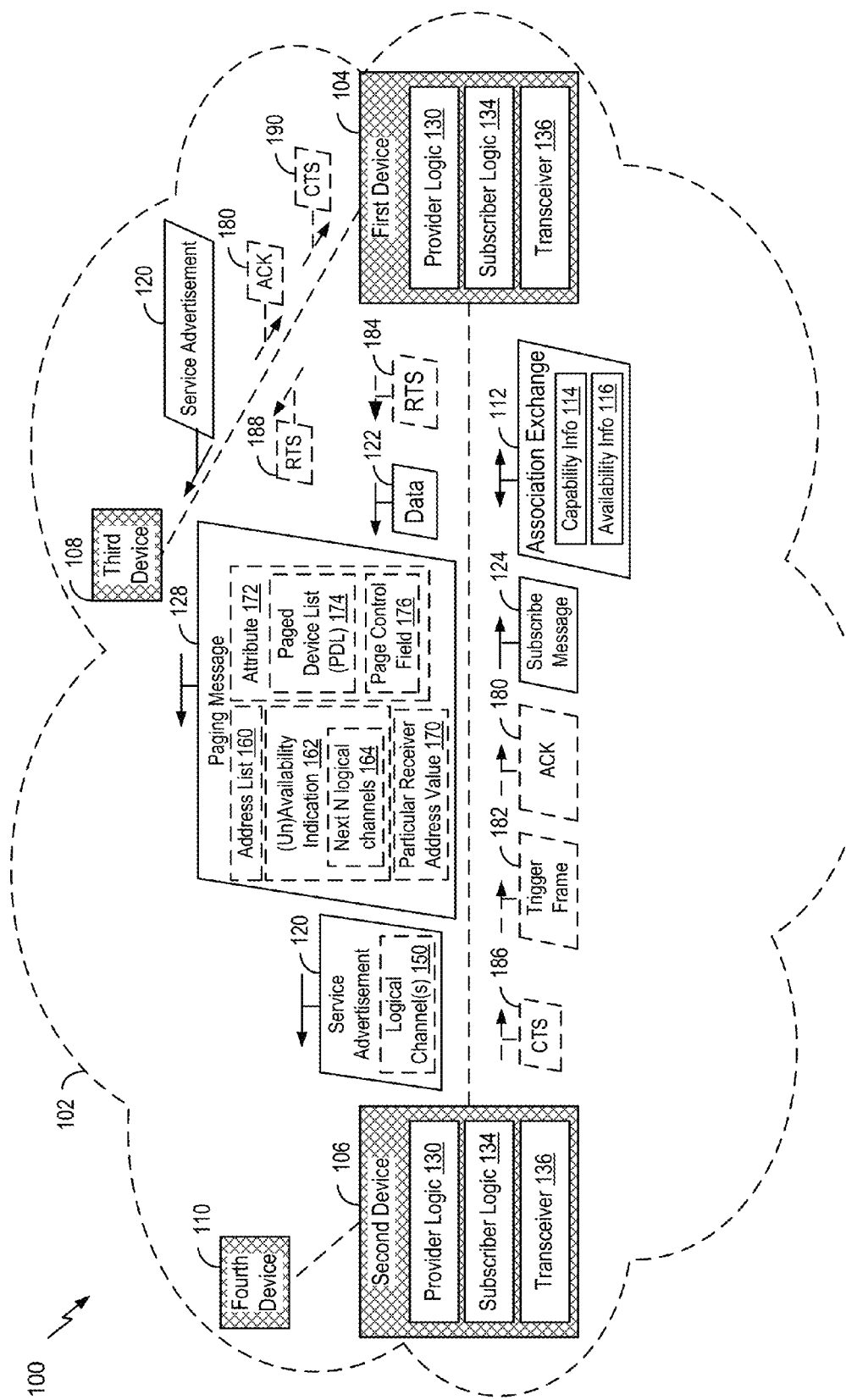
FIG. 1 is a diagram of a particular aspect of a system that includes a neighbor aware network (NAN) that includes one or more devices included in data link groups corresponding to one or more logical channels.

Referring to FIG. 1, a particular aspect of a system 100 that includes a neighbor aware network (NAN) 102 is shown. The NAN 102 includes one or more devices 104, 106, 108, 110 (e.g., electronic devices) configured to perform data exchanges via wireless communications between the devices 104, 106, 108, 110. The data exchanges may be performed without involving wireless carriers, Wi-Fi access points, and/or the Internet. For example, the NAN 102 may include a first device 104, a second device 106, a third device 108, and a fourth device 110.

The system 100 is illustrated for convenience only and the particular illustrated details are not limiting. For example, in other implementations, the system 100 may include more devices or fewer devices than illustrated in FIG. 1, and the devices may be located at different locations than illustrated in FIG. 1. The devices 104, 106, 108, and/or 110 may include provider logic 130, subscriber logic 134, a transceiver 136, or a combination thereof.

Each of the devices 104, 106, 108, and/or 110 may be a fixed location device or a mobile device. For example, the devices 104, 106, 108, and/or 110 may include or correspond to mobile phones, laptop computers, tablet computers, personal computers, computerized watches, multimedia devices, peripheral devices, data storage devices, or a combination thereof. Additionally or alternatively, the devices 104, 106, 108, and/or 110 may include a processor (e.g., a central processing unit (CPU), a digital signal processor (DSP), a network processing unit (NPU), etc.), a memory (e.g., a random access memory (RAM), a read-only memory (ROM), etc.), and a wireless interface configured to send and receive data via one or more wireless networks, such as one or more wireless communication channels, as further described with reference to FIG. 25. The wireless interface may communicate with the transceiver 136 (e.g., a wireless receiver and a wireless transmitter). Although certain operations described herein may be described with reference to a "transceiver," in other implementations a "receiver" may perform data receiving operations and a "transmitter" may perform data transmitting operations.

The devices 104, 106, 108, 110 may exchange data and/or services via one or more wireless networks. As used herein, a transmission "via" a wireless network may include, but is not limited to, a "point-to-point" transmission between two devices of the wireless network. As another example, a transmission via the wireless network may include a communication that is "broadcast" (e.g., transmitted) from a particular device of the wireless network to multiple other devices of the wireless network. As used herein, the devices 104, 106, 108, 110 may be configured to operate in accordance with one or more wireless protocols and/or standards, such as an Institute of Electrical and Electronics Engineers (IEEE) 802.11 standard. For example, the devices 104, 106, 108, and/or 110 may operate in accordance with an IEEE 802.11a, b, g, n, s, aa, ac, ad, ae, af, ah, ai, aj, aq, ax, or mc standard. Additionally, the devices 104, 106, 108, and/or 110 may operate in accordance with one or more NAN standards or protocols.

Additionally, one or more of the devices 104, 106, 108, and 110 may be configured to communicate with a cellular network via one or more cellular communication protocols and/or standards, such as a code division multiple access (CDMA) protocol, an orthogonal frequency division multiplexing (OFDM) protocol, an orthogonal frequency division multiple access (OFDMA) protocol, a time division multiple access (TDMA) protocol, a space division multiple access (SDMA) protocol, etc. Additionally, one or more of the devices 104, 106, 108, and 110 may be configured to operate in accordance with one or more near-field communications standards, such as a Bluetooth® standard (Bluetooth is a registered trademark of Bluetooth SIG, Inc.). Additionally, one or more of the devices 104, 106, 108, and 110 may exchange data via infrared or other near-field communications.

Each of the devices 104, 106, 108, and/or 110 may enter and exit the NAN 102 at various times during operation. For example, a device that is not within the NAN 102 may detect a discovery beacon and may associate with the NAN 102 during a discovery window identified by the discovery beacon, in accordance with a NAN standard or protocol. Additionally, the devices 104, 106, 108, and 110 may disassociate from the NAN 102 at any time. While within the NAN 102, the devices 104, 106, 108, and/or 110 may be configured to transmit or to receive messages indicating an availability to communicate via one or more logical channels. For example, the devices 104, 106, 108, and/or 110 may be configured to transmit or to receive service advertisements, such as service discovery frames (SDFs) that advertise a service provided via one or more logical channels by at least one device of the NAN 102. In some implementations, the one or more logical channels may include multiple logical channels.

Additionally, while within the NAN 102, the devices 104, 106, 108, and 110 may be configured to transmit or to receive synchronization beacons to or from one or more devices of the NAN 102. A synchronization beacon may indicate synchronization information and may be formed in accordance with one or more NAN standards or protocols. Each of the devices 104, 106, 108, and 110 may be configured to synchronize a respective internal clock based on the synchronization beacons. The synchronization beacons may be retransmitted (e.g., rebroadcast) by some of the devices 104, 106, 108, and 110 within the NAN 102, in accordance with a NAN standard or protocol, to enable the synchronization beacons to reach devices that are beyond a wireless communication range of the device that transmits the synchronization beacon. In an exemplary implementation, the synchronization beacons may be transmitted between devices of the NAN 102 via a first wireless channel, referred to as a "NAN communication channel." As referred to herein, a "NAN communication channel" is a particular wireless channel that is reserved for devices to perform NAN discovery operations and NAN synchronization operations. As used herein, the "NAN communication channel" is associated with the NAN 102, and communications in the NAN 102 may be performed over (e.g., via) the NAN communication channel.

In addition to being included in the NAN 102, one or more of the devices 104, 106, 108, and 110 may be included in one or more data link groups. A data link group may also be referred to as a data link, a data link network, a group network, a NAN data link (NDL), a NDL network, a data path group, a data path group network, a NAN data path, a NAN data path group, or a NAN data path group network. In some implementations, the data link group may include a mesh network, such as a "social Wi-Fi mesh network" or an Institute of Electrical and Electronics Engineers (IEEE) 802.11s mesh network, as illustrative, non-limiting examples. As another example, the data link group may include an infrastructure-less peer-to-peer (p2p) network. The data link group may include multiple devices that are able to form a network, such as a decentralized wireless network. Additionally, each device of the data link group may share a type of data announcement, a time period, such as a paging window, corresponding to data announcements, or a combination thereof. Additionally, each device of the data link group may use shared security credentials. For example, security information, such as group keys or common network keys, may be shared between the devices of the data link group using wireless communications that are in band or out of band with respect to a group communication channel of the data link group. In some implementations, the devices of the data link group may be synchronized to have periodic wake-up times, such as time periods when each of the devices is awake to advertise a service, to receive traffic or other messages, or a combination thereof.

A data link group may correspond to a service provided via a particular logical channel by one of the devices 104, 106, 108, and 110. For example, in FIG. 1, the first device 104 may provide a particular service, such as a music service, a gaming service, a social media, an advertising service, a message sharing service, etc., via the particular logical channel to other devices in a data link group, as described herein. As another example, the first device 104 may be part of another network, such as an access point (AP) based network or an independent basic service set (IBSS) network, and the first device 104 may be configured to advertise the other network to enable other devices of the NAN 102 to join the other network via the first device 104.

The data link groups may include "single-hop" data link groups or "multi-hop" data link groups. A single-hop data link group may include one or more devices that are within a wireless communication range (e.g., distance) of a device that provides a service. A multi-hop data link group may include one or more devices that are outside a wireless communication range of the provider. In the multi-hop data link group, at least one device may receive a message (including data) from the provider and may rebroadcast the message to another device that is outside of the wireless communication range of the provider. In a particular implementation, the data link group may be a multi-hop data link group that includes the devices 104, 106, 108, and/or 110. In this implementation, wireless communications from the first device 104 to the fourth device 110 may be routed (e.g., retransmitted) by the second device 106. In another particular implementation, the data link group may be a single-hop data link group that includes the devices 104, 106, and 108. The fourth device 110 may not be included in the single-hop data link group because the fourth device 110 is not within a wireless communication range, referred to as a one-hop range, of the first device 104.

The first device 104 may be configured to provide a service (e.g., to operate as a provider device). For example, the first device 104 may be configured to operate as a data source. The first device 104 may transmit data to other devices (e.g., subscriber devices) of the data link group. For example, to share a music service, the first device 104 may transmit music data to another device in the data link group. As another example, to share a social media service, the first device 104 may transmit text data, image data, video data, or a combination thereof, to another device in the data link group. As a further example, to share a gaming service, the first device 104 may transmit text data, score data, image data, video data, or a combination thereof, to another device in the data link group. The subscriber devices may be configured to operate as data sinks.

In a particular implementation, the provider logic 130 of the first device 104, the subscriber logic 134 of the second device 106, or both, may perform a "capabilities exchange" prior to the provider logic 130 sending data 122 to the second device 106. The capabilities exchange may be performed during a "connection set-up" phase of communication of the NAN 102. In some implementations, the connection set-up phase may be an "association" phase of communication of the NAN 102. For example, FIG. 1 illustrates that the association phase includes an association exchange 112 in which the provider logic 130 of the first device 104 and the subscriber logic 134 of the second device 106 may perform a capabilities exchange by exchanging capability information 114 and availability information 116. The association exchange 112 may further indicate first communication information of the first device 104, second communication information of the second device 106, or both. To illustrate, the first communication information and/or the second communication information may include security information (e.g., group keys or common network keys). While FIG. 1 illustrates an implementation in which the availability information 116 is exchanged during the association phase, in alternative implementations the availability information 116 may be exchanged during a NAN discovery window. In other implementations, the connection set-up phase may include a "negotiation" phase of communication of the NAN 102. During the negotiation phase, the provider logic 130 of the first device 104 and the subscriber logic 134 of the second device 106 may perform a capabilities exchange by exchanging the capability information 114 and the availability information 116. The negotiation phase may be similar to the association phase, except that negotiation operations may be performed instead of association operations.

While FIG. 1 illustrates a particular implementation in which the capability information 114 is separate from the availability information 116, in alternative cases the availability information 116 may be included in the capability information 114. To illustrate, during association, the "capabilities exchange" may include multiple parameters, and the availability information 116 may be included as an additional parameter. As an illustrative, non-limiting example, the availability information 116 may be a single bit, such as a zero value or a one value, in an "availability" field of the capability information 114. Alternatively, more than one bit may be used to provide more detailed information regarding availability. To illustrate, the availability information 116 may be a field that includes multiple bits and that provides an indication corresponding to an "always" available status. To illustrate, a value of multiple zeroes may indicate a dedicated availability status, such as an "always" available status. As used herein, "dedicated" availability indicates that a schedule of a particular device is such that the particular device will monitor or otherwise attend to communications of a particular session or group at times for which dedicated availability is indicated. In some implementations, as a participant of a NAN, a particular device may participate in multiple groups or communication sessions associated with the NAN, such as multiple data link groups, during a particular timeframe. In such implementations, "dedicated" availability for a particular session or group, such as a particular data link group of the NAN, indicates that the particular device will attend to the particular session or group at the time for which dedicated availability is indicated. An "always" available status is one example of a dedicated availability status. As another example, the availability information 116 may provide an indication corresponding to a "prefer to be polled" status. To illustrate, a value of multiple ones may indicate a "prefer to be polled" status. As a further example, the availability information 116 may provide an indication corresponding to a "prefer to send trigger frame" status. To illustrate, a combination of zeroes and ones in the field may indicate a "prefer to send trigger frame" status.

FIG. 1 illustrates a particular illustrative implementation in which the first device 104 and the second device 106 represent two devices of the NAN 102 that are "associating with each other." For example, the association exchange 112 may be performed in which one of the devices 104, 106 is joining the NAN 102. When the devices 104, 106 are associating, both the devices 104, 106 may indicate or exchange capabilities and indicate whether the devices 104, 106 are "always" available or whether the devices 104, 106 are to use a trigger or polling mechanism to determine availability. To illustrate, if the second device 106 is joining the NAN 102, and the second device 106 is "always" available to communicate on this NAN 102, the availability information 116 provided by the second device 106 during the association phase may provide an indication to a transmitter, such as the first device 104, that the transmitter may refrain from polling the second device 106 during a data window (as described further herein with respect to FIG. 3). By refraining from polling, messaging traffic in the NAN 102 may be reduced.

As another example, the availability information 116 may provide an indication to a transmitter, such as the first device 104, that the transmitter may refrain from waiting for an acknowledgment (ACK) from the second device 106 that the second device 106 is available to receive data from the transmitter. Rather, during a paging window (as described further herein with respect to FIG. 3), the transmitter may send a traffic announcement identifying the second device 106 as a recipient and may send data to the second device 106 (during the data window) without waiting for an ACK based on the availability information 116 indicating availability of the second device 106 during the data window. The traffic announcement may be a traffic indication message, also referred to as a traffic indicator, which may include a traffic indication map (TIM). If the availability information 116 indicates that the second device 106 is available to receive data during the data window, the second device 106 remains "awake" during the data window rather than transitioning to a low-power operating mode (or performing operation(s) on another NAN).

As another illustrative example, during association, the availability information 116 provided by a device, such as the second device 106, may indicate that the device is not "always" available or that the device "prefers" to be "polled" or "prefers" to send a trigger frame to determine availability to receive data during a particular window. To illustrate, in some cases the second device 106 may be unavailable as a result of transitioning to a low-power operating mode or performing operation(s) on another NAN. As such, the availability information 116 may provide an indication to the first device 104 that the second device 106 is to be "polled" to provide an indication of availability or that the second device 106 is to send a trigger frame to the first device 104 to provide the indication of availability. In this case, as described further herein, the first device 104 may send a traffic indication message that identifies the second device 106 as a recipient of data (during a paging window). As used herein, an indication that identifies a device as a "recipient" of data refers to an indication that identifies a device that is scheduled to receive data from another device (even if the device has not yet received some, or any, of the data). Based on the availability information 116 provided by the second device 106, the first device 104 may refrain from sending data to the second device 106 (during a data window) until the first device 104 determines the availability of the second device 106, such as via polling or trigger frames.

In a particular implementation, the data may be transmitted between devices of the data link group via a second wireless channel, referred to as a "data link group" channel. As used herein, a "data link group channel" is a particular wireless channel that is reserved for devices in a corresponding data link group to communicate messages, such as paging messages, regarding sharing a service and to communicate data associated with the service. A logical channel may correspond to a data link group channel and one or more transmission windows. For example, data may be transmitted between devices of the data link group via the data link group channel during the one or more transmission windows. As used herein, the "data link group channel" is associated with a data link group network, and communications in the data link group network may be performed over the data link group channel. Additionally, the data link group channel may be used for sharing security information, for performing association operations, and for performing routing operations (in multi-hop data link groups).

In some implementations, the data link group channel and the NAN communication channel may be different wireless channels that correspond to different wireless frequency bands. In a particular implementation, the NAN communication channel may be a 2.4 gigahertz (GHz) channel, and the data link group channel may be a 5 GHz channel. In other implementations, the data link group channel and the NAN communication channel may be the same wireless channel. For example, one or more of the devices 104, 106, 108, 110 may share data with the data link group via the NAN 102 (e.g., via the NAN communication channel). In some implementations, the NAN 102 may include multiple data link groups, and each of the multiple data link groups may correspond to a distinct data link group channel. The multiple data link groups may correspond to different services provided by different devices in the NAN 102. In other implementations, devices of the multiple data link groups may share data via the NAN 102. In some implementations, devices of the multiple data link groups may share data via the same data link group channel during distinct transmission windows.

During operation, one of the devices of the NAN 102 may generate and transmit a synchronization (sync) beacon in accordance with a NAN standard or protocol. For example, the third device 108 may transmit the synchronization beacon via the NAN communication channel. Any device within a one-hop range of the third device 108 may retransmit the synchronization beacon such that the synchronization beacon propagates throughout the NAN 102. Each of the devices 104, 106, 108, 110 may receive the synchronization beacon and may perform synchronization operations based on the synchronization beacon. For example, the devices 104, 106, 108, 110 may synchronize timing circuitry, such as an internal clock, based on receiving the synchronization beacon.

The first device 104 may begin operating as a provider device of a particular service to other devices of the NAN 102 after performing the synchronization operations, as described herein. The provider logic 130 of the first device 104 may determine a first plurality of logical channels. For example, the provider logic 130 may determine the first plurality of logical channels based on default data, based on input of a user of the first device 104, or both. The first plurality of logical channels may correspond to a plurality of communication channels (e.g., wireless communication channels) and one or more associated transmission windows, as described with reference to FIG. 2. The provider logic 130 may determine a plurality of available logical channels. For example, the plurality of available logical channels may be a subset of the first plurality of logical channels that is not being used by the provider logic 130 of the first device 104, such as to participate in other data provider groups.

The provider logic 130 of the first device 104 may select one or more logical channels 150 from the plurality of available logical channels to provide a particular service. For example, the provider logic 130 of the first device 104 may select at least one logical channel of the logical channels 150 based on a latency sensitivity of the particular service, as described herein. The particular service may be an audio streaming service, a gaming service, a music provider service, or a message service, as non-limiting examples.

In a particular example, a gaming service may have a first latency sensitivity, a message service may have a second latency sensitivity, and the first latency sensitivity may be higher than the second latency sensitivity. A first logical channel of the plurality of available logical channels may include a first number of transmission windows, a second logical channel of the plurality of available logical channels may include a second number of transmission windows, and the second number may be higher than the first number. In this example, the provider logic 130 of the first device 104 may select the second logical channel to include in the logical channels 150 in response to determining that the gaming service has the first latency sensitivity that satisfies a particular latency sensitivity threshold. As another example, the provider logic 130 of the first device 104 may select the first logical channel to include the logical channels 150 in response to determining that the message service has the second latency sensitivity that fails to satisfy the particular latency sensitivity threshold.

The provider logic 130 of the first device 104 may generate a message (e.g., a service advertisement 120)

indicating that the first device 104 is available to communicate via the logical channels 150. For example, the provider logic 130 may generate the service advertisement 120 to advertise availability of the particular service. The service advertisement 120 may indicate the logical channels 150. For example, the service advertisement 120 may include a list of indices corresponding to the logical channels. The list of indices may be based on mapping data that maps a particular index to each logical channel of the logical channels 150. The mapping data may be accessible to one or more of the devices 104, 106, 108, and 110.

In a particular implementation, the first device 104 may provide the particular service via a basic communication channel. The basic communication channel may correspond to a transmission window of the NAN channel that begins after the end of a NAN discovery window, as described further below with respect to FIGS. 3 and 4. In a particular implementation, the service advertisement 120 may not indicate the basic communication channel. The subscriber logic 134 of a device, such as the second device 106 may assume that the first device 104 is available to provide the particular service via the basic communication channel in response to receiving the service advertisement 120 regardless of whether the service advertisement 120 indicates the basic communication channel. The logical channels 150 may correspond to supplemental channels, also referred to as supplemental communication channels.

The provider logic 130 of the first device 104 may send the service advertisement 120, via the transceiver 136 of the first device 104, to devices of the NAN 102, such as the second device 106 and the third device 108, during a NAN discovery window. The devices 104, 106, 108, and/or 110 may monitor the NAN channel during the NAN discovery window. One or more devices (e.g., the second device 106 and the third device 108) may receive the service advertisement 120 during the NAN discovery window.

In a particular implementation, the subscriber logic 134 of the second device 106 may generate a subscribe message 124 in response to receiving the service advertisement 120. For example, the subscriber logic 134 of the second device 106 may generate the subscribe message 124 in response to receiving the service advertisement 120 and determining that the second device 106 is available to communicate via at least one of the logical channels 150. The subscribe message 124 may implicitly or explicitly indicate that the second device 106 is available to communicate. The subscriber logic 134 of the second device 106 may send the subscribe message 124, via the transceiver 136 of the second device 106, to the first device 104.

The provider logic 130 of the first device 104 may receive the subscribe message 124. The provider logic 130 of the first device 104 may determine that the second device 106 is available to communicate based on receiving the subscribe message 124. In a particular implementation, the subscribe message 124 may explicitly indicate that the second device 106 is available to communicate. For example, a value of a particular field of the subscribe message 124 may indicate whether the second device 106 is available to communicate. In this implementation, the provider logic 130 of the first device 104 may determine that the second device 106 is available to communicate in response to determining that the particular field of the subscribe message 124 has a particular value (e.g., 1). In an alternate implementation, the subscribe message 124 may implicitly indicate that the second device 106 is available to communicate. In this implementation, the provider logic 130 of the first device 104 may determine that the second device 106 is available to communicate in response to receiving the subscribe message 124.

In a particular implementation, the provider logic 130 of the first device 104 may send an acknowledgment (ACK) to the second device 106 in response to receiving the subscribe message 124. In an alternate implementation, the provider logic 130 may not send the ACK. For example, a handshake process between the first device 104 and the second device 106 may end with the provider logic 130 receiving the subscribe message 124.

A data link group corresponding to each of the logical channels 150 may include the first device 104 and the second device 106. In a particular implementation, the first device 104 may receive subscribe messages from multiple subscriber devices, such as the devices 106, 108, and/or 110. A data link group corresponding to a particular logical channel may include the first device 104 and each subscriber device that responded with a subscribe message. A data link group corresponding to a basic communication channel may include the first device 104 and each subscriber device that responded with a subscribe message to the service advertisement 120.

Each data link group may correspond to a particular logical channel. For example, each data link group may correspond to a particular communication channel and one or more transmission windows. To illustrate, the data link group associated with the basic communication channel may correspond to the NAN communication channel and a transmission window that begins at the end of a NAN discovery window, as described further with respect to FIG. 3.

Devices participating in a particular data link group may monitor the particular communication channel during a beginning portion (e.g., a paging window) of each of the one or more transmission windows. For example, the first device 104 and the second device 106 may monitor the NAN communication channel during a paging window that ends when a NAN discovery window ends. As another example, the first device 104 and the second device 106 may monitor a particular communication channel corresponding to each of the logical channels 150 during a paging window of each of one or more corresponding transmission windows.

In a particular implementation, devices participating in a data link group may monitor a corresponding communication channel during at least a first number of paging windows of each of one or more corresponding transmission windows. For example, a first logical channel of the logical channels 150 may correspond to a first communication channel and one or more transmission windows. The subscriber logic 134 of the second device 106 may monitor the first communication channel during at least a first percentage (e.g., 50%) of paging windows of the one or more transmission windows. For example, the subscriber logic 134 of the second device 106 may monitor the first communication channel during a first paging window and may refrain from monitoring the first communication channel during a second paging window. The first paging window and the second paging window may occur during the same discovery period or during distinct discovery periods. As referred to herein, a "discovery period" may refer to a time period between the end of a first discovery window and the beginning of a next discovery window.

In the example illustrated in FIG. 1, the provider logic 130 of the first device 104 may generate a paging message 128 in response to determining that the first device 104 has data to be sent to the second device 106. The paging message 128 may indicate that the first device 104 has data to send to the second device 106. For example, the paging message 128 may indicate one or more recipients, such as the second device 106.

The provider logic 130 of the first device 104 may send the paging message 128 via a first communication channel during a first paging window of a first transmission window. The provider logic 130 of the first device 104 may send the paging message 128 via the transceiver 136 of the first device 104. The first communication channel and the first transmission window may correspond to a first logical channel of the logical channels 150. In a particular implementation, the paging message 128 may include an ad-hoc traffic indication message (ATIM). For example, the paging message 128 may be sent during an ATIM window at the beginning of the first transmission window.

In a particular implementation, the paging message 128 may include an address list 160 indicating the recipients. In some case, the address list 160 may be represented by a traffic indication map (TIM). The TIM may be a bitmap that indicates whether particular devices are recipients of data 122 to be sent. Each bit of the TIM may correspond to a different device of the data link group, and a value of each bit may indicate whether or not the corresponding device is a recipient of the data 122. A correspondence between the bit of the TIM and each device may be based on an association identifier (AID). For example, the second device 106 may associate with the first device 104 and the devices 104, 106 may generate and exchange AIDs. To illustrate, the second device 106 may associate with the first device 104 and may receive a first AID (e.g., 2) from the first device 104. The devices 108 and 110 may receive distinct AIDs (e.g., 3 and 4, respectively) during association with the first device 104. The AIDs may be used by the devices 106, 108, 110 to identify corresponding bits in the TIM received from the first device 104. For example, a second bit of the TIM may correspond to the second device 106 due to the AID of 2. In this example, a third bit and a fourth bit of the TIM may correspond to the devices 108 and 110, respectively (a first bit of the TIM may be reserved).

In some implementations, the paging message 128 includes a receiver address field having a particular receiver address value 170. The receiver address field having the particular receiver address value 170 may indicate, to a device receiving the paging message 128, that the paging message 128 is a paging message, as compared to a different type of message. In a particular implementation, the particular receiver address value 170 is stored in a memory of the devices 104, 106, 108, and 110. For example, the particular receiver address value 170 may be programmed or stored in memories of the devices 104, 106, 108, and 110 during manufacture and production. The particular receiver address value 170 may be common to each of the devices 104, 106, 108, and 110. In some implementations, the particular receiver address value 170 may be defined in a NAN standard or other wireless communication standard. For example, the particular receiver address value 170 may be defined by an IEEE standard, a Wi-Fi Alliance specification, or both. In other implementations, the particular receiver address value 170 may be related to a value determined during operation of the devices 104, 106, 108, and 110. As one non-limiting example, the particular receiver address value 170 may be a NAN cluster identifier (ID) related to the NAN 102. As another non-limiting example, the particular receiver address value 170 may be a data link group ID related to the data link group.

After receiving the paging message 128, each of the devices 106, 108, and 110 may process a portion of the paging message 128 that includes the receiver address field to determine whether the paging message 128 is a paging message. For example, the subscriber logic 134 of the devices 106, 108, and 110 may be configured to process a portion of a received message, such as a portion of a header or other portion, to determine whether the received message is a paging message. In some implementations, the receiver address field may be a first address field included in the paging message 128, and the devices 106, 108, and 110 may be configured to process the paging message 128 up to the first address field. In other implementations, the receiver address field may be a different address field, and the devices 106, 108, and 110 may be configured to process the paging message 128 up to the receiver address field. Processing the portion of the received message may include determining a value of the receiver address field and comparing the value to the particular receiver address value 170. If the receiver address field has the particular receiver address value 170, the devices 106, 108, and 110 determine that the received message is a paging message (e.g., the paging message 128). If the receiver address field has a different value than the particular receiver address value 170, the devices 106, 108, and 110 determine that the received message is not a paging message. Because a small portion of the received message is processed, determining whether a received message is a paging message may be performed quickly and with less processing resources than processing a larger portion, or an entirety, of the received message.

In response to identifying the paging message 128 as a paging message, one or more of the devices 106, 108, and 110 may transmit an acknowledgment (ACK) 180 to the first device 104. For example, the second device 106, the third device 108, or both may transmit the ACK 180 to the first device 104. The ACK 180 may be transmitted by a device that is not indicated as a recipient of the data 122 by the paging message 128. For example, the third device 108 may transmit the ACK 180 even though the third device 108 is not indicated as a recipient of the data 122. To illustrate, the third device 108 may process the portion of the paging message 128 that includes the receiver address field (and may send the ACK 180) prior to processing other portions of the paging message 128 to determine if the third device 108 is indicated as a recipient. In a particular implementation, the devices 106, 108, and 110 may be configured to transmit the ACK 180 within a short interframe space (SIFS) period after receiving the paging message 128. Because a device processes a small portion of the paging message 128 prior to sending the ACK 180, the processing of the portion of the paging message 128 and transmission of the ACK 180 may occur within the SIFS period.

In some implementations, the first device 104 may receive multiple ACKs 180 from multiple devices of the data link group. In a particular implementation, the multiple devices generate the multiple ACKs 180 based on the same scrambling seed. In this implementation, the multiple ACKs 180 have the same waveform and are received as a multipath transmission at the first device 104. In another particular implementation, the multiple devices generate the multiple ACKs 180 based on different scrambling seeds. In this implementation, the multiple devices may transmit the multiple ACKs 180 within a SIFS period. Because the multiple ACKs 180 are generated based on different scrambling seeds and are sent at the same time, the first device 104 may not be able to decode the multiple ACKs 180 due to interference caused by the multiple ACKs 180. In this case, the first device 104 may monitor a wireless network during the SIFS period to detect a level of transmitted energy corresponding to the multiple ACK waveforms. Upon detecting a level of transmitted energy that exceeds a threshold, the first device 104 may interpret the level of transmitted energy as an indication that multiple ACK waveforms have been received.

The paging message 128 may include or correspond to one or more frames. The frames may be defined in a wireless communication standard, such as an IEEE 802.11 standard or a NAN standard. In some implementations, the paging message 128 includes a management frame or an action frame. An action frame may include a public action frame, as a non-limiting example. In other implementations, the paging message 128 includes a service discovery frame (SDF), which may also be referred to as a service announcement. The SDF may include an attribute 172 that includes information related to the subset of devices, a type of traffic (e.g., the data 122) to be transmitted by the first device 104, and other information. The attribute 172 may be referred to as a "traffic announcement attribute" or a "page attribute." Although the SDF is described as including the attribute 172, in other implementations, the paging message 128 may include other frames, such as the management frame or the action frame, and the other frames may include the attribute 172.

The attribute 172 includes a paged device list (PDL) 174. The PDL 174 may identify the subset of devices that are scheduled to receive the data 122 from the first device 104. For example, the first device 104 may be configured to send the data 122 to devices in the subset of devices during a portion of a transmission window. In some implementations, the paging message 128 includes the PDL 174 instead of the address list 160. In a particular implementation, the PDL 174 is indicated by a TIM. In another particular implementation, the PDL 174 is indicated by a Bloom filter. The Bloom filter is a data structure that indicates membership in a set without explicitly identifying members of the set. In a particular implementation, the data structure may be a string of bits. The Bloom filter may identify the subset of devices that are scheduled to receive the data 122. The Bloom filter may be smaller and use less storage space than the TIM and thus may reduce power consumed to transmit the Bloom filter and may reduce a size of the paging message 128 as compared to using the TIM as the PDL 174. A device may be indicated as a target of the data 122 in the Bloom filter using a set of hash functions. For example, the Bloom filter may be a bit array of m bits that are initialized to a logical zero value, and the Bloom filter may correspond to a set of hash functions. To indicate that a device is scheduled to receive the data 122, a string of bits corresponding to the device may be passed through the set of hash functions to generate a set of bit positions, and each bit in the Bloom filter corresponding to the set of bit positions is set to a logical one value. In a particular implementation, the string of bits passed through the set of hash functions is a media access control (MAC) address of the device that is indicated as a target of the data 122. Other devices may be indicated as targets of the data 122 by determining corresponding sets of bit positions based on corresponding strings of bits, such as MAC addresses, and by setting each bit in the Bloom filter corresponding to the sets of bit positions to a logical one value. In another particular implementation, the PDL 174 is indicated by a list of MAC addresses. Each device that receives the paging message 128 may be configured to process the PDL 174 to determine whether the corresponding device is included in the subset of devices scheduled to receive the data 122 from the first device 104.

In some implementations, a PDL control field of the attribute 172 includes a traffic type indicator. The traffic type indicator may identify a type of traffic corresponding to the data 122. For example, the traffic type indicator may identify whether the data 122 is voice data, video data, packet data, or other types of data. In a particular implementation, the traffic type indicator may identify a quality of service (QoS) category of the data 122. Multiple traffic type indicators may be used to indicate different types of data that is scheduled for transmission. As an example, the first device 104 may have two types of data to transmit to the devices of the data link group. Because the first device 104 has scheduled transmission of multiple types of data, the paging message 128 includes multiple attributes. For example, if the first device 104 has two types of data scheduled for transmission, the paging message 128 includes a first attribute and a second attribute. The two attributes may each include a traffic type indicator (in a PDL control field) that indicates one of the types of data scheduled for transmission. For example, if the first device 104 has voice data and packet data scheduled for transmission, the first attribute may include a traffic type indicator that indicates voice data, and the second attribute may include a traffic type indicator that indicates packet data.

Additionally, the PDL control field may indicate a type of the PDL 174. For example, a set of bits of the PDL control field having a first value may indicate that the PDL 174 is indicated by a TIM, the set of bits of the PDL control field having a second value may indicate that the PDL 174 is indicated by a Bloom filter, and the set of bits of the PDL control field having a third value may indicate that the PDL 174 is indicated by a list of MAC addresses. Additionally, the set of bits of the PDL control field having a fourth value may indicate that a new common group key (CGK) corresponding to the data link group has been generated. If the set of bits of the PDL control field has the fourth value, a MAC address of a device that generated the CGK is included in the PDL 174. The CGK may enable the devices 104, 106, 108, and 110 to perform wireless communications via the data link group. For example, the CGK may be used to encrypt and decrypt messages transmitted between devices of the data link group. In some implementations, the attribute 172 also includes a page control field 176. The page control field 176 may indicate a number of PDLs included in the paging message 128. The page control field 176 may also indicate whether the data 122 that is scheduled for transmission is multicast data or unicast data. Additional details of the attribute 172, and the page control field 176, are described with reference to FIGS. 11 and 12.

Each of the devices 106, 108, and 110 may determine whether it is scheduled to receive the data 122 based on the corresponding bit in the TIM (the address list 160) or based on the PDL 174 received from the first device 104. For example, the second device 106 may determine that the second device 106 is scheduled to receive the data 122 based on the second bit of the TIM having a logical value of one, and the devices 108 and 110 may determine that the devices 108 and 110, respectively, are not scheduled to receive the data 122 based on the third bit and the fourth bit having logical zero values. As another example, the second device 106 may determine that the second device 106 is scheduled to receive the data based on the PDL 174, which may be a TIM, a Bloom filter, or a list of MAC addresses. Accordingly, the second device 106 may remain in an active operating mode during a remaining portion of the first transmission window. The remaining portion may include a data transmission window. To illustrate, the subscriber logic 134 of the second device 106 may monitor the first communication channel during the data transmission window. In a particular implementation, the subscriber logic 134 of the second device 106 (or the provider logic 130 of the first device 104) may change a channel of the transceiver 136 of the second device 106 (or the first device 104) to the first communication channel to monitor the first communication channel during the data transmission window.

In a particular implementation, the subscriber logic 134 of the second device 106 may send a trigger frame 182 to the first device 104 during the data transmission window based on determining that the second device 106 is indicated as a recipient of the data 122 from the first device 104 by the paging message 128. The trigger frame 182 may indicate that the subscriber logic 134 of the second device 106 is ready to receive the data 122. For example, the trigger frame 182 may indicate that the second device 106 is scheduled to be in an active operating mode during the transmission window. In a particular implementation, a power-save poll (PS-POLL) message may operate as the trigger frame 182. In a particular implementation, the subscriber logic 134 of the second device 106 may transmit the PS-POLL message via the first communication channel during a beginning portion (e.g., an acknowledgment window) of the data transmission window. In another particular implementation, a quality of service null (QoS_NULL) message may operate as the trigger frame 182. In a particular implementation, a traffic type of the trigger frame 182 may be set to a high priority traffic type. For example, a QoS category corresponding to the trigger frame 182 may be set to a high priority category, such as voice data. By setting the traffic type to a high priority type, the trigger frame 182 may have an increased likelihood of being transmitted, thereby reducing or eliminating delays caused by trigger frames being queued until higher priority transmissions are completed and a wireless network becomes free for transmitting the trigger frames. In a particular implementation, the second device 106 may receive a second paging message from a different device (not illustrated) in addition to the paging message 128. In this implementation, the second device 106 may multicast the trigger frame 182 to the first device 104 and to the different device. In this manner, multicast trigger frames may be sent to multiple devices if a device is scheduled to receive traffic from the multiple devices. Using multicast trigger frames may reduce a number of trigger frames, thus reducing congestion of wireless networks.

In a particular implementation, the devices 104, 106, 108, and 110 may be configured to perform contention mitigation techniques to reduce collisions between ACKs, trigger frames, or both. To perform contention mitigation, each of the devices 104, 106, 108, and 110 may include, store, and/or maintain one or more backoff counters. The one or more backoff counters may be used by the devices 104, 106, 108, and 110 to determine when, during a paging window (or a transmission window), to initiate transmission of an ACK or a trigger frame. To illustrate, after receiving the paging message 128, the second device 106 and the third device 108 may set a backoff counter to a value that is randomly drawn from a uniform distribution over the interval [0, CW] where CW is a contention window parameter. In some implementations, CW has a particular value, such as a preprogrammed value or a value that is set by a wireless communication standard. In other implementations, CW is based on a length of the paging window, as further described herein. In other implementations, a distribution parameter, such as a contention window parameter or another parameter, is used by one or more of the devices 104, 106, 108, 110 to distribute ACK or trigger frames is indicated by the paging message. For example, an order of the devices 104, 106, 108, 110 in the PDL 174 or in the address list 160 may correspond to a CW for each device 104, 106, 108, 110. To illustrate, a device associated with a first position in the address list 160 may use a first CW, a device associated with a second position in the address list 160 may use a second CW (where the second CW is different from the first CW), and so forth. If the backoff counter at the second device 106 reaches zero, the second device 106 transmits the ACK 180 to the first device 104. If the backoff counter at the third device 108 reaches zero, the third device 108 transmits the ACK 180. In some implementations, if one of the second device 106 and the third device 108 has already transmitted the ACK 180, the other does not transmit the ACK 180. Alternatively, the second device 106 and the third device 108 may transmit the ACK 180 at different times based on different random values of the backoff counter. The backoff counter may be used in the same manner as described above for transmitting the trigger frame 182. In other implementations, more than one backoff counter may be used to further randomize times that ACKs or trigger frames are transmitted. Additional details and other implementations of performing contention mitigation are further described herein.

In a particular implementation, prior to sending the paging message 128, the first device 104 may send a first request to send (RTS) message 184 to a device included in the subset of devices scheduled to receive data from the first device 104. For example, the first device 104 may send the first RTS message 184 to the second device 106 prior to sending the paging message 128. The second device 106 may send a first clear to send (CTS) message 186 to the first device 104 in response to receiving the first RTS message 184. The first CTS message 186 may be transmitted within a short interframe space (SIFS) period of receiving the first RTS message 184. Other devices of the data link group may detect the first RTS message 184, the first CTS message 186, or both, via a wireless network, and the other devices may refrain from transmitting data via the wireless network for a particular time period in response to detecting the first RTS message 184, the first CTS message 186, or both. Thus, the first RTS message 184, the first CTS message 186, or both may "clear" the wireless network for transmission of the paging message 128. In response to receiving the first CTS message 186, the first device 104 may transmit the paging message 128 to devices of the data link group. In a particular implementation, the paging message 128 may include a second receiver address that has a value identifying the second device 106. In another particular implementation, the paging message 128 may include a multicast message that includes a second receiver address having a multicast address.

In some situations, the second device 106 may be unable to transmit the first CTS message 186 within the SIFS period, such as due to other devices of the data link group having control of the wireless network. If the first device 104 does not receive the first CTS message 186 within the SIFS period, the first device 104 may send a second RTS message 188 to a different device included in the subset of devices. For example, the first device 104 may send the second RTS message 188 to the third device 108 (if the third device 108 is included in the subset of devices) prior to sending the paging message 128. In response to receiving the second RTS message 188, the third device 108 may send a second CTS message 190 to the first device 104. In response to receiving the second CTS message 190, the first device 104 may send the paging message 128 to devices of the data link group. In some implementations, the data 122 may be multicast data. In these implementations, the paging message 128 may include a multicast indicator. For example, the paging message 128 may include a particular field that indicates whether the data 122 is unicast data or multicast data. Multicast data may include data that is to be transmitted to multiple devices concurrently and may include broadcast data. In these implementations, the first device 104 may select any device of the data link group as a recipient of the first RTS message 184.

The provider logic 130 of the first device 104 may receive the trigger frame 182 (the PS-POLL message or the QoS_NULL message) during the data transmission window. In response to receiving the trigger frame 182, the provider logic 130 of the first device 104 may transmit the data 122 to the second device 106 via the first communication channel during the data transmission window. In the example illustrated in FIG. 1, the paging message 128 further includes an indication 162 of availability or unavailability for a next N logical channels 164. As described further below, one or more neighboring devices, such as the second device 106, that are subscribing to a particular service provided by the first device 104 may determine whether to perform one or more operations based on the indication 162.

In a particular implementation, the indication 162 included in the paging message 128 may represent an indication of unavailability of the first device 104 for the next N logical channels 164. That is, the paging message 128 illustrated in FIG. 1 may represent a "current" paging (traffic) announcement via a "current" logical channel, and the indication 162 of unavailability may represent "future" logical channels that follow the "current" logical channel in an index of logical channels for the particular data link group, as described further below with respect to FIG. 2. Although referred to as "current" and "future" logical channels, the logical channels may be any logical channels referenced in the index of logical channels. For example, the "current" logical channel may refer to a first logical channel referenced in the index of logical channels, and the "future" logical channels may refer to one or more logical channels that follow the first logical channel in the index, such as a second logical channel and a third logical channel, as a non-limiting example. To illustrate, the "current" logical channel may represent a first logical channel in the index, and the indication 162 may specify that the first device 104 is unavailable for the next four logical channels (i.e., N=4). In this example, the first device 104 may be unavailable from the first logical channel in the index through the fifth logical channel in the index, and the "future" logical channels refers to the second logical channel through the fifth logical channel.

In response to receiving the indication 162 of unavailability, the subscriber logic 134 of the second device 106 may refrain from monitoring the next N logical channels 164 of the logical channels 150 of the particular data link group. In some cases, the second device 106 may reduce power consumption by remaining in a low-power operating mode and refrain from waking to monitor the next N logical channels 164 (including paging windows). Alternatively, the second device 106 may perform one or more operations associated with another data link group. For example, if the second device 106 subscribes to multiple providers, the second device 106 may schedule power saving operation(s) or concurrency operation(s) based on an intersection of unavailability associated with each of the multiple providers. As an illustrative, non-limiting example, the second device 106 may subscribe to two providers (e.g., the first device 104 and another device). Depending on when both provider devices indicate unavailability, the second device 106 may schedule power saving operation(s) or concurrency operation(s).

In another implementation, the indication 162 included in the paging message 128 may represent an indication of availability of the first device 104 for the next N logical channels 164. That is, the paging message 128 illustrated in FIG. 1 may represent a paging (traffic) announcement via a first logical channel, and the indication 162 of availability may represent other logical channels that follow the first logical channel in an index of logical channels for the particular data link group, as described further below with respect to FIG. 2. As an illustrative, non-limiting example, the first logical channel may represent a first logical channel in the index, and the indication 162 may specify that the first device 104 is available for the next four logical channels (i.e., N=4). In this example, the first device 104 may be available from the first logical channel in the index through the fifth logical channel in the index.

In response to receiving the indication 162 of availability, the subscriber logic 134 of the second device 106 may send an acknowledgment to the first device 104. The acknowledgement may be a PS-POLL message. If the first device 104 receives acknowledgments from each of the subscriber device(s), the first device 104 may not send traffic announcements in the next N logical channels 164. Instead, the first device 104 may proceed to send data traffic. Thus, the indication 162 of availability for the next N logical channels 164 may reduce the number of paging messages and associated acknowledgments (ACKs) and may allow for extended data transfer across different time frequency blocks (e.g., the next N logical channels 164). By announcing "future" availability, the first device 104 may not include traffic announcements in paging windows during time periods corresponding to subsequent logical channels. As described further with respect to FIG. 9, at least some paging windows that would normally be used for traffic announcements may instead be used for sending data traffic. That is, for transmission windows that include a paging window (PW) portion and a data portion, at least a portion of the time associated with the PW portion may be used for data transmission.

In a particular implementation, the indication 162 may identify availability via a first bit (e.g., 1) and may identify unavailability via a second bit (e.g., 0). As an illustrative, non-limiting example, to indicate that the first device 104 is available for the next N logical channels 164, the indication may include [1, N], where N is an integer value. To indicate that the first device 104 is unavailable for the next N logical channels 164, the indication may include [0, N], where N is an integer value. However, it will be appreciated that alternative methods of identifying availability or unavailability may be used.

Thus, FIG. 1 illustrates that during an association phase of communication of the NAN, devices may exchange availability information that provides an indication of an availability to communicate during subsequent data windows. If a provider device identifies a subscriber device as a recipient of data, the provider device may send a paging message that includes a TIM identifying the subscriber device as a recipient of data, and the provider device may send data to the subscriber device during a data window without waiting for an ACK based on the availability information indicating availability of the subscriber device during the data window. For example, if the first device 104 identifies the second device 106 as a recipient of data, the first device 104 may send a paging message that includes a TIM without waiting for an ACK based on the availability information 116. Further, the subscriber device may refrain from providing an ACK to the provider device responsive to the paging message that includes the traffic indicator that identifies the subscriber device. Thus, the availability information 116 provided during the association phase of communication of the NAN 102 may result in a reduction of polling message traffic and ACK message traffic in the NAN 102.

FIG. 1 further illustrates that devices in a data link group of the NAN 102 may provide an indication of availability or unavailability for a next N logical channels via a paging message. In some cases, an indication of availability may allow a provider device, such as the first device 104, to refrain from providing traffic announcements during paging window (PW) portions of subsequent transmission windows and to instead perform data transmission. As a specific example, during a paging window of a first transmission window, the provider device may send a paging message to one or more devices of the data link group. In this example, based on an indication of availability from a particular subscriber device of the data link group, during a second transmission window (subsequent to the first transmission window), the provider device may send data traffic to the particular subscriber device without sending a traffic announcement during a paging window of the second transmission window. In some implementation, the provider device may send the data traffic during a portion of the second transmission window other than the data window portion of the second transmission window. To illustrate, the provider device may send at least a portion of the data traffic during a paging window portion or during a trigger window portion of the second transmission window.

In other cases, an indication of unavailability may allow a subscriber device, such as the second device 106, to refrain from monitoring subsequent logical channels. Instead, the subscriber device may transition to a low-power operating mode (e.g., a sleep mode) or perform operation(s) associated with other data link group(s). In some implementations, the subscriber device determine whether other devices with which the subscriber device is peered are unavailable prior to transitioning to the low-power operating mode. For example, the subscriber device may be peered with two devices, such as via association operations or negotiation operations, and the subscriber device may transition into the low-power operating mode if the two devices are both unavailable. FIG. 1 further illustrates that devices in a data link group of the NAN 102 may receive paging messages, such as the paging message 128, including a receiver address field having the particular receiver address value 170. Using the particular receiver address value 170 may enable devices that receive the paging message 128 to identify the paging message 128 as a paging message by processing a portion of the paging message 128 that includes the receiver address field. Processing the portion may require less processing resources or may be performed faster than processing a larger portion, or an entirety, of the paging message 128.

Referring to FIG. 2, a table illustrating an example of logical channels is shown and generally designated 200. The table 200 includes a NAN data link (NDL) index column 204, a channel number column 206, and a supplemental channel offset column 208. In a particular implementation, the table 200 may be determined in accordance with a NAN standard or protocol.

Each row of the table 200 may correspond to a particular logical channel. For example, a row 210 may correspond to a first logical channel, such as the basic communication channel 306 of FIG. 3. The row 210 may indicate a first index (e.g., 0), a first communication channel (e.g., the communication channel 6), and a first supplemental channel offset (e.g., 1). In a particular implementation, the service advertisement 120 may include the first index to indicate the first logical channel of the logical channels 150. In an alternate implementation, the service advertisement 120 may not include the first index if the first index corresponds to the basic communication channel.

In a particular implementation, the provider logic 130 of the first device 104, the subscriber logic 134 of the second device 106, or both, may multiply the first supplemental channel offset (e.g., 1) by a particular number (e.g., 16) to determine a supplemental channel offset (e.g., 16 TUs). The provider logic 130 of the first device 104, the subscriber logic 134 of the second device 106, or both, may determine when a transmission window of the first logical channel begins subsequent to a beginning of a discovery window based on the supplemental channel offset, as described with reference to FIG. 1.

Figure 3:
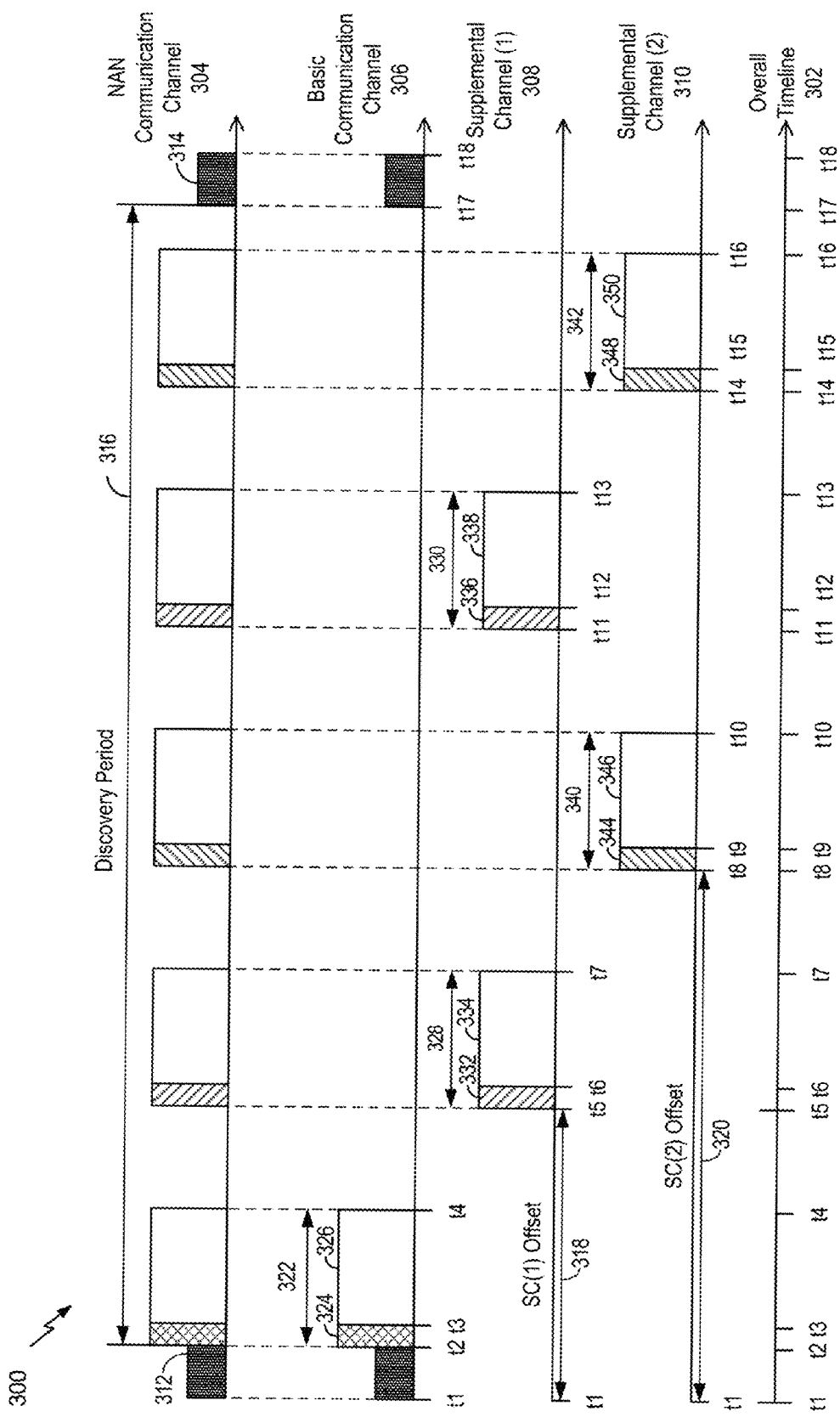
FIG. 3 is a timing diagram corresponding to operation of a particular aspect of the system of FIG. 1.

A row 212 may correspond to a first supplemental channel, such as the first supplemental channel 308 of FIG. 3. The row 212 may indicate a first index (e.g., 3), a first communication channel (e.g., the communication channel 36), a first supplemental channel offset (e.g., 2), and a second supplemental channel offset (e.g., 18). A row 214 may correspond to a second supplemental channel, such as the second supplemental channel 310 of FIG. 3. The row 214 may indicate a second index (e.g., 13), a second communication channel (e.g., the communication channel 149), a second supplemental channel offset (e.g., 9), and a third supplemental channel offset (e.g., 25).

Each supplemental channel offset may indicate a transmission window associated with a corresponding supplemental channel. In a particular implementation, the provider logic 130 of the first device 104 may select the first supplemental channel and the second supplemental channel to include in the logical channels 150, as described with reference to FIG. 1. In this implementation, the service advertisement 120 may include the first index and the second index.

The provider logic 130 of the first device 104 may determine an index corresponding to a particular logical channel based on the table 200. The provider logic 130 of the first device 104 may include the index in the service advertisement 120 to indicate the particular logical channel. The service advertisement 120 may indicate the index using a particular number of bits. The particular number of bits to indicate the index may be 'fixed.' For example, the particular number of bits may be independent of a number of supplemental channel offsets corresponding to the particular logical channel. Using the index to indicate the particular logical channel may also reduce a size of the service advertisement 120.

Referring to FIG. 3, a timing diagram is shown and generally designated 300. In a particular implementation, the timing diagram 300 may correspond to operation of a particular implementation of the system 100 of FIG. 1. The timing and operations shown in FIG. 3 are for illustration and are not limiting. In other implementations, additional or fewer operations may be performed and the timing may be different.

The timing diagram 300 includes an overall timeline 302 corresponding to a NAN communication channel 304, a basic communication channel 306, a first supplemental channel 308, and a second supplemental channel 310. Thus, a plurality of supplemental communication channels may be used for transmitting data. In alternative implementations, a single supplemental communication channel may be used, or more than two supplemental communication channels may be used.

As illustrated in the timing diagram 300, a first discovery window 312 and a second discovery window 314 may correspond to the NAN communication channel 304. As described with reference to FIG. 1, the discovery windows 312, 314 may be time periods reserved for the devices 104, 106, 108, and 110 to perform discovery operations and synchronization operations corresponding to the NAN 102.

The first discovery window 312 may begin at time t1 and may end at time t2, and the second discovery window 314 may begin at time t17 and end at time t18. The discovery windows 312, 314 may have a same discovery window duration. For example, a period of time between time t1 and time t2 may be the same as a period of time between time t17 and time t18. The discovery window duration may be determined in accordance with a NAN standard or protocol. A time period between consecutive discovery windows, such as the first discovery window 312 and the second discovery window 314, may be referred to as a discovery period 316. In a particular implementation, a duration of the discovery period 316 may be 500 time units (TU), in accordance with a NAN standard or protocol. Each TU may correspond to 1024 microseconds (µs), as described in an IEEE 802.11-2012 specification, and 500 TU may correspond to approximately 512 ms.

During the first discovery window 312, the service advertisement 120 may be transmitted via the NAN communication channel 304. The service advertisement 120 may indicate the logical channels 150, as described with reference to FIG. 1. In the example of FIG. 3, the logical channels 150 may include the first supplemental channel 308 and the second supplemental channel 310. For example, the provider logic 130 of the first device 104 may transmit the service advertisement 120 via the NAN communication channel 304 to advertise a service being provided by the first device 104. For example, the service advertisement 120 may indicate a NAN data link group index corresponding to the first supplemental channel 308 and at least one supplemental channel offset 318 (e.g., channel offsets 2 and 18 in row 212 of the table 200). Further, the service advertisement 120 may indicate a NAN data link group index corresponding to the second supplemental channel 310 and at least one supplemental channel offset 320 (e.g., channel offsets 9 and 25 in row 214 of the table 200). The subscriber logic 134 of the second device 106 may transmit the subscribe message 124 via the NAN communication channel 304 in response to receiving the service advertisement 120, as described with reference to FIG. 1.

The basic communication channel 306 may correspond to transmission windows of the NAN communication channel 304 that begin after the end of the discovery windows, such as the discovery windows 312 and 314, of the NAN communication channel 304. For example, as described further below with respect to FIG. 4, the basic communication channel 306 may correspond to a first transmission window 322 that begins after the first discovery window 312. FIG. 3 illustrates that the first transmission window 322 following the first discovery window 312 may begin at t2 and may end at t4. While not shown in FIG. 3, the basic communication channel 306 may also correspond to a second transmission window following the second discovery window 314 that may begin at t18.

Each transmission window associated with the basic communication channel 306 may include a paging window and a data transmission window. For example, the first transmission window 322 following the first discovery window 312 may include a first paging window 324 and a first data transmission window 326. As used herein, a time period that includes a paging window and a data window (or a data transmission window) may be referred to as a transmission window, a TX window, a data transmission window, or a NAN data link time block (NDL-TB). The first paging window 324 may begin at t2 and may end at t3. The first data transmission window 326 may begin at t3 and may end at t4. Further, while not shown in the example of FIG. 3, the transmission window following the second discovery window 314 may also include a paging window (beginning at t18) and a data transmission window. A duration of a paging window, a duration of a data transmission window, a duration of a transmission window (e.g., 128 time units (TUs), 256 TUs, or 512 TUs), or a combination thereof, may be determined in accordance with a NAN standard or protocol.

As described further below with respect to FIG. 5 and FIG. 7, the first supplemental channel 308 may correspond to a first transmission window 328 and a second transmission window 330. For example, the at least one supplemental channel offset 318 may indicate transmission windows that begin a period of time corresponding to the at least one supplemental channel offset 318 after a beginning of a NAN discovery window, such as the first discovery window 312. In the particular implementation illustrated in FIG. 3, the first supplemental channel 308 may correspond to multiple offsets indicating multiple transmission windows during each discovery period, such as the discovery period 316. In an alternate implementation, the first supplemental channel 308 may correspond to a single offset indicating a single transmission window during each discovery period.

The first transmission window 328 associated with the first supplemental channel 308 may begin subsequent to the end of the first discovery window 312. For example, the first transmission window 328 may begin at time t5 and may end at time t7. The time t5 may occur a period of time after time t1, the period of time corresponding to a first offset (e.g., 2) of the at least one supplemental channel offset 318. The second transmission window 330 associated with the first supplemental channel 308 may begin subsequent to the end of the first transmission window 328. For example, the second transmission window 330 may begin at time t11 and may end at time t13. The time t11 may occur a period of time after time t5, the period of time corresponding to a second offset (e.g., 18) of the at least one supplemental channel offset 318.

Each transmission window of the first supplemental channel 308 may include a paging window and a data transmission window. For example, the first transmission window 328 may include a first paging window 332 and a first data transmission window 334. As another example, the second transmission window 330 may include a second paging window 336 and a second data transmission window 338. The first paging window 332 may begin at t5 and may end at t6. The first data transmission window 334 may begin at t6 and may end at t7. The second paging window 336 may begin at t11 and may end at t12. The second data transmission window 338 may begin at t12 and may end at t13. A duration of a paging window, a duration of a data transmission window, or both, may be determined in accordance with a NAN standard or protocol.

As described further below with respect to FIG. 6 and FIG. 8, the second supplemental channel 310 may correspond to a first transmission window 340 and a second transmission window 342. For example, the at least one supplemental channel offset 320 may indicate transmission windows that begin a period of time corresponding to the at least one supplemental channel offset 320 after a beginning of a NAN discovery window, such as the first discovery window 312. In the particular implementation illustrated in FIG. 3, the second supplemental channel 310 may correspond to multiple offsets indicating multiple transmission windows during each discovery period (e.g., the discovery period 316). In an alternate implementation, the second supplemental channel 310 may correspond to a single offset indicating a single transmission window during each discovery period.

The first transmission window 340 associated with the second supplemental channel 310 may begin subsequent to the end of the first discovery window 312. For example, the first transmission window 340 may begin at time t8 and may end at time t10. The time t8 may occur a period of time after time t1, the period of time corresponding to a first offset (e.g., 9) of the at least one supplemental channel offset 320. The second transmission window 342 associated with the second supplemental channel 310 may begin subsequent to the end of the first transmission window 340. For example, the second transmission window 342 may begin at time t14 and may end at time t16. The time t14 may occur a period of time after time t8, the period of time corresponding to a second offset (e.g., 25) of the at least one supplemental channel offset 320.

Each transmission window of the second supplemental channel 310 may include a paging window and a data transmission window. For example, the first transmission window 340 may include a first paging window 344 and a first data transmission window 346. As another example, the second transmission window 342 may include a second paging window 348 and a second data transmission window 350. The first paging window 344 may begin at t8 and may end at t9. The first data transmission window 346 may begin at t9 and may end at t10. The second paging window 348 may begin at t14 and may end at t15. The second data transmission window 350 may begin at t15 and may end at t16. A duration of a paging window, a duration of a data transmission window, or both, may be determined in accordance with a NAN standard or protocol.

During a paging window of the basic communication channel 306, a paging window of the first supplemental channel 308 and/or a paging window of the second supplemental channel 310, the provider logic 130 of the first device 104 may send the paging message 128 via the NAN communication channel 304, the first supplemental channel 308, the second supplemental channel 310, or a combination thereof, as described with reference to FIG. 1. Further, the provider logic 130 of the first device 104 may send the data 122 via a data transmission window of the basic communication channel 306, a data transmission window of the first supplemental channel 308 and/or a data transmission window of the second supplemental channel 310, as described with reference to FIG. 1.

In a particular implementation, the paging message 128 may include an indication of unavailability for the next N logical channels. In this case, the subscriber logic 134 of the second device 106 may refrain from monitoring the next N logical channels of the logical channels 150 of the particular data link group. In some cases, the second device 106 may reduce power consumption by remaining in a low-power operating mode and refrain from waking to monitor the next N logical channels. Alternatively, the second device 106 may perform one or more operations associated with another data link group. In some cases, if the second device 106 subscribes to multiple provider devices, the second device 106 may schedule power save operations and/or concurrency operations based on an intersection of unavailability from each of the multiple provider devices.

In another implementation, the paging message 128 may include an indication of availability for the next N logical channels. The second device 106 may respond to the first device 104, acknowledging receipt of the indication of availability for the next N logical channels. The second device 106 may respond via a PS-POLL message, as a non-limiting example. If the first device 104 receives acknowledgments from each subscriber device, the first device 104 may not send traffic announcements in other logical channels. Instead, the first device 104 may proceed to send data traffic. As such, a number of messages, such as traffic announcement and acknowledgments, in a paging window may be reduced.

Thus, in some cases, the first device 104 and/or the second device 106 may reduce power consumption by performing operations based on the timing windows illustrated in the timing diagram 300. For example, the second device 106 may refrain from monitoring a next N logical channels if the paging message 128 from the first device 104 includes an indication of unavailability for the next N logical channels. In some cases, the second device 106 may reduce power consumption by remaining in a low-power operating mode and refrain from waking to monitor the next N logical channels. In other cases, a number of messages in a paging window may be reduced when subscriber device(s) have received an indication of availability of a provider device in N logical channels.

Figure 4:
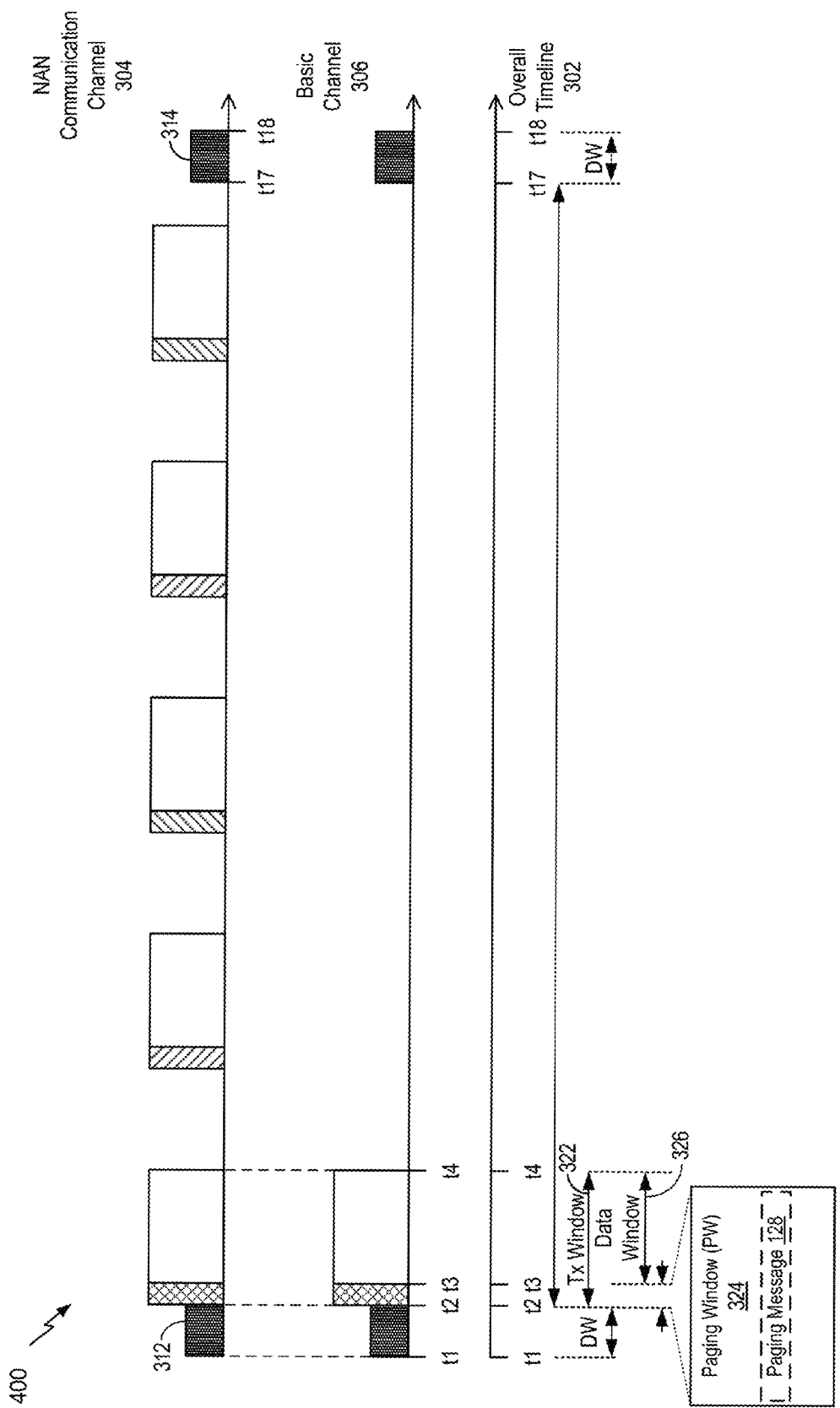
FIG. 4 is a timing diagram corresponding to operation of a particular aspect of the system of FIG. 1.

Referring to FIG. 4, a timing diagram corresponding to a particular portion of the overall timeline 302 of FIG. 3 is shown and generally designated 400. In a particular implementation, the timing diagram 400 may correspond to operation of a particular implementation of the system 100 of FIG. 1. The timing and operations shown in FIG. 4 are for illustration and are not limiting. In other implementations, additional or fewer operations may be performed and the timing may be different.

FIG. 4 illustrates a particular example in which the first paging window 324 associated with the basic communication channel 306 includes the paging message 128, as described with respect to FIG. 1. In this case, the provider logic 130 of the first device 104 may send the paging message 128 via the NAN communication channel 304.

In a particular implementation, the paging message 128 may include an indication of unavailability for the next N logical channels. Referring to FIG. 1, the indication 162 included in the paging message 128 may represent an indication of unavailability of the first device 104 for the next N logical channels 164. In response to receiving the indication 162 of unavailability during the first paging window 324, the subscriber logic 134 of the second device 106 may refrain from monitoring the next N logical channels 164 of the logical channels 150 of the particular data link group, as described with respect to FIG. 2. In some cases, the second device 106 may reduce power consumption by remaining in a low-power operating mode and refrain from waking to monitor the next N logical channels 164. Alternatively, the second device 106 may perform one or more operations associated with another data link group.

As an illustrative, non-limiting example, the subscriber logic 134 of the second device 106 may refrain from monitoring a next four logical channels (i.e., N=4). Referring to FIG. 3, the second device 106 may refrain from monitoring the first supplemental channel 308 during the first paging window 332 (that begins at t5 and ends at t6), refrain from monitoring the second supplemental channel 310 during the first paging window 344 (that begins at t8 and ends at t9), refrain from monitoring the first supplemental channel 308 during the second paging window 336 (that begins at t11 and ends at t12), and refrain from monitoring the first supplemental channel 308 during the second paging window (that begins at t14 and ends at t15).

As a further example, the subscriber logic 134 of the second device 106 may refrain from monitoring the next five logical channels (i.e., N=5). Referring to FIG. 3, the second device 106 may refrain from monitoring the first supplemental channel 308 during the first paging window 332 (that begins at t5 and ends at t6), refrain from monitoring the second supplemental channel 310 during the first paging window 344 (that begins at t8 and ends at t9), refrain from monitoring the first supplemental channel 308 during the second paging window 336 (that begins at t11 and ends at t12), and refrain from monitoring the first supplemental channel 308 during the second paging window (that begins at t14 and ends at t15). Further, while not shown in FIG. 3, the second device 106 may refrain from monitoring the first supplemental channel 308 during a first paging window that occurs after the second discovery window 314. That is, the first device 104 may provide an indication of unavailability for other logical channels that are associated with other discovery period(s) after the discovery period 316 illustrated in FIG. 3.

In another implementation, the paging message 128 may include an indication of availability for the next N logical channels. Referring to FIG. 1, the indication 162 included in the paging message 128 represents an indication of availability of the first device 104 for the next N logical channels 164. The first device 104 may wait to receive acknowledgment(s) from subscriber device(s) that indicate receipt of the indication of availability. The second device 106 may respond to the first device 104, acknowledging receipt of the indication of availability for the next N logical channels. The second device 106 may respond via a PS-POLL message, as a non-limiting example. In response to receiving acknowledgment(s) from each of the subscriber device(s), the first device 104 may not send traffic announcements in other logical channels. Instead, the first device 104 may proceed to send data traffic.

In some cases, the second device 106 may represent a single subscriber to a service provided by the first device 104. In this example, if the first device 104 receives an acknowledgment, such as a PS-POLL message, from the second device 106 within the paging window 324 associated with the basic communication channel 306, the first device 104 may refrain from sending traffic announcements in the next N logical channels.

As an illustrative, non-limiting example, the first device 104 may provide an indication of availability for a next four logical channels (i.e., N=4). In this case, if the first device 104 receives the acknowledgment from the second device 106 within the paging window 324, the first device 104 may refrain from sending traffic announcements in subsequent paging windows associated with the first supplemental channel 308 and the second supplemental channel 310. Rather, the first device 104 may proceed to send the data 122 in the paging window portion of subsequent transmission window(s), rather than just the data window portion of the subsequent transmission window(s). To illustrate, the first device 104 may send the data 122 in the first paging window 332 as well as the first data transmission window 334 of the first transmission window 328. Depending on the amount of data to be sent to the second device 106, the first device 104 may send the data 122 in the first paging window 344 associated with the first transmission window 340 of the second supplemental channel 310, the second paging window 336 associated with the second transmission window 330 of the first supplemental channel 308, and the second paging window 348 associated with the second transmission window 342 of the second supplemental channel 310.

If the first device 104 does not receive the acknowledgment from the second device 106 within the paging window 324, the first device 104 may send another indication of availability in subsequent paging message(s). To illustrate, the provider logic 130 of the first device 104 may generate another paging message 128 to be included in the first paging window 332 of the first transmission window 328 associated with the first supplemental channel 308. In this case, a number of logical channels may be decremented by one. That is, the first device 104 may indicate availability for a next N−1 logical channels. If the first device 104 receives the acknowledgment from the second device 106 within the first paging window 332, the first device 104 may refrain from sending traffic announcements in the next N−1 logical channels. In the event that the acknowledgment is not received, the first device 104 may continue to send the indication of availability in subsequent paging windows. For example, the first device 104 may continue to send the indication of availability during the first paging window 344 associated with the second supplemental channel 310.

Figure 5:
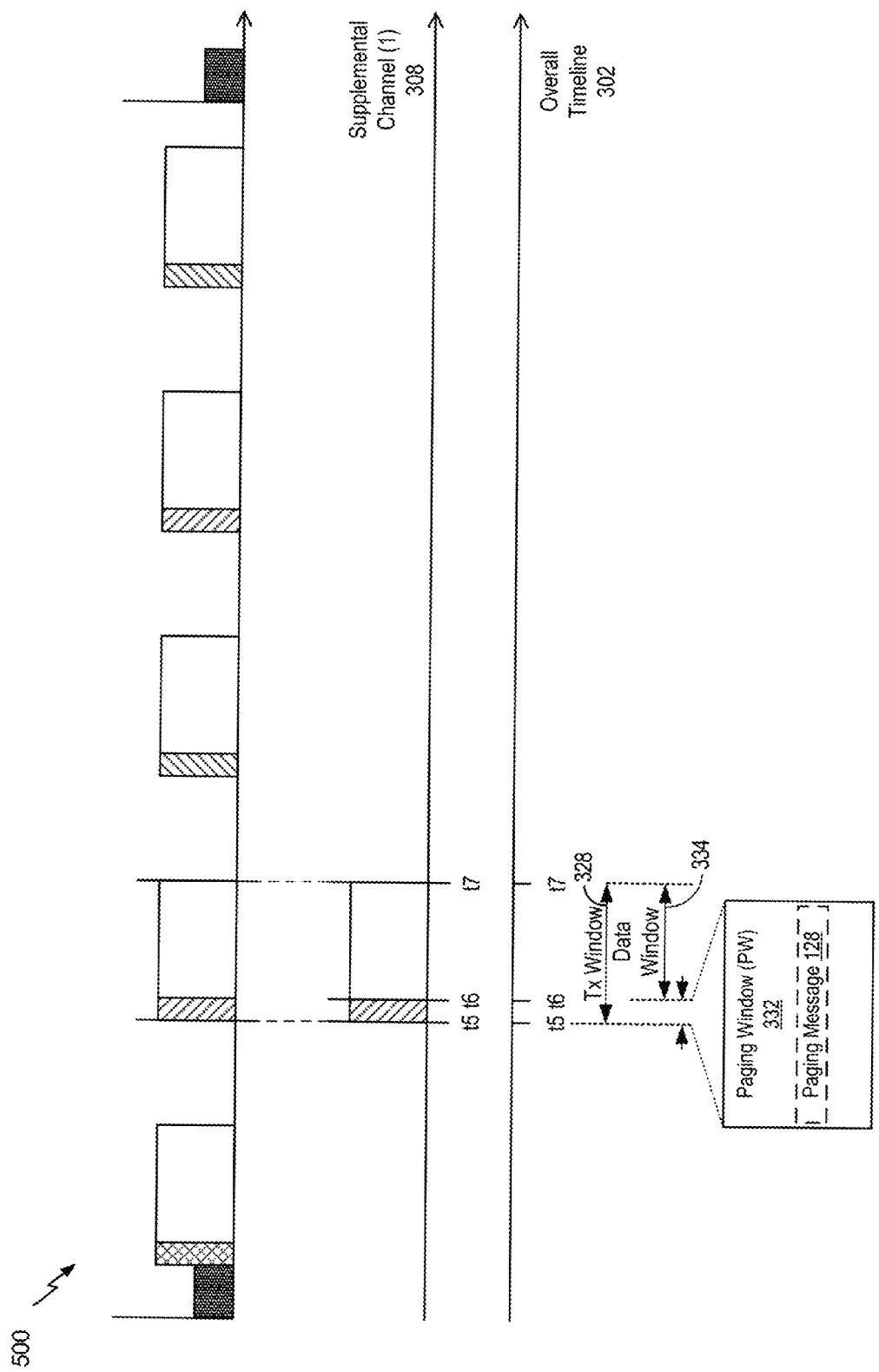
FIG. 5 is a timing diagram corresponding to operation of a particular aspect of the system of FIG. 1.

Referring to FIG. 5, a timing diagram corresponding to a particular portion of the overall timeline 302 of FIG. 3 is shown and generally designated 500. In a particular implementation, the timing diagram 500 may correspond to operation of a particular implementation of the system 100 of FIG. 1. The timing and operations shown in FIG. 5 are for illustration and are not limiting. In other implementations, additional or fewer operations may be performed and the timing may be different.

FIG. 5 illustrates a particular example in which the first paging window 332 associated with the first supplemental channel 308 includes the paging message 128, as described with respect to FIG. 1. In this case, the provider logic 130 of the first device 104 may send the paging message 128 via the first supplemental channel 308.

In a particular implementation, the paging message 128 may include an indication of unavailability for the next N logical channels. Referring to FIG. 1, the indication 162 included in the paging message 128 represents an indication of unavailability of the first device 104 for the next N logical channels 164. In response to receiving the indication 162 of unavailability during the first paging window 332, the subscriber logic 134 of the second device 106 may refrain from monitoring the next N logical channels 164 of the logical channels 150 of the particular data link group, as described with respect to FIG. 2. In some cases, the second device 106 may reduce power consumption by remaining in a low-power operating mode and refrain from waking to monitor the next N logical channels 164. Alternatively, the second device 106 may perform one or more operations associated with another data link group.

As an illustrative, non-limiting example, the subscriber logic 134 of the second device 106 may refrain from monitoring the next three logical channels (i.e., N=3). Referring to FIG. 3, the second device 106 may refrain from monitoring the second supplemental channel 310 during the first paging window 344 (that begins at t8 and ends at t9), refrain from monitoring the first supplemental channel 308 during the second paging window 336 (that begins at t11 and ends at t12), and refrain from monitoring the second supplemental channel 310 during the second paging window 348 (that begins at t14 and ends at t15). In some cases, the second device 106 may conserve power by operating in a low-power operating mode during the three paging windows 344, 336, 348. Alternatively, the second device 106 may perform operation(s) associated with another data link group.

As a further example, the subscriber logic 134 of the second device 106 may refrain from monitoring the next four logical channels (i.e., N=4). Referring to FIG. 3, the second device 106 may refrain from monitoring the second supplemental channel 310 during the first paging window 344 (that begins at t8 and ends at t9), refrain from monitoring the first supplemental channel 308 during the second paging window 336 (that begins at t11 and ends at t12), and refrain from monitoring the second supplemental channel 310 during the second paging window 348 (that begins at t14 and ends at t15). Further, while not shown in FIG. 3, the second device 106 may refrain from monitoring the first supplemental channel 308 during a first paging window that occurs after the second discovery window 314. That is, the first device 104 may provide an indication of unavailability for other logical channels that are associated with other discovery period(s) after the discovery period 316 illustrated in FIG. 3.

In another implementation, the paging message 128 may include an indication of availability for the next N logical channels. Referring to FIG. 1, the indication 162 included in the paging message 128 represents an indication of availability of the first device 104 for the next N logical channels 164. The first device 104 may wait to receive acknowledgment(s) from subscriber device(s) that indicate receipt of the indication of availability. The second device 106 may respond to the first device 104, acknowledging receipt of the indication of availability for the next N logical channels. In response to receiving acknowledgment(s) from each of the subscriber device(s), the first device 104 may not send traffic announcements in other logical channels. Instead, the first device 104 may proceed to send data traffic.

In some cases, the second device 106 may represent a single subscriber to a service provided by the first device 104. In this example, if the first device 104 receives an acknowledgment, such as a PS-POLL message, from the second device 106 within the first paging window 332 associated with the first supplemental channel 308, the first device 104 may refrain from sending traffic announcements in the next N logical channels.

As an illustrative, non-limiting example, the first device 104 may provide an indication of availability for a next N logical channels. In this case, if the first device 104 receives the acknowledgment from the second device 106 within the first paging window 332, the first device 104 may refrain from sending traffic announcements in subsequent paging windows. Rather, the first device 104 may proceed to send the data 122 in the first paging window 344 associated with the first transmission window 340 of the second supplemental channel 310.

If the first device 104 does not receive the acknowledgment from the second device 106 within the first paging window 332, the first device 104 may send another indication of availability in subsequent paging message(s). To illustrate, the provider logic 130 of the first device 104 may generate another paging message 128 to be included in the first paging window 344 of the first transmission window 340 associated with the second supplemental channel 310. In this case, a number of logical channels may be decremented by one. That is, the first device 104 may indicate availability for a next N–1 logical channels. If the first device 104 receives the acknowledgment from the second device 106 within the first paging window 344, the first device 104 may refrain from sending traffic announcements in the next N–1 logical channels. In the event that the acknowledgment is not received, the first device 104 may continue to send the indication of availability in subsequent paging windows. For example, the first device 104 may continue to send the indication of availability during the second paging window 336 associated with the first supplemental channel 308.

Figure 6:
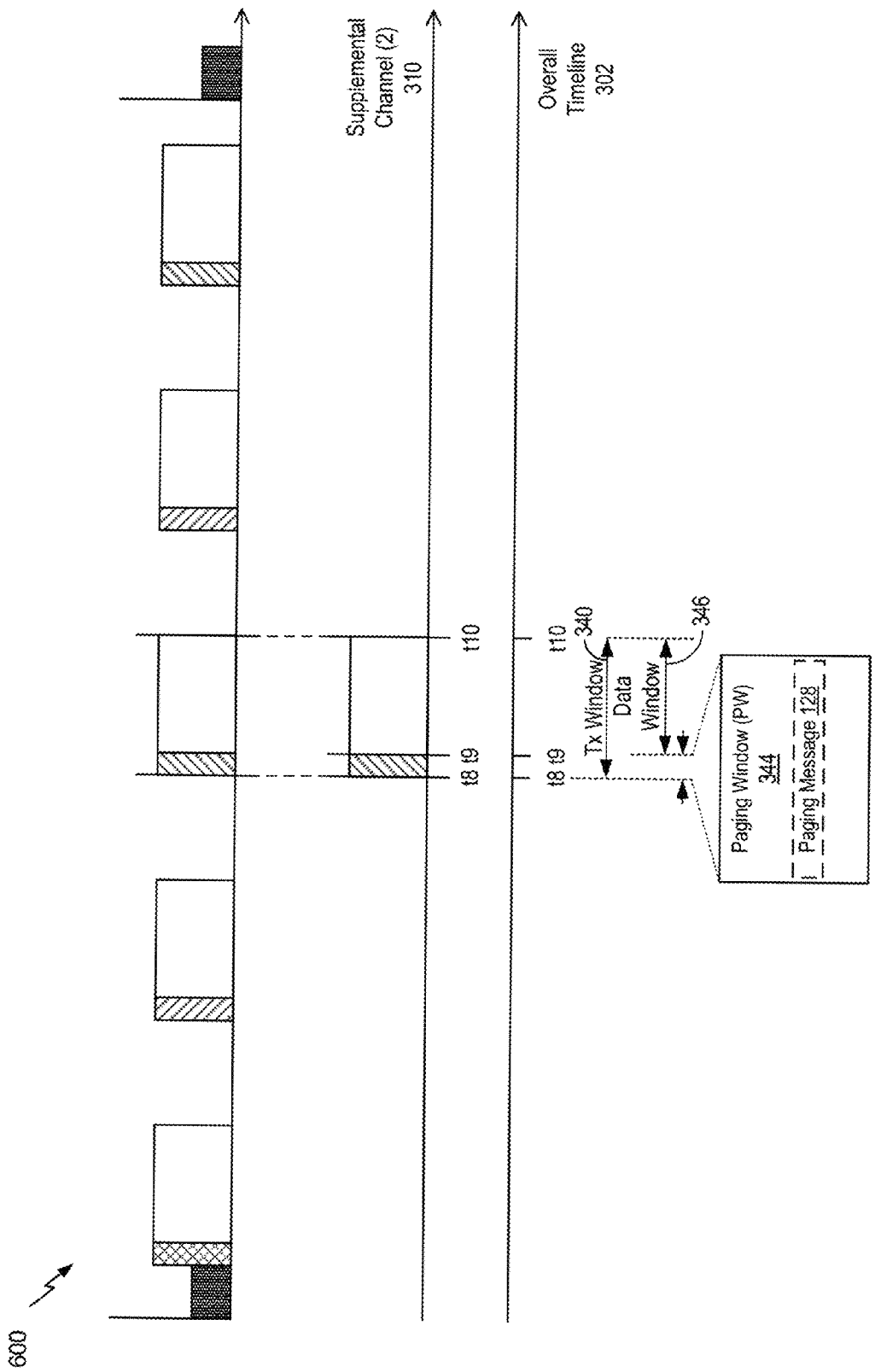
FIG. 6 is a timing diagram corresponding to operation of a particular aspect of the system of FIG. 1.

Referring to FIG. 6, a timing diagram corresponding to a particular portion of the overall timeline 302 of FIG. 3 is shown and generally designated 600. In a particular implementation, the timing diagram 600 may correspond to operation of a particular implementation of the system 100 of FIG. 1. The timing and operations shown in FIG. 6 are for illustration and are not limiting. In other implementations, additional or fewer operations may be performed and the timing may be different.

FIG. 6 illustrates a particular example in which the first paging window 344 associated with the second supplemental channel 310 includes the paging message 128, as described with respect to FIG. 1. In this case, the provider logic 130 of the first device 104 may send the paging message 128 via the second supplemental channel 310.

In a particular implementation, the paging message 128 may include an indication of unavailability for the next N logical channels. Referring to FIG. 1, the indication 162 included in the paging message 128 represents an indication of unavailability of the first device 104 for the next N logical channels 164. In response to receiving the indication 162 of unavailability during the first paging window 344, the subscriber logic 134 of the second device 106 may refrain from monitoring the next N logical channels 164 of the logical channels 150 of the particular data link group, as described with respect to FIG. 2. In some cases, the second device 106 may reduce power consumption by remaining in a low-power operating mode and refrain from waking to monitor the next N logical channels 164. Alternatively, the second device 106 may perform one or more operations associated with another data link group.

As an illustrative, non-limiting example, the subscriber logic 134 of the second device 106 may refrain from monitoring a next two logical channels (i.e., N=2). Referring to FIG. 3, the second device 106 may refrain from monitoring the first supplemental channel 308 during the second paging window 336 (that begins at t11 and ends at t12) and refrain from monitoring the second supplemental channel 310 during the second paging window 348 (that begins at t14 and ends at t15). In some cases, the second device 106 may conserve power by operating in a low-power operating mode during the two paging windows 336, 348. Alternatively, the second device 106 may perform operation(s) associated with another data link group.

As a further example, the subscriber logic 134 of the second device 106 may refrain from monitoring the next three logical channels (i.e., N=3). Referring to FIG. 3, the second device 106 may refrain from monitoring the first supplemental channel 308 during the second paging window 336 (that begins at t11 and ends at t12) and refrain from monitoring the second supplemental channel 310 during the second paging window 348 (that begins at t14 and ends at t15). Further, while not shown in FIG. 3, the second device 106 may refrain from monitoring the first supplemental channel 308 during a first paging window that occurs after the second discovery window 314. That is, the first device 104 may provide an indication of unavailability for other logical channels that are associated with other discovery period(s) after the discovery period 316 illustrated in FIG. 3.

In another implementation, the paging message 128 may include an indication of availability for the next N logical channels. Referring to FIG. 1, the indication 162 included in the paging message 128 represents an indication of availability of the first device 104 for the next N logical channels 164. The first device 104 may wait to receive acknowledgment(s) from subscriber device(s) that indicate receipt of the indication of availability. The second device 106 may respond to the first device 104, acknowledging receipt of the indication of availability for the next N logical channels. In response to receiving acknowledgment(s) from each of the subscriber device(s), the first device 104 may not send traffic announcements in other logical channels. Instead, the first device 104 may proceed to send data traffic.

In some cases, the second device 106 may represent a single subscriber to a service provided by the first device 104. In this example, if the first device 104 receives an acknowledgment, such as a PS-POLL message, from the second device 106 within the first paging window 332 associated with the first supplemental channel 308, the first device 104 may refrain from sending traffic announcements in the next N logical channels.

As an illustrative, non-limiting example, the first device 104 may provide an indication of availability for a next N logical channels. In this case, if the first device 104 receives the acknowledgment from the second device 106 within the first paging window 344, the first device 104 may refrain from sending traffic announcements in subsequent paging windows. Rather, the first device 104 may proceed to send the data 122 in the second paging window 336 associated with the second transmission window 330 of the first supplemental channel 308.

If the first device 104 does not receive the acknowledgment from the second device 106 within the first paging window 344, the first device 104 may send another indication of availability in subsequent paging message(s). To illustrate, the provider logic 130 of the first device 104 may generate another paging message 128 to be included in the second paging window 336 of the second transmission window 330 associated with the first supplemental channel 308. In this case, a number of logical channels may be decremented by one. That is, the first device 104 may indicate availability for a next N−1 logical channels. If the first device 104 receives the acknowledgment from the second device 106 within the second paging window 336, the first device 104 may refrain from sending traffic announcements in the next N−1 logical channels. In the event that the acknowledgment is not received, the first device 104 may continue to send the indication of availability in subsequent paging windows. For example, the first device 104 may continue to send the indication of availability during the second paging window 348 associated with the second supplemental channel 310.

Figure 7:
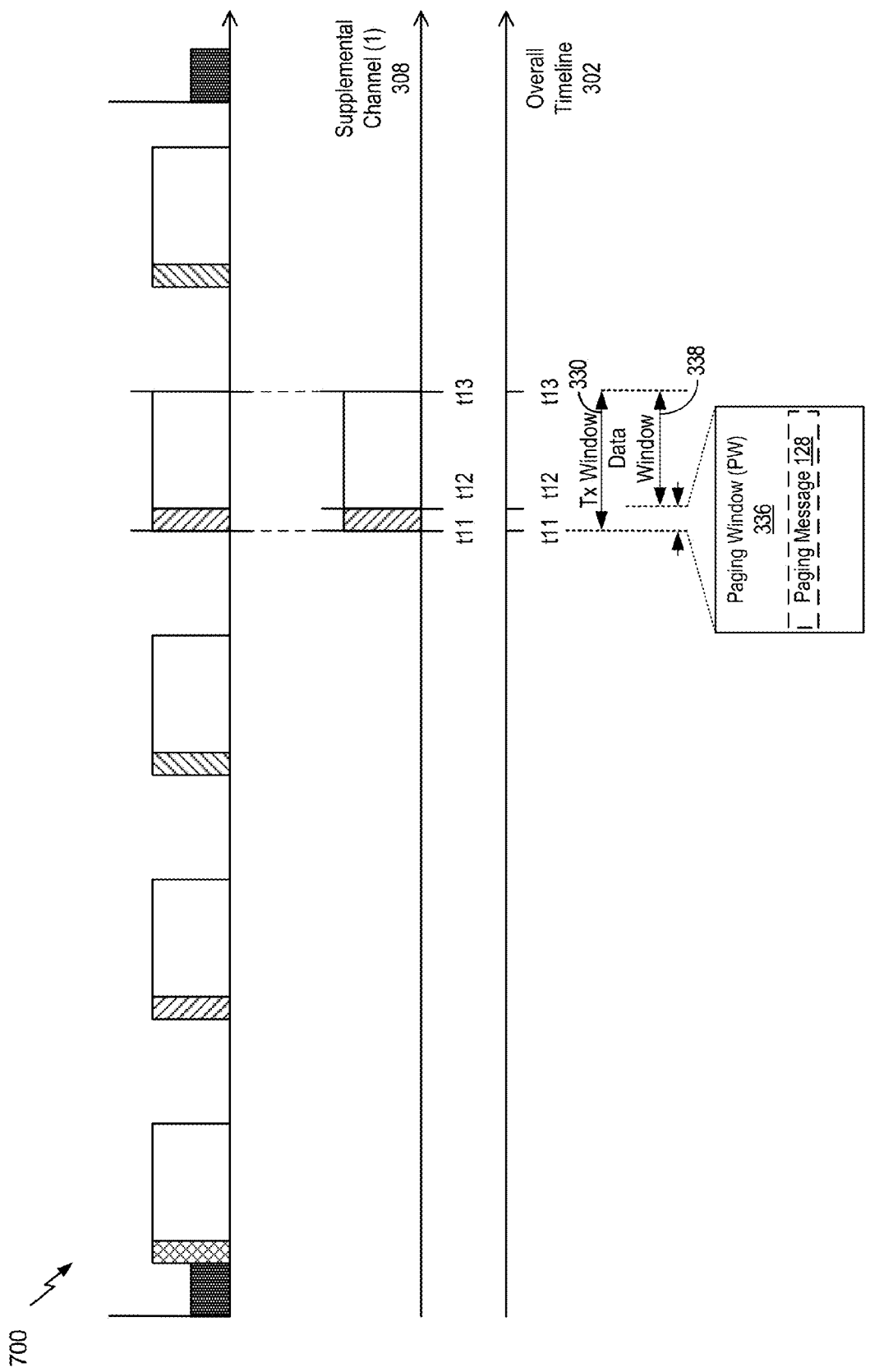
FIG. 7 is a timing diagram corresponding to operation of a particular aspect of the system of FIG. 1.

Referring to FIG. 7, a timing diagram corresponding to a particular portion of the overall timeline 302 of FIG. 3 is shown and generally designated 700. In a particular implementation, the timing diagram 700 may correspond to operation of a particular implementation of the system 100 of FIG. 1. The timing and operations shown in FIG. 7 are for illustration and are not limiting. In other implementations, additional or fewer operations may be performed and the timing may be different.

FIG. 7 illustrates a particular example in which the second paging window 336 associated with the first supplemental channel 308 includes the paging message 128, as described with respect to FIG. 1. In this case, the provider logic 130 of the first device 104 may send the paging message 128 via the first supplemental channel 308.

In a particular implementation, the paging message 128 may include an indication of unavailability for the next N logical channels. Referring to FIG. 1, the indication 162 included in the paging message 128 represents an indication of unavailability of the first device 104 for the next N logical channels 164. In response to receiving the indication 162 of unavailability during the second paging window 336, the subscriber logic 134 of the second device 106 may refrain from monitoring the next N logical channels 164 of the logical channels 150 of the particular data link group, as described with respect to FIG. 2. In some cases, the second device 106 may reduce power consumption by remaining in a low-power operating mode and refrain from waking to monitor the next N logical channels 164. Alternatively, the second device 106 may perform one or more operations associated with another data link group.

In another implementation, the paging message 128 may include an indication of availability for the next N logical channels. Referring to FIG. 1, the indication 162 included in the paging message 128 represents an indication of availability of the first device 104 for the next N logical channels 164. The first device 104 may wait to receive acknowledgment(s) from subscriber device(s) that indicate receipt of the indication of availability. The second device 106 may respond to the first device 104, acknowledging receipt of the indication of availability for the next N logical channels. In response to receiving acknowledgment(s) from each of the subscriber device(s), the first device 104 may not send traffic announcements in other logical channels. Instead, the first device 104 may proceed to send data traffic.

Figure 8:
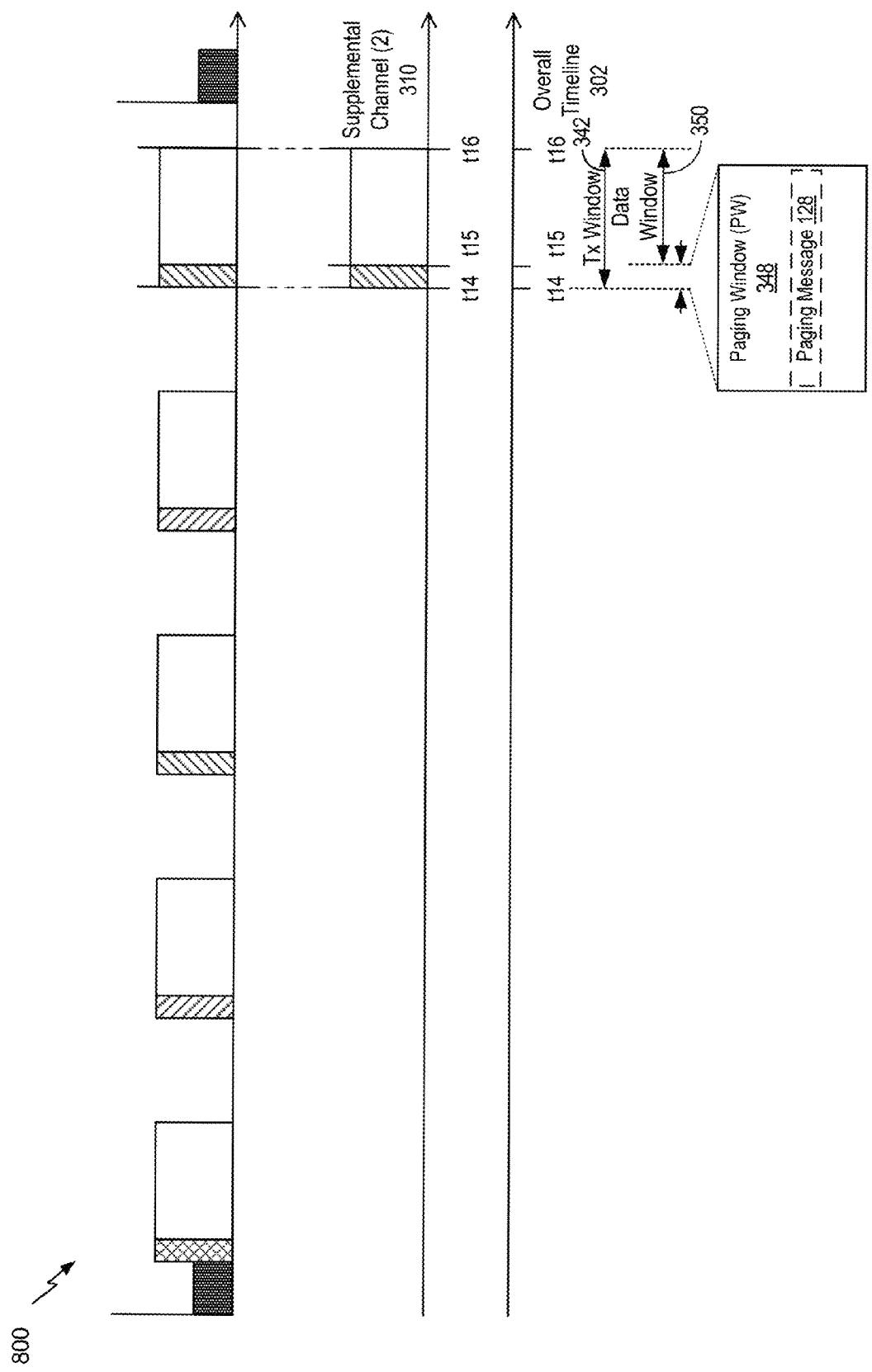
FIG. 8 is a timing diagram corresponding to operation of a particular aspect of the system of FIG. 1.

Referring to FIG. 8, a timing diagram corresponding to a particular portion of the overall timeline 302 of FIG. 3 is shown and generally designated 800. In a particular implementation, the timing diagram 800 may correspond to operation of a particular implementation of the system 100 of FIG. 1. The timing and operations shown in FIG. 8 are for illustration and are not limiting. In other implementations, additional or fewer operations may be performed and the timing may be different.

FIG. 8 illustrates a particular example in which the second paging window 348 associated with the second supplemental channel 310 includes the paging message 128, as described with respect to FIG. 1. In this case, the provider logic 130 of the first device 104 may send the paging message 128 via the second supplemental channel 310.

In a particular implementation, the paging message 128 may include an indication of unavailability for the next N logical channels. Referring to FIG. 1, the indication 162 included in the paging message 128 represents an indication of unavailability of the first device 104 for the next N logical channels 164. In response to receiving the indication 162 of unavailability during the second paging window 348, the subscriber logic 134 of the second device 106 may refrain from monitoring the next N logical channels 164 of the logical channels 150 of the particular data link group, as described with respect to FIG. 2. In some cases, the second device 106 may reduce power consumption by remaining in a low-power operating mode and refrain from waking to monitor the next N logical channels 164. Alternatively, the second device 106 may perform one or more operations associated with another data link group.

In another implementation, the paging message 128 may include an indication of availability for the next N logical channels. Referring to FIG. 1, the indication 162 included in the paging message 128 represents an indication of availability of the first device 104 for the next N logical channels 164. The first device 104 may wait to receive acknowledgment(s) from subscriber device(s) that indicate receipt of the indication of availability. The second device 106 may respond, such as via a PS-POLL message, to the first device 104, acknowledging receipt of the indication of availability for the next N logical channels. In response to receiving acknowledgment(s) from each of the subscriber device(s), the first device 104 may not send traffic announcements in other logical channels. Instead, the first device 104 may proceed to send data traffic.

Figure 9:
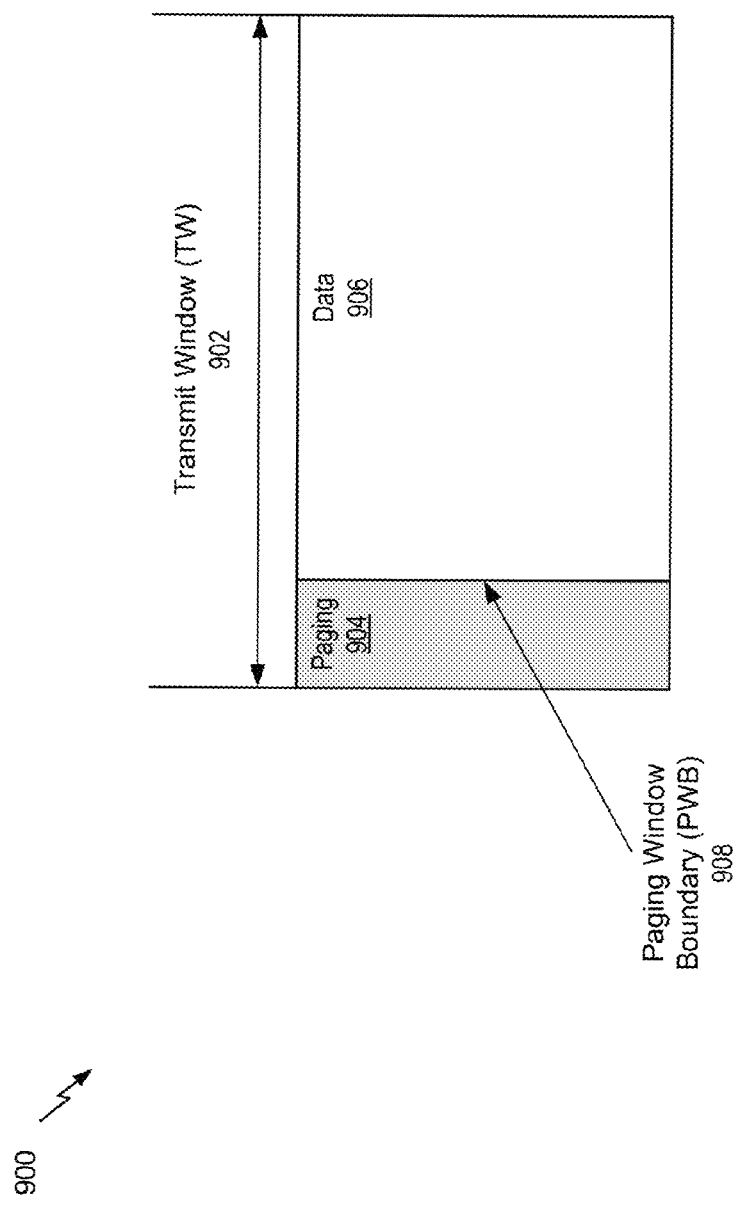
FIG. 9 is a diagram of a particular aspect of a transmit window that includes a paging window boundary (PWB) that separates a paging portion of the transmit window from a data portion of the transmit window.

Referring to FIG. 9, a diagram 900 of an example of a transmit window (TW) 902 is illustrated. FIG. 9 illustrates that the transmit window 902 includes a paging portion 904 and a data portion 906, separated by a paging window boundary (PWB) 908. The paging portion 904 may be a paging window, and the data portion 906 may be a data window. During the paging portion 904, a data source may transmit a paging message. For example, the first device 104 of FIG. 1 may transmit the paging message 128 of FIG. 1. In some cases, during the paging portion 904, the data source may receive a trigger message from a data sink, such as the second device 106 of FIG. 1, indicating that the data sink is ready to receive data. The data portion 906 of the transmit window 902 may be used for transmitting/receiving data, such as the data 122 of FIG. 1. In some cases, a data sink may transmit a trigger message during the data portion 906 and may wait for data transmission.

In some cases, it may be difficult to predict a size for the paging portion 904 of the transmit window 902. To illustrate, in cases where there are a relatively large number of transmitters in a data link group, a relatively large paging window may be appropriate in order to provide each of the transmitters a chance to transmit traffic announcements. That is, if the paging portion 904 of the transmit window 902 is too small, then some of the transmitters may not be able to transmit traffic announcements. In some cases, this may lead to underutilization of the data portion 906 of the transmit window 902 because only a subset of the transmitters that are able to transmit traffic announcements during the paging portion 904 are able to transmit data. By contrast, in cases where there are a relatively small number of transmitters in the data link group, a relatively large paging window may result in underutilization. That is, if the paging portion 904 of the transmit window 902 is too large, each of the transmitters may have adequate time to transmit traffic announcements and receive associated ACKs, and a remainder of the paging portion 904 could be used for data transmission. Accordingly, it may be desirable to utilize a PWB that is large enough to provide each of the transmitters a chance to transmit traffic announcements but that is small enough to reduce potential idle time that could instead be used for data transmissions.

In some cases, a paging window size may be fixed and specified. That is, the PWB 908 may be fixed at a particular time after a start time of the transmit window 902. In this case, devices may be restricted to transmitting paging messages during the paging window, and data transmissions may occur only after the paging window. However, such a scheme may result in a portion of the paging window remaining unused. For example, a portion of the paging window may remain unused in cases when a data link group includes a relatively small number of subscriber devices. That is, the paging window may be underutilized in cases where traffic announcements and associated ACKs have been completed before the PWB 908. The remaining time in the paging portion 904 of the transmit window 902 could be utilized for data transmission instead. Further, one or more devices that are not identified as recipients of data may remain awake, consuming power in order to continue to monitor a particular logical channel.

In other cases, the paging window size may be fixed, but the size may not be specified globally but may instead be determined within the NAN, such as the NAN 102 of FIG. 1. For example, an anchor device may determine the size of the paging window based on a size of the NAN cluster. As another example, a service originator may determine the size of the paging window for a particular service and may adapt the size of the paging window based on a number of consumers of the particular service and/or a number of other services and devices that use the same logical channel.

In some implementations, a size of the paging portion 904 of the transmit window 902 may be adjusted based on a number of data sources, a number of data sinks, a data traffic rate, or a combination thereof. During the paging portion 904 of the transmit window 902, one or more devices may be awake and consuming power in order to monitor a particular logical channel. As such, power consumption by the one or more devices may correlate with the size of the paging portion 904. A relatively large paging portion 904 may increase power consumption and may reduce battery life. Further, time associated with the paging portion 904 of the transmit window 902 represents time that could be allocated to the data portion 906. Accordingly, reducing the size of the paging portion 904 of the transmit window 902 may allow for more time for data transmission.

In some cases, the PWB 908 may be relatively flexible. That is, the PWB 908 may represent an upper boundary on the time of transmission of a paging message (i.e., no paging messages may be sent after the PWB 908). However, on detecting idleness of the medium during the paging time that exceeds a threshold duration, data transmission may begin. In a particular implementation, contention window parameters may be adjusted in order to attain paging window boundary flexibility. For example, one contention window parameter may be used for paging frames, and another contention window parameter may be used for data frames. In some implementations, if there is a very small contention window size for paging messages and ACKs, then the paging messages and the ACKs get priority during the paging window and get sent out much sooner than other transmissions. If there is a large number of transmitting devices during the paging window, then the paging messages and the ACKs likely occupy the full paging window and, once the PWB 908 is hit, devices cease transmission of paging messages and begin data transmissions. If there is a smaller number of transmitting devices during the paging window, then the paging messages get priority and transmission of the paging messages and the ACKs are completed much sooner in the paging window. In this case, there is "idle time" during the paging window, and devices with data to transmit contend for the communication channel and start sending out data during the paging window.

In some cases, the contention window size (or contention parameters) may be adjusted such that paging announcements have a smaller contention size so that paging announcements may start sooner and if there is time remaining after the paging announcements, then data may also be transmitted during the paging window. For example, one contention window parameter ("CW_paging") may be used for paging frames, and another contention window parameter ("FixedCW_data_min, CW_data") may be used for data frames. For sending paging messages, a device may select a backoff window from [0, CW_paging]. For sending data, a device may select a backoff window from [FixedCW_data_min, CW_data] if the device begins contention before the PWB 908, where FixedCW_data_min is greater than CW_paging. As an illustrative, non-limiting example, CW_paging may be 100, while FixedCW_data_min may be 101, and CW_data may be 1000. In this illustrative case, the device may select a first random number between 0 and 100 as the backoff window for paging frames, and the device may select a second random number between 101 and 1000 for data frames.

As a first illustrative example, a device may start contending for the data transmission at the beginning of the transmission window but may cancel the transmission if a trigger message is not received before the backoff window counts down. That is, for every traffic announcement, the transmitter is expecting an acknowledgment, such as a trigger. If the transmitter does not receive the ACK, then the transmitter may not send data (with no corresponding countdown for data). For example, as described above, if the transmitter provides an indication of availability for the next N logical channels and each of the receivers has acknowledged the indication, then when the transmitter has data for each of those receivers, the transmitter may start the data countdown much ahead of time within the paging window instead of waiting to start the countdown until the start of the data window.

As a second illustrative example, a device may start contending for data transmission during the paging window after the transmitter receives the trigger frame. That is, the trigger frame represents the ACK to the paging announcement. Referring to the previous example where the transmitter has provided an indication of availability for the next 4 logical channels, the transmitter may not send out any paging announcements but the transmitter may be in the data contention queue with a slightly higher contention window. As such, once the other transmitters that have paging announcements to send have completed sending announcements, the transmitter may start sending out data because the transmitter may start winning the contention for the communication channel. The PW contention window (e.g., CW_paging) may be smaller, so a countdown may begin sooner to prioritize paging announcements over data transmissions. That is, by selecting a smaller CW size for CW_paging as compared to FixedCW_data_min, paging announcements are prioritized over data. At a start of the paging window, transmitters that have data to send begin counting an associated contention window.

In the event that the device begins contention after the PWB 908, regular data contention parameters may be used, with backoff parameters selected from [0, CW_data]. In the example above, for contention after the PWB 908, the device may select a random number between 0 and 1000 as the backoff window. That is, if the paging window is too crowded and there are a lot of paging messages being transmitted during the paging window, then after the PWB 908, devices may contend for the communication channel using regular data contention parameters. Accordingly, within the paging window, data transmissions may start ahead of time, but the minimum of data contention during the paging window is above the maximum of paging contention (e.g., 101 to 1000). However, in the data window, contention for the communication channel to transmit data begins at the start of the data window and continues until a contention boundary for data transmissions (e.g., from 0 to 1000).

In another particular implementation, a traffic type or traffic category of paging messages may be set to a particular value to prioritize transmission of paging messages. To illustrate, each type of message, such as a paging message, a trigger message, a data frame, or others, may have a traffic category field that indicates a category of the message. For example, each message may include a quality of service (QoS) category. The traffic category (e.g., the QoS category) may indicate a prioritization of the message. As a non-limiting example, the traffic category may have a value selected from a high priority value, a medium priority value, and a low priority value, and the particular message may be prioritized accordingly. In a particular implementation, the traffic category is a QoS category that has defined values, such as in an IEEE or other industry standard or by a vendor, and each value corresponds to a different priority. For example, a voice message may have a higher QoS priority than a data message. To prioritize paging messages, devices may generate paging messages having a highest priority value for the traffic category. Trigger messages may have a lower priority than paging messages, and data messages may have a lower priority than trigger messages. By setting the traffic category to a particular value based on the type of message, transmission of paging messages during a paging window may be prioritized. Additionally, transmission of data during the paging window may be enabled if transmission of other higher priority messages, such as paging messages, is finished.

Figure 10:
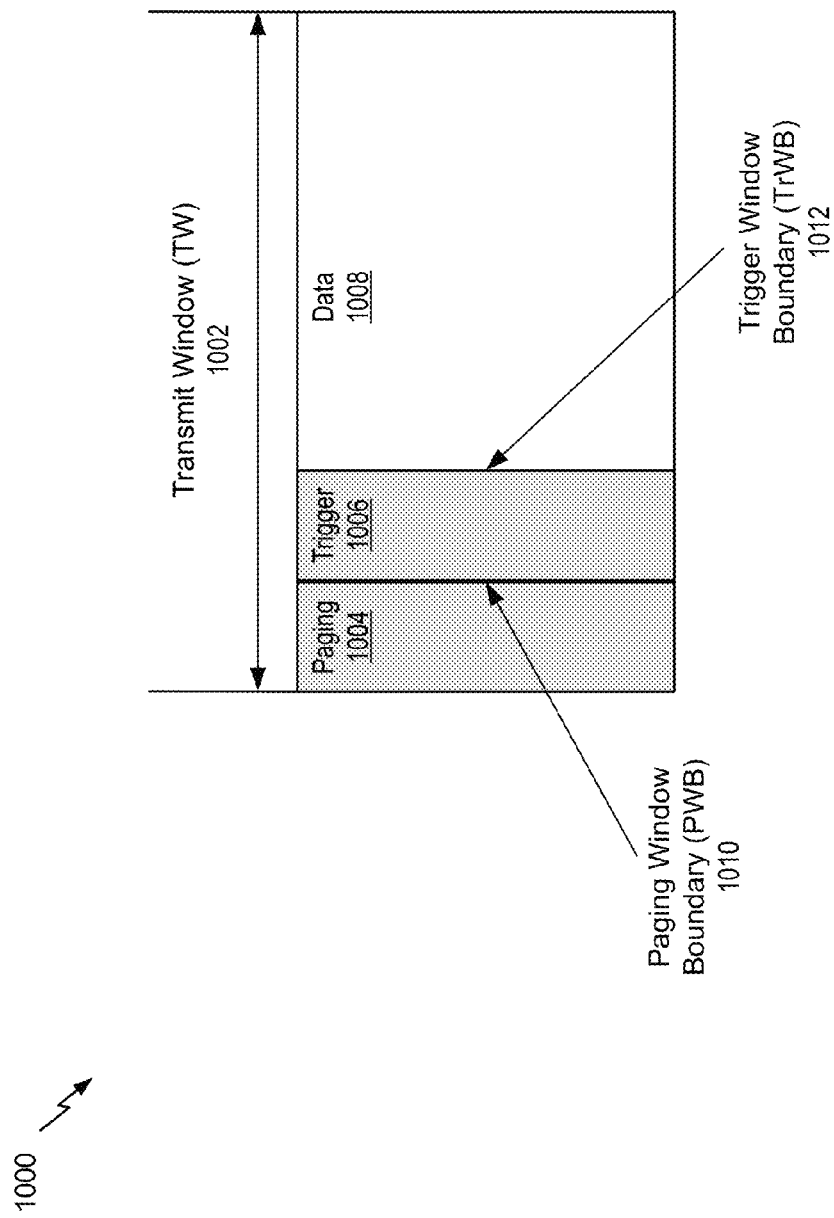
FIG. 10 is a diagram of another aspect of a transmit window that includes a trigger window that is separated from a paging portion of the transmit window by a paging window boundary (PWB) and that is separated from a data portion of the transmit window by a trigger window boundary (TrWB)

Referring to FIG. 10, a diagram 1000 of an alternative design for a transmit window (TW) 1002 is illustrated. FIG. 10 illustrates that the transmit window 1002 may include a paging portion 1004, a trigger portion 1006, and a data portion 1008. The paging portion 1004 may be a paging window, the trigger portion 1006 may be a trigger window, and the data portion 1008 may be a data window. The paging portion 1004 and the trigger portion 1006 are separated by a paging window boundary (PWB) 1010, and the trigger portion 1006 and the data portion 1008 are separated by a trigger window boundary (TrWB) 1012. In FIG. 10, the trigger portion 1006 represents a dedicated time period for a data sink to transmit a trigger message to a data source in response to a paging message from the data source. For example, the trigger portion 1006 represents a time period for the second device 106 to transmit a PS-POLL message to the first device 104 in response to the paging message 128 of FIG. 1.

During the paging portion 1004, a data source, such as the first device 104 of FIG. 1, may transmit a paging announcement to one or more subscriber devices. For example, the first device 104 may transmit a paging announcement to the second device 106. The trigger portion 1006 represents a time period for a subscriber device to reply to the paging announcement with the trigger message. However, in some cases, the subscriber device may be unavailable. For example, the subscriber device may be operating in a low-power mode. Accordingly, the subscriber device may not respond to the paging announcement within the trigger window. Thus, a transmitting device may determine whether there is at least one receiver that is awake and available to receive data based on whether the trigger message is received within the trigger window. In the event that the trigger message is not received within the trigger window, such as a time period between the PWB 1010 and the TrWB

1012, the transmitting device may transition to a low-power operating mode for a remainder of the transmit window 1002.

In some implementations, the order in which the receiving devices send trigger frames may be determined based on an order in which the receiving devices appear in the paging announcement. In the case of a TIM, the order may be determined by a bit order of AID. This arrangement may reduce contention in the trigger window among the receiver devices that are attempting to acknowledge the paging announcement from the transmitting device. In some cases, in the event that a first receiver device is unavailable, there may be a threshold period after which a second receiver device may respond with a trigger frame. That is, the second receiver device may wait for a threshold period of time for the first receiver device to ACK the paging announcement, and if the first receiver device does not respond within the threshold period of time, the second receiver device may send a trigger frame.

One potential advantage associated with the transmit window 1002 illustrated in FIG. 10 is that a size of the paging window may be relatively small. The number of devices that are able to transmit paging announcements may be limited due to the unlikelihood of a provider device transmitting a paging announcement and the subscriber device acknowledges the announcement but the provider device does not have enough time to send out data as a result of too many devices competing to announce traffic while the data window is too small to accommodate data transmission from all of the provider devices. By contrast, in alternative arrangements, there may be several provider devices that remain awake during the transmit window 1002 but that are unable to send or receive data.

As an illustrative example, five devices may transmit a paging announcement, with eight receiver devices identified for each of the five transmitting devices. However, the data window may not be large enough to accommodate forty data transmissions. Accordingly, it may be advantageous to reduce the size of the paging window. To illustrate, three of the five transmitting devices may transmit paging announcements to the eight receiver devices. However, instead of receiving twenty-four ACKs (i.e., an ACK to the three transmitting devices from all eight receiver devices), there may be twenty ACKs received. In this case, there may be twenty data transmissions in the data window. That is, the devices that are not able to acknowledge the announcement in the trigger window may transition to a low-power operating mode, thereby conserving battery life. Thus, rather than forty receiving devices remaining awake and reducing battery life, only twenty receiving devices remain awake while the other twenty receiving devices may conserve battery life.

In some implementations, un-used time associated with the trigger window may be reclaimed for data transmission. For example, contention window parameters may be adjusted to prioritize the ACKs, such as PS-POLL messages, while allowing data transmission to begin before the TrWB 1012 in the event that idle time is detected during the trigger window. In a particular implementation, one contention window parameter (e.g., "CW_Trigger") may be used for trigger frames, and another contention window parameter (e.g., "FixedCW_data_min, CW_data") may be used for data frames. For sending trigger messages, a device may select a backoff window from [0, CW_Trigger]. For sending data, a device may select a backoff window from [Fixed-CW_data_min, CW_data] if the device begins contention before the TrWB 1012, where FixedCW_data_min is greater than CW_Trigger.

Further, in some implementations, un-used time associated with the paging window may be reclaimed for trigger message transmission. For example, one contention window parameter (e.g., "CW_paging") may be used for paging frames, and another contention window parameter (e.g., "FixedCW_Trigger_min, CW_Trigger") may be used for trigger frames. For sending paging messages, a device may select a backoff window from [0, CW_paging]. For sending trigger messages, a device may select a backoff window from [FixedCW_Trigger_min, CW_Trigger] if the device begins contention before the PWB 1010, where Fixed-CW_Trigger_data_min is greater than CW_paging.

Transmitters may announce in advance whether they are available or unavailable, but the receivers may not have such a capability. Accordingly, in some implementations, because the availability of a particular receiver is not known until an ACK is received, devices having traffic for multiple recipients may over-book or over-subscribe by advertising for several receivers during the paging window. To illustrate, a transmitter may determine beforehand that a data transmission time may allow for transmission to five receivers. However, the transmitter may not be able to determine whether each of five receivers are available or unavailable. Accordingly, if the transmitter has traffic for more than five receivers (e.g., ten receivers), the transmitter may announce traffic for all ten of the receivers. The transmitter may then wait to determine how many of the ten receivers respond with trigger frames. The transmitter may then schedule traffic for only five of the receivers or for eight of the receivers, depending on how many respond with trigger frames. If the transmitter announces traffic for only five of the receivers (based on the known capacity of the data transmission window), and only three of the receivers acknowledge the announcements with trigger frames, then there may be underutilization of the data window.

In some cases, paged devices may respond during the trigger window by sending a PS-POLL message, a QoS Null frame or via some other mechanism. The transmitter may acknowledge each trigger message. However, if a number of trigger messages exceeds a particular value, the transmitter may not acknowledge additional trigger messages. For example, the transmitter may determine that a size of the transmission window is insufficient to send data to each device of a plurality of devices that sent a trigger message. The transmitter may send one or more acknowledgements of the trigger messages based on the determination that the size of the transmission window is insufficient to send data to each device that sent a trigger message. For example, the transmitter may acknowledge receipt of each of the trigger messages but not send data during the data window. In another example, the transmitter may acknowledge receipt of trigger messages from receivers to which data will be sent during the data window and may not acknowledge trigger messages from receivers to which no data will be sent during the data window. In another example, the transmitter may acknowledge receipt of each of the trigger messages and may indicate in the some of the acknowledgements that data will not be sent to a particular receiver during the data window. To illustrate, in an acknowledgement to a trigger message from a particular receiver, a value of a bit of the acknowledgement may be set to a value that indicates to the particular receiver that no data will be sent to the particular receiver during the data window. In response to receiving an acknowledgement indicating that data will not be sent during the data window or in response to not receiving an acknowledgement within a particular time period, the receiver may transition to a low-power operating mode, or the receiver may participate in some other network depending on whether this is the only transmitter that the receiver is waiting on.

Figure 11:
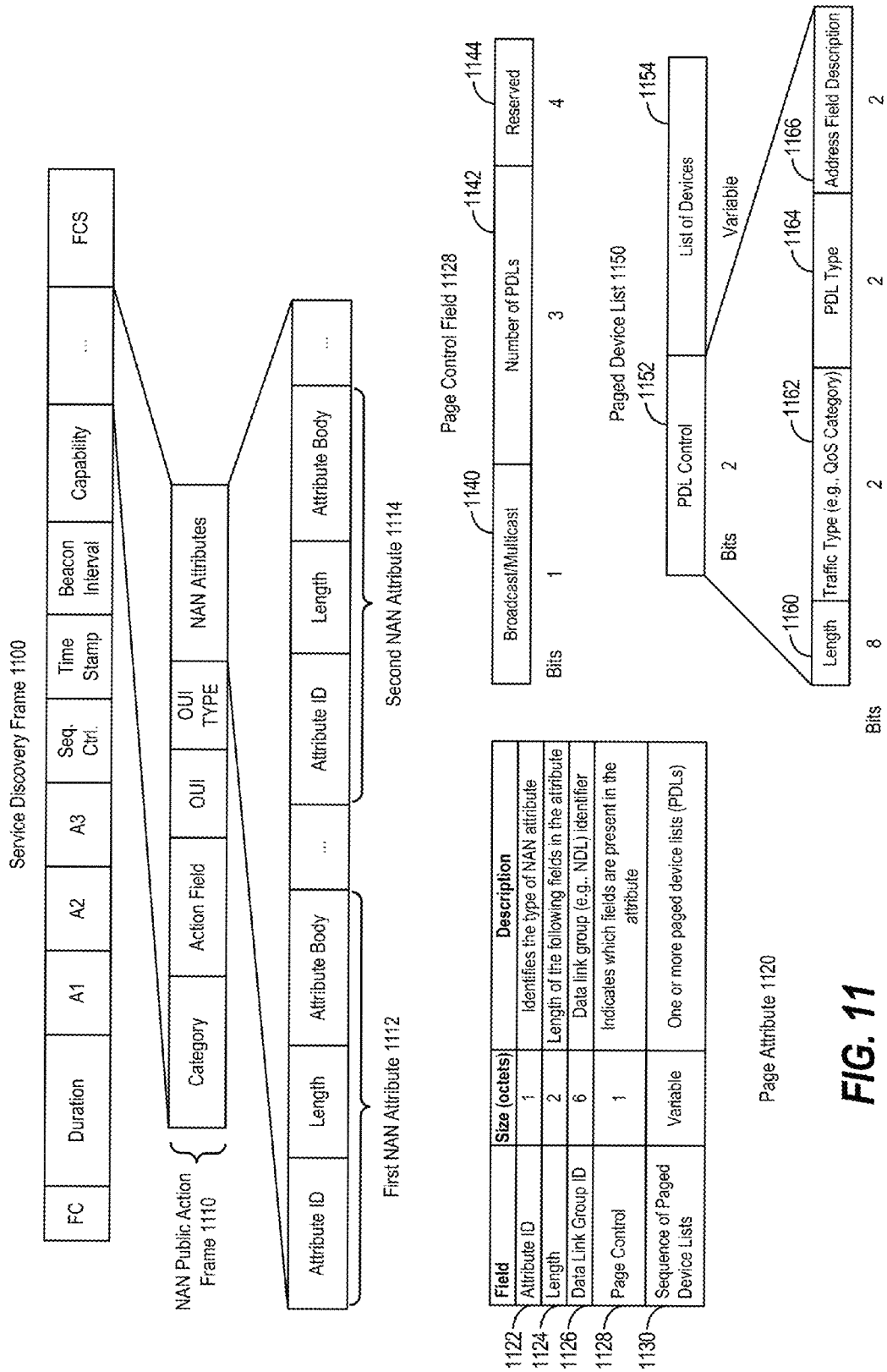
FIG. 11 is a diagram of an example of a service discovery frame that includes an illustrative page attribute having a paged device list (PDL)

Referring to FIG. 11, a diagram of an example of a service discovery frame (SDF) 1100 that includes an attribute having a paged device list (PDL) is shown. In a particular implementation, the SDF 1100 may include or correspond to the paging message 128 of FIG. 1. The SDF 1100 may include header fields, such as a frame check (FC) field, a duration field, address fields A1, A2, and A3, a sequence control (seq. ctl.) field, a time stamp field, a beacon interval field, a capability field, a frame check sequence (FCS) field, or a combination thereof. In some implementations, the A1 field may be the receiver address field that has the particular receiver address value 170, as described with reference to FIG. 1. Additionally, the A3 field may indicate a NAN cluster ID. In a particular implementation where the particular receiver address value 170 is the NAN cluster ID, the A1 field and the A3 field may have the same value.

The SDF 1100 may further include a NAN public action frame 1110. Although described as a NAN public action frame, in other implementations, the NAN public action frame 1110 may be a NAN action frame. Additionally, the service discovery frame may include a NAN information element (not illustrated). The NAN public action frame 1110 may include a category field, an action field, an organizationally unique identifier (OUI), an OUI type field, or a combination thereof. The NAN public action frame 1110 may also include one or more attributes referred to as NAN attributes.

In the illustrated example, the one or more NAN attributes include a first NAN attribute 1112 and a second NAN attribute 1114. Although two NAN attributes are illustrated, in other implementations the NAN public action frame 1110 may include more than two NAN attributes or a single NAN attribute. In a particular implementation, the first NAN attribute 1112 may correspond to data having a first type, and the second NAN attribute 1114 may correspond to data having a second type. In other implementations, the NAN attributes may be different types of attributes, such as service attributes or NAN data link (NAN-DL) attributes.

In some implementations, the first NAN attribute 1112, the second NAN attribute 1114, or both, may be a page attribute 1120. In some implementations, the page attribute 1120 includes each of the fields illustrated in FIG. 11. In other implementations, the page attribute 1120 may include more fields or fewer fields than illustrated in FIG. 11, and the fields of the page attribute 1120 may be arranged in a different arrangement or order. The page attribute 1120 may include an attribute ID field 1122 that includes a particular identifying value. The particular identifying value may identify an attribute as a page attribute. To illustrate, a message, such as the SDF 1100, may include attributes selected from a plurality of attribute types. An attribute having the particular identifying value for the attribute ID field 1122 may be identified as a page attribute.

The page attribute 1120 may include a length field 1124 that includes a value identifying a length of the page attribute 1120. The page attribute 1120 may also include a data link group ID field 1126 that includes a value that identifies the data link group. In a particular implementation, the particular receiver address value 170 may be the value of the data link group ID field 1126. The data link group ID field 1126 may also be referred to as a NDL identifier.

The page attribute 1120 further includes a page control field 1128 and a sequence of paged device lists (PDLs) 1130. The page control field 1128 indicates information related to the page attribute 1120. A first bit 1140 of the page control field 1128 may indicate whether the data corresponding to the sequence of PDLs 1130 is multicast data or unicast data. A set of bits 1142 of the page control field 1128 may indicate a number of PDLs in the sequence of PDLs 1130. Additional bits 1144 of the page control field 1128 may be reserved. In other implementations, the bits in the page control field 1128 may be divided differently.

The sequence of PDLs 1130 may include a PDL 1150. In some implementations, the sequence of PDLs 1130 may include multiple PDLs. The PDL 1150 may include a PDL control field 1152 and a list of devices 1154. The PDL control field 1152 may include a first set of bits 1160, a second set of bits 1162, a third set of bits 1164, and a fourth set of bits 1166. The first set of bits 1160 may indicate a length of the PDL 1150 (or a length of the list of devices 1154). The second set of bits 1162 may indicate a type of the data scheduled for transmission to devices included in the list of devices 1154. For example, the second set of bits 1162 may indicate voice traffic, packet data traffic, video traffic, or other types of traffic. In some implementations, the second set of bits 1162 indicates a quality of service (QoS) category corresponding to the data. The third set of bits 1164 may indicate a type of the PDL 1150 (e.g., a type of the list of devices 1154). For example, the third set of bits 1164 may indicate whether the list of devices 1154 is indicated by a TIM, a Bloom filter, or a list of MAC addresses. The fourth set of bits 1166 may indicate information related to the list of devices 1154, as further described herein.

To illustrate the indications provided by the third set of bits 1164, if the third set of bits 1164 has a value of 00, the list of devices 1154 is indicated by a list of MAC addresses. If the third set of bits 1164 has a value of 01, the list of devices 1154 is indicated by a Bloom filter. If the third set of bits 1164 has a value of 10, the list of devices 1154 is indicated by a TIM. The values 101-111 for the third set of bits 1164 may be reserved. The fourth set of bits 1166 may indicate different information based on the value of the third set of bits 1164. To illustrate, if the third set of bits 1164 has the value of 00, the fourth set of bits 1164 indicates whether the list of devices 1154 includes six octets (the entire MAC address), one octet, two octets, or four octets of each MAC address. If the third set of bits 1164 has the value 01, the fourth set of bits 1166 indicates the Bloom filter index of the Bloom filter. If the third set of bits 1164 has the value 10, the fourth set of bits 1166 is a bitmap control field that indicates an offset corresponding to the TIM. Although particular values of the third set of bits 1164 and the fourth set of bits 1166 have been described, the description is not limiting. In other implementations, the above-described indications may correspond to different values of the third set of bits 1164 and the fourth set of bits 1166, or the sets of bits may indicate other information.

The list of devices 1154 may have a variable size and may indicate a subset of devices that are scheduled to receive traffic from a device that is transmitting the SDF 1100. The list of devices 1154 may be indicated by a TIM, a Bloom filter, or a list of MAC addresses. The list of devices 1154 may identify each device of the subset of devices described with reference to FIG. 1.

Thus, FIG. 11 illustrates a particular attribute that may be included in a frame, such as the SDF 1100, to indicate a list of devices that are scheduled to receive traffic. If more than one type of traffic is scheduled for transmission, the page attribute 1120 include may include multiple PDLs, and each PDL of the multiple PDLs may correspond to a different type of traffic. Thus, different types of traffic may be scheduled for transmission to different devices using one attribute or multiple attributes.

Referring to FIG. 12, a diagram of a second illustrative page attribute 1200 including a PDL and an illustrative traffic announcement attribute 1230 including a PDL is depicted. Although the page attribute 1200 and the traffic announcement attribute 1230 are illustrated in FIG. 12 as including particular fields, the illustration is not limiting. In other implementations, the frames of the page attribute 1200 or the traffic announcement attribute 1230 may be arranged in a different order, and/or the page attribute 1200 and the traffic announcement attribute 1230 may include fewer or more frames than illustrated in FIG. 12.

The page attribute 1200 and the traffic announcement attribute 1230 represent other implementations of attributes that may include a PDL (or a different traffic indicator) for use in a paging message, such as the paging message 128 of FIG. 1. In some implementations, the first NAN attribute 1112, the second NAN attribute 1114, or both may include either the page attribute 1200 or the traffic announcement attribute 1230 instead of the page attribute 1120 of FIG. 11.

The page attribute 1200 may include an attribute ID field 1202. The page attribute 1200 may include a length field 1204 that includes a value identifying a length of the page attribute 1200. The page attribute 1200 may also include a data link group ID field 1206 that includes a value that identifies the data link group. In a particular implementation, a particular receiver address value that identifies a message as a paging message may be the value of the data link group ID field 1206. The data link group ID field 1206 may also be referred to as a NAN data link (NDL) identifier.

The page attribute 1200 further includes a page control field 1208 and a PDL 1210. The page attribute 1200 optionally includes a traffic type indicator 1212. The page control field 1208 indicates information related to the page attribute 1200. A first set of bits 1220 of the page control field 1208 may indicate a type of list of the paged device list 1210 (e.g., a type of traffic indicator), as further described herein. In a particular implementation, the first set of bits 1220 includes three bits. A second set of bits 1222 of the page control field 1208 may indicate whether the traffic type indicator 1212 is included in the page attribute 1200. A third set of bits 1224 of the page control field 1208 may be reserved. In other implementations, the bits in the page control field 1208 may be divided differently.

To illustrate the indications provided by the first set of bits 1220, if the first set of bits 1220 has a first particular value, the data scheduled for transmission by the device that sends the message including the page attribute 1200 is multicast data. In a particular implementation, if the data is multicast data, the PDL 1210 may not be included in the page attribute 1200. In this case, each device that receives the message including the page attribute 1200 may remain in an active operating mode based on detecting that the first set of bits 1220 of the page control field 1208 has the first particular value. If the first set of bits 1220 has a second particular value, the data may be unicast data and the PDL 1210 may be indicated by a TIM. If the first set of bits 1220 has a third particular value, the data may be unicast data and the PDL 1210 may be indicated by a Bloom filter. If the first set of bits 1220 has a fourth particular value, the data may be unicast data and the PDL 1210 may be indicated by a list of MAC addresses. If the first set of bits 1220 has a fifth particular value, the first set of bits 1220 indicates that a new common group key (CGK) has been generated by a device of the data link group. In this case, the PDL 1210 includes a MAC address (or other identifier) of the device that generated the CGK, and if the traffic type indicator 1212 is included in the page attribute 1200, the traffic type indicator 1212 indicates a highest priority traffic type. For example, the traffic type indicator 1212 may indicate a highest QoS category corresponding to the traffic.

The PDL 1210 may have a variable size and may indicate a subset of devices that are scheduled to receive traffic from a particular device. The PDL 1210 may be indicated by a TIM, a Bloom filter, or a list of MAC addresses. The PDL 1210 may identify each device of the subset of devices described with reference to FIG. 1.

The traffic announcement attribute 1230 may include an attribute ID field 1232. The traffic announcement attribute 1230 may include a length field 1234 that includes a value identifying a length of the traffic announcement attribute 1230. The traffic announcement attribute 1230 may also include a data link group ID field 1236 that includes a value that identifies the data link group. In a particular implementation, a particular receiver address value that identifies a message as a paging message may be the value of the data link group ID field 1236. The data link group ID field 1236 may also be referred to as a NDL identifier.

The traffic announcement attribute 1230 further includes a PDL 1238. The PDL 1238 may be represented by a type length value (TLV) field. A type field of the TLV field may indicate the type of the PDL 1238, such as a TIM, a Bloom filter, or a list of MAC addresses. The length field of the TLV field may indicate a length of a value field of the TLV field. The value field includes the list of devices. In some implementations, the traffic announcement attribute 1230 also includes a traffic type indicator that indicates a type of traffic scheduled for transmission to devices of the PDL 1238.

Thus, FIG. 12 illustrates two attributes that may be included in a frame, such as a SDF or a management frame, to indicate a list of devices that are scheduled to receive traffic. If more than one type of traffic is scheduled for transmission, the frame may include multiple attributes, and each attribute of the multiple attribute correspond to a different type of traffic. For example, the frame may include multiple page attributes 1200 or multiple traffic announcement attributes 1230. Devices that receive the frame may process the multiple attributes to determine whether traffic is scheduled for transmission and a type of traffic that is scheduled.

Figure 13:
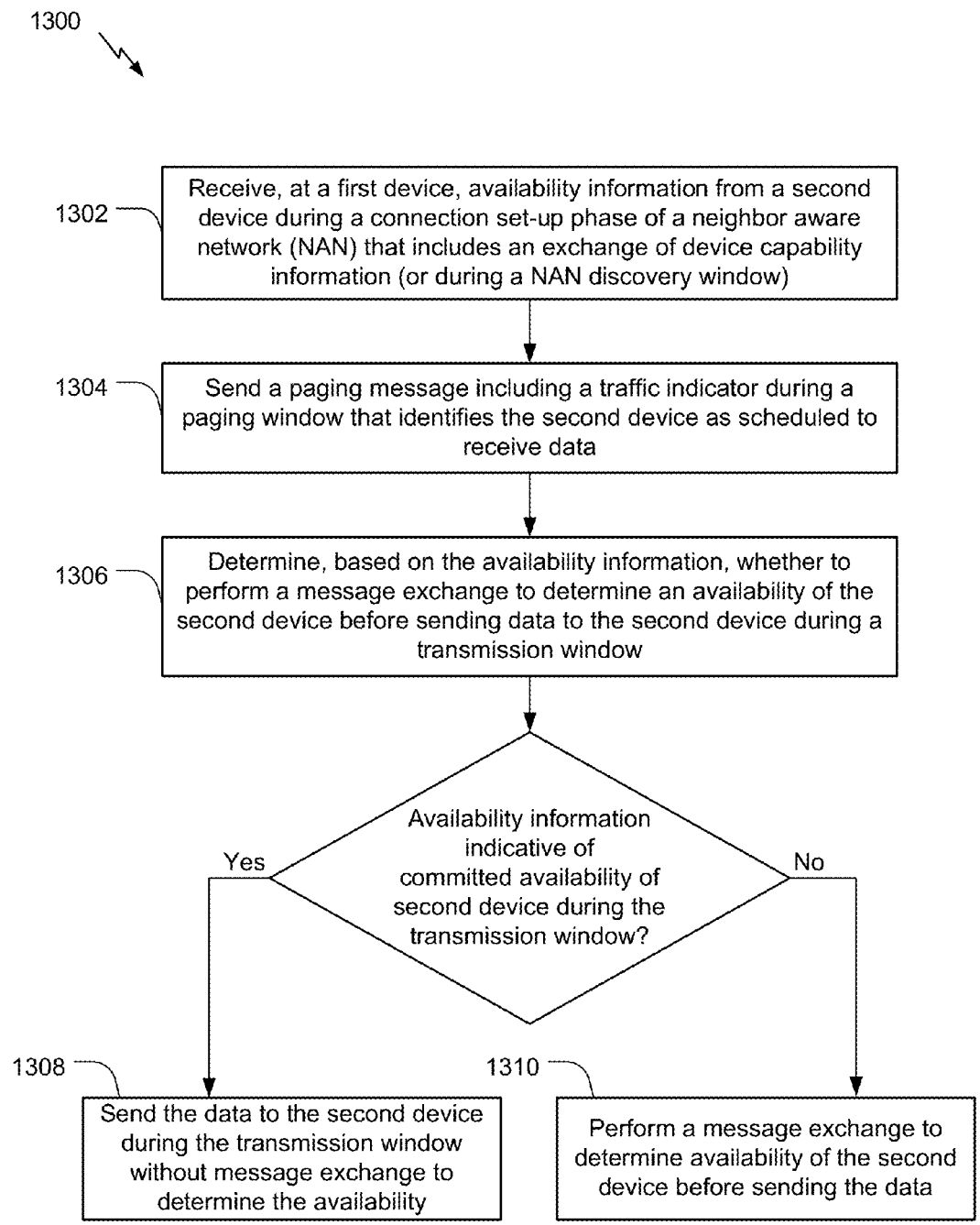
FIG. 13 is a flow diagram of a method of operation at a device of the system of FIG. 1.

Referring to FIG. 13, a particular implementation of a method of operation is shown and generally designated 1300. In a particular implementation, the method 1300 may be performed by the provider logic 130 of at least one of the devices 104, 106, 108, and 110 of the system 100 of FIG. 1.

The method 1300 includes receiving, at a first device, availability information from a second device during a connection set-up phase of communication of a NAN (or during a NAN discovery window), at 1302. The connection set-up phase includes an exchange of device capability information. For example, referring to FIG. 1, the first device 104 (e.g., a provider device) may receive the availability information 116 from the second device 106 (e.g., a subscriber device) during the association phase of communication of the NAN 102 that includes the exchange of the capability information 114. In some implementations, the connection set-up phase includes an association phase. In other implementations, the connection set-up phase includes a negotiation phase. In a particular implementation, the second device 106 joins the data link group during the association phase, and the data link group includes the first device 104 and one or more other devices.

The method 1300 includes sending a paging message including a traffic indicator during a paging window, at 1304. The traffic indicator identifies the second device as scheduled to receive data. For example, referring to FIG. 1, the first device 104 may send the paging message 128 to the second device 106 during a paging window. The paging message 128 may include a traffic indicator that identifies the second device 106 as scheduled to receive data. The traffic indicator may include a traffic indication map (TIM), a Bloom filter, a list of media access control (MAC) addresses, a list of partial MAC addresses, or a list of hashes of MAC addresses, as non-limiting examples.

The method 1300 includes determining, based on the availability information, whether to perform a message exchange to determine an availability of the second device before sending data to the second device during a transmission window, at 1306. For example, referring to FIG. 1, the first device 104 may determine, based on the availability information 116 received from the second device 106 during the association phase, whether to wait to receive the trigger frame 182 from the second device 106 before sending the data 122 to the second device during a transmission window. As another example, referring to FIG. 1, the first device 104 may determine, based on the availability information 116, whether to determine the availability of the second device by sending a PS-POLL message, a quality of service (QoS) NULL message (or a quality of service (QoS) NULL frame), an ATIM message, an action frame, or another unicast message. In some implementations, the data 122 may be sent during a data window. In other implementations, the data 122 may be sent before a beginning of a data window, such as during the paging window or during a trigger window.

In the particular implementation illustrated in FIG. 13, the method 1300 includes sending the data from the first device to the second device during the transmission window without performing a message exchange to determine the availability of the second device responsive to determining that the availability information (received during the association phase of the NAN) indicates that the second device is available during a transmission window of a data link group of the NAN, at 1308. For example, referring to FIG. 1, the availability information 116 may provide an indication to the first device 104 that the second device 106 is dedicated to be available (e.g., "always" available) for communication during data windows of the NAN 102, and the first device 104 may refrain from performing a message exchange to determine the availability of the second device 106, such as via a polling mechanism or a trigger mechanism, before sending the data 122 to the second device 106 (during the transmission window).

FIG. 13 further illustrates that in response to determining that the availability information is not indicative of availability of the second device during the transmission window, the method 1300 may include performing a message exchange to determine that the second device is available before sending the data, at 1310. For example, referring to FIG. 1, the availability information 116 may provide an indication to the first device 104 that the second device 106 is not dedicated to be available (e.g., is not "always" available) for communication during transmission windows of the data link group of the NAN 102 or that the second device 106 "prefers" to be polled and to respond with an indication of availability to receive the data 122 during the transmission window. In this case, the first device 104 may poll the second device 106 and may wait for a response from the second device 106 before sending the data 122. As another example, the second device 106 may provide an indication that the second device 106 "prefers" to send a trigger frame to provide an indication of availability to receive the data 122 during the transmission window.

In a particular implementation, the availability information may include a particular field having a single bit, and a value of the particular field indicates whether the second device is available during a data window of the data link group of the NAN. For example, the indication 162 of FIG. 1 may identify dedicated availability (or unavailability) via a bit value of a particular bit in the indication 162. Additionally or alternatively, the availability information may include a particular bit field having multiple bits, and a value of the particular bit field indicates whether the second device is available during each data window corresponding to a data link group that includes the first device. For example, the availability information 116 of FIG. 1 may be a field that includes multiple bits and that provides an indication corresponding to an "always" available status, a "prefer to be polled" status, or a "prefer to send trigger frame" status.

Thus, FIG. 13 illustrates that message traffic during a transmission window of the NAN may be reduced based on the availability information that is provided during the association phase of communication of the NAN. In FIG. 13, a provider device may refrain from performing a message exchange to determine an availability of a subscriber device if the subscriber device has provided an indication that the subscriber device is available during a data window of a data link group of the NAN, resulting in a reduction of message traffic, such as traffic associated with polling messages or trigger frames. Instead, the provider device may send a paging message (during a paging window) that includes the traffic indicator identifying the subscriber device as a recipient of data and may refrain from performing a message exchange to determine the availability of the second device before sending the data (during a data window).

Figure 14:
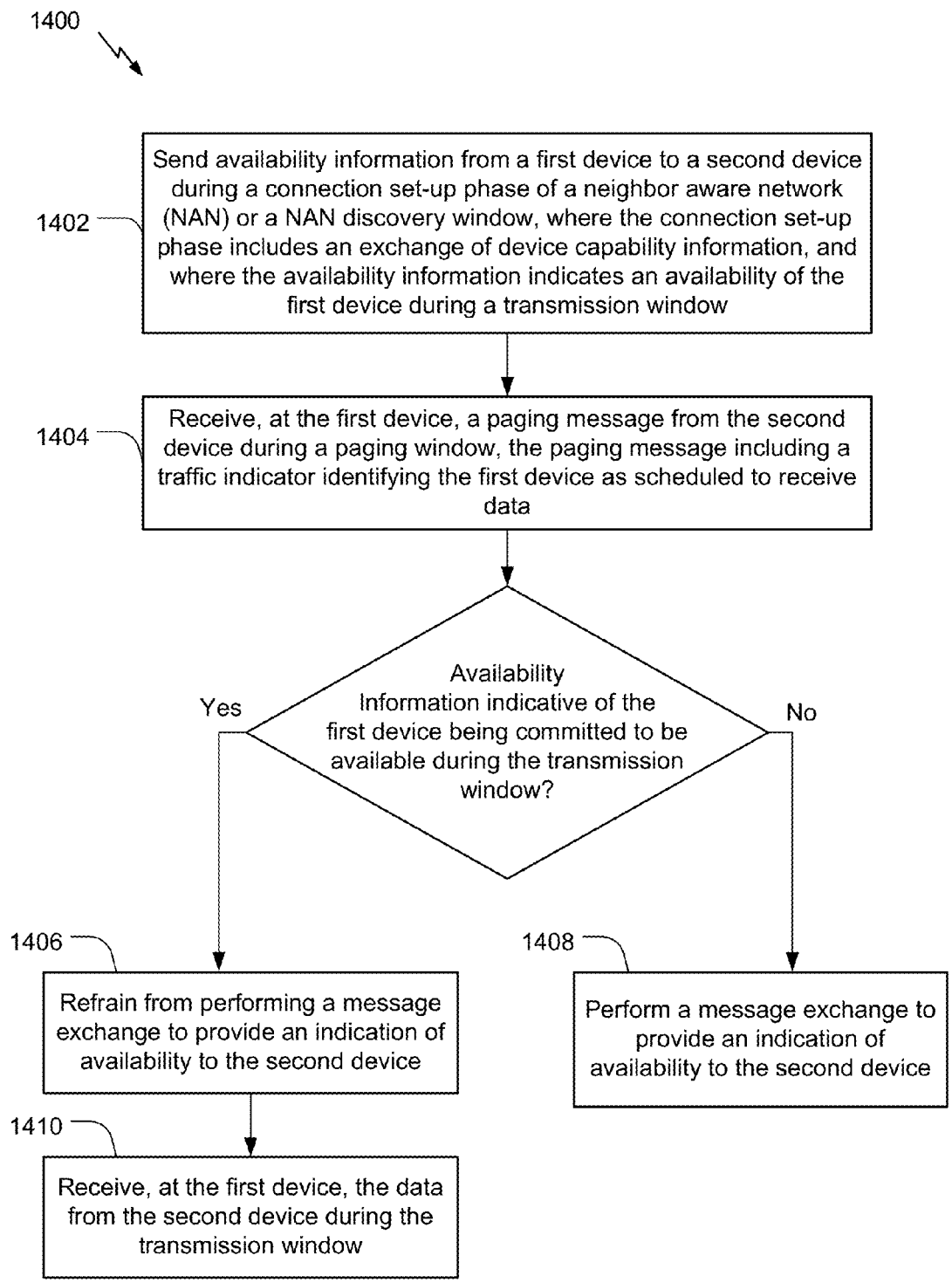
FIG. 14 is a flow diagram of a method of operation at a device of the system of FIG. 1.

Referring to FIG. 14, a particular aspect of a method of operation is shown and generally designated 1400. In a particular implementation, the method 1400 may be performed by the subscriber logic 134 of at least one of the devices 104, 106, 108, and 110 of the system 100 of FIG. 1.

The method 1400 includes sending availability information from a first device to a second device during a connection set-up phase of communication of a NAN (or during a NAN discovery window), at 1402. The connection set-up phase includes an exchange of device capability information, and the availability information indicates availability of the first device during a transmission window of a data link group of the NAN. For example, referring to FIG. 1, the second device 106 (e.g., a subscriber device) may send the availability information 116 to the first device 104 (e.g., a provider device) during the association phase of communication of the NAN 102 that includes the exchange of the capability information 114. In some implementations, the connection set-up phase includes an association phase. In other implementations, the connection set-up phase includes a negotiation phase.

The method 1400 includes receiving, at the first device, a paging message from the second device during a paging window, at 1404. The paging message includes a traffic indicator identifying the first device as scheduled to receive data. For example, referring to FIG. 1, the second device 106 may receive the paging message 128 from the first device 104 during a paging window. The paging message 128 may include a traffic indicator that identifies the second device 106 as scheduled to receive data. The traffic indicator may include a traffic indication map (TIM), a Bloom filter, or a list of media access control (MAC) addresses, as non-limiting examples.

FIG. 14 further illustrates that in response to determining that the availability information is indicative of the first device being available during a transmission window of the data link group, the method 1400 may include refraining from performing a message exchange to provide an indication of availability to the second device, at 1406. For example, referring to FIG. 1, in response to determining that the availability information 116 for the second device 106 indicates that the second device 106 is available during a transmission window of a data link group of the NAN, the second device 106 may refrain from sending an indication of availability (e.g., a response to a polling message from the first device 104 or a trigger frame) to the first device 104. In response to determining that the availability information is not indicative of the first device being available during the transmission window, the method 1400 may include performing a message exchange to provide an indication of availability to the second device, at 1408. For example, referring to FIG. 1, if the availability information 116 for the second device 106 does not indicate availability of the second device 106 during the transmission window, the second device 106 may send an indication of availability to the first device 104.

In the particular implementation illustrated in FIG. 14, the method 1400 may further include receiving, at the first device, the data from the second device during the transmission window, at 1410. For example, referring to FIG. 1, in response to determining that the availability information 116 for the second device 106 indicates that the second device 106 is available during a data window of a data link group, the second device 106 may receive data from the first device 104 during the transmission window without performing a message exchange to provide an indication of availability to the second device 106. In some implementations, the second device 106 may receive the data from the first device 104 during a data window. In other implementations, the second device 106 may receive the data from the first device 104 prior to a beginning of the data window, such as during the paging window or during a trigger window.

In a particular implementation, the method 1400 may further include performing an association with the second device during the connection set-up phase. For example, referring to FIG. 1, the second device 106 may join the data link group during the association phase of communication of the NAN 102 that includes the exchange of the capability information 114. Additionally or alternatively, the availability information may include a particular field or a particular bit value, and a value of the particular field or the particular bit value may indicate whether the second device is available during the transmission window. For example, the indication 162 of FIG. 1 may identify dedicated availability (or unavailability) via a bit value of a particular field or a particular bit in the indication 162. Additionally or alternatively, the availability information may include a particular bit field having multiple bits, and a value of the particular bit field indicates whether the second device is available during each data window of a data link group that includes the first device. For example, the availability information 116 of FIG. 1 may be a field that includes multiple bits and that provides an indication corresponding to an "always" available status, a "prefer to be polled" status, or a "prefer to send trigger frame" status.

Thus, FIG. 14 illustrates that message traffic during a transmission window of the NAN may be reduced based on the availability information that is provided during the association phase of communication of the NAN. In FIG. 14, a subscriber device may provide an indication of availability during the association phase. A provider device may send a paging message (during a paging window) that includes the traffic indicator identifying the subscriber device as a recipient of data, and the subscriber device may refrain from performing a message exchange to provide an indication of availability of the subscriber device to receive data during the data window, resulting a reduction of message traffic, such as traffic associated with responses to polling messages or trigger frames.

Figure 15:
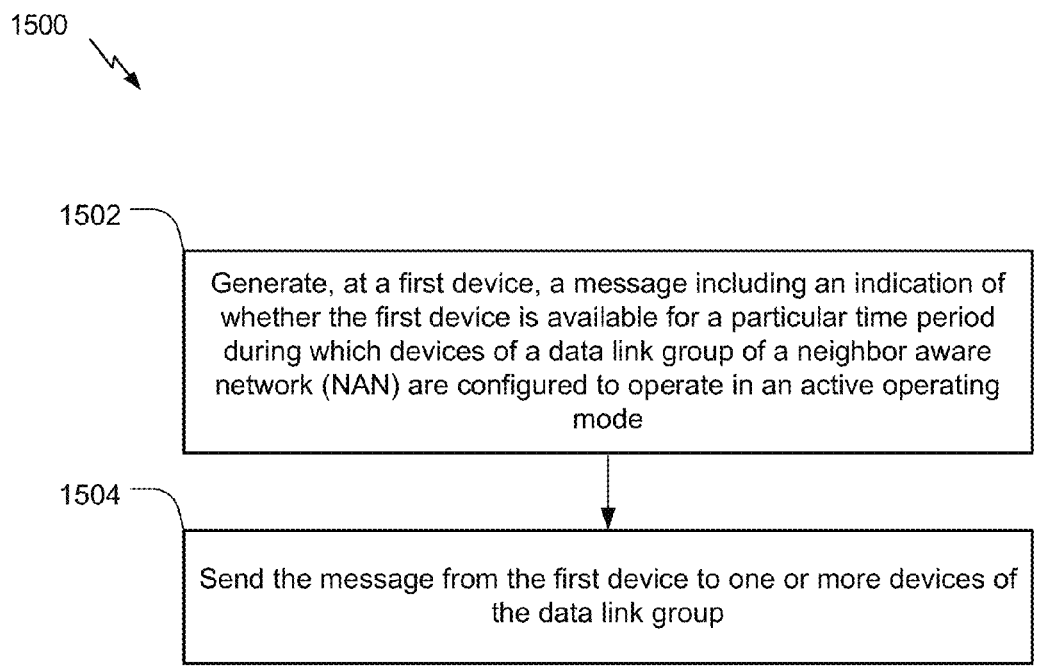
FIG. 15 is a flow diagram of a method of operation at a device of the system of FIG. 1.

Referring to FIG. 15, a particular aspect of a method of operation is shown and generally designated 1500. In a particular implementation, the method 1500 may be performed by the provider logic 130 of at least one of the devices 104, 106, 108, and 110 of the system 100 of FIG. 1.

The method 1500 includes generating, at a first device, a message including an indication of whether the first device is available for a particular time period during which devices of a data link group of a neighbor aware network (NAN) are configured to operate in an active operating mode, at 1502. For example, with reference to FIG. 1, the provider logic 130 of the first device 104 may generate the paging message 128 or the service advertisement 120, and the paging message 128 or the service advertisement 120 may indicate that the first device 104 is available for a particular time period.

The method 1500 further includes sending the message from the first device to one or more devices of the data link group, at 1504. For example, with reference to FIG. 1, the first device 104 may transmit the paging message 128 to the second device 106, or the first device 104 may transmit the service advertisement 120 to the second device 106 and the third device 108.

In a particular implementation, the message includes a service advertisement, the message is sent during a discovery window of the NAN, and the particular time period includes one or more periods of time between pairs of discovery windows of the NAN. Devices of the NAN may be configured to operate in the active operating mode during the discovery window, and the devices of the NAN may include the devices of the data link group. To illustrate, the first device 104 may transmit the service advertisement 120 to the second device 106 and the third device 108 during a discovery window of the NAN 102, and the particular time period may include a time period between two consecutive discovery windows. Alternatively, the message includes a paging message, the message is sent during a paging window of the data link group, and the particular time period includes one or more data windows between pairs of paging windows. The devices of the data link group may be configured to operating in the active operating mode during the paging window. To illustrate, the first device 104 may transmit the paging message 128 to the second device 106 during a paging window corresponding to a data link group of the NAN 102, and the particular time period may include a data window between the paging window and a next paging window.

In some implementations, at least a portion of the particular time period is identified by multiple logical channels. Each of the multiple logical channels may correspond to a communication channel and to at least one time period. For example, the service advertisement 120 may indicate the logical channels 150, or the paging message 128 may indicate the next N logical channels 164. In these examples, the multiple logical channels may be represented by a number of logical channels, such as the next N logical channels. Each logical channel may correspond to (or represent) a portion of the particular time period and a communication channel. As one example, a first logical channel may correspond to a first time period and a first communication channel, a second logical channel corresponds to a second time period and the first communication channel, and a third logical channel corresponds to a third time period and a second logical channel. Additionally, the paging message may be sent from the first device to one or more devices during a paging window portion of a transmission window corresponding to a first logical channel. In some implementations, a transmission window (e.g., a time between a beginning of a paging window and an end of a data window) is also referred to as a NAN data link time block (NDL-TB). In at least one implementation, the first logical channel corresponds to a basic communication channel. In another particular implementation, the first logical channel may correspond to a supplemental communication channel of a plurality of supplemental communication channels referenced by the index of logical channels. Additionally, the multiple logical channels may represent communication channels, and indications of the communication channels may follow indications of the supplemental communication channel in the index of logical channels. In a particular implementation, the indication identifies unavailability if the message includes a particular set of bits having a first value, and the indication identifies availability if the particular set of bits has a second value that is different than the first value. For example, the indication 162 may include a field or a particular bit that has a value that indicates whether the first device 104 is available or unavailable. Additional details of sending messages indicating availability in relation to logical channels are described with reference to FIG. 16.

Figure 16:
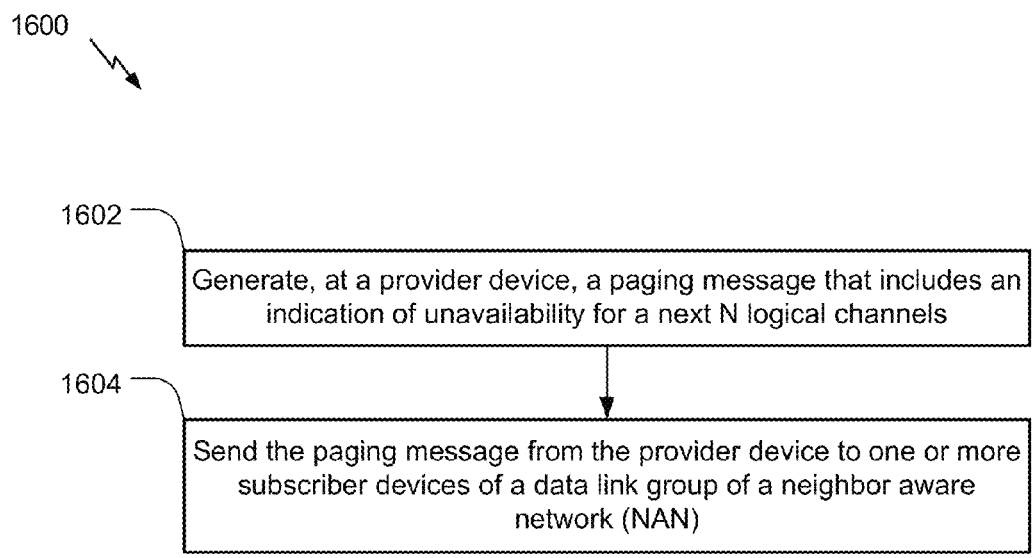
FIG. 16 is a flow diagram of another method of operation at a device of the system of FIG. 1.

Referring to FIG. 16, a particular aspect of a method of operation is shown and generally designated 1600. In a particular implementation, the method 1600 may be performed by the provider logic 130 of at least one of the devices 104, 106, 108, and 110 of the system 100 of FIG. 1. In some cases, the method 1600 may be performed if the availability information 116 received from a particular device during an association phase of communication of the NAN 102 indicates that the particular device is not "always" available for communication during a data window.

The method 1600 includes generating, at a provider device, a paging message that includes an indication of unavailability for a next N logical channels, at 1602. For example, referring to FIG. 1, the provider logic 130 of the first device 104 may generate the paging message 128, and the indication 162 included in the paging message 128 represents an indication of unavailability of the first device 104 for the next N logical channels 164. That is, the paging message 128 illustrated in FIG. 1 may represent a paging (traffic) announcement via a first logical channel, and the indication 162 of unavailability may represent other logical channels that follow the first logical channel in an index of logical channels for the particular data link group, as described further with respect to FIG. 2.

As an illustrative, non-limiting example, the first logical channel may represent a first logical channel in the index, and the indication 162 may specify that the first device 104 is unavailable for the next four logical channels (i.e., N=4). In this example, the first device 104 may be unavailable from the first logical channel in the index through the fifth logical channel in the index. In a particular implementation, the indication 162 may identify unavailability via a bit value (e.g., 0) of a particular bit in the indication 162. For example, to indicate that the first device 104 is unavailable for the next N logical channels 164, the indication may include [0, N], where N is an integer value (e.g., 4 in the case of unavailability for the next 4 logical channels), and where the particular bit has a first bit value (e.g., 0). However, it will be appreciated that alternative methods of identifying unavailability may be used.

The method 1600 also includes sending the paging message from the provider device to one or more subscriber devices of a data link group of a neighbor aware network (NAN), at 1602. For example, referring to FIG. 1, the first device 104 may send the paging message 128 to at least the second device 106. That is, the first device 104 may operate as a service provider that provides a service, and the second device 106 may operate as a subscriber device that subscribes to the service. In some cases, in response to receiving the indication 162 of unavailability, the subscriber logic 134 of the second device 106 may refrain from monitoring the next N logical channels 164 of the logical channels 150 of the particular data link group. In another implementation, the second device 106 may perform one or more operations associated with another data link group.

Figure 17:
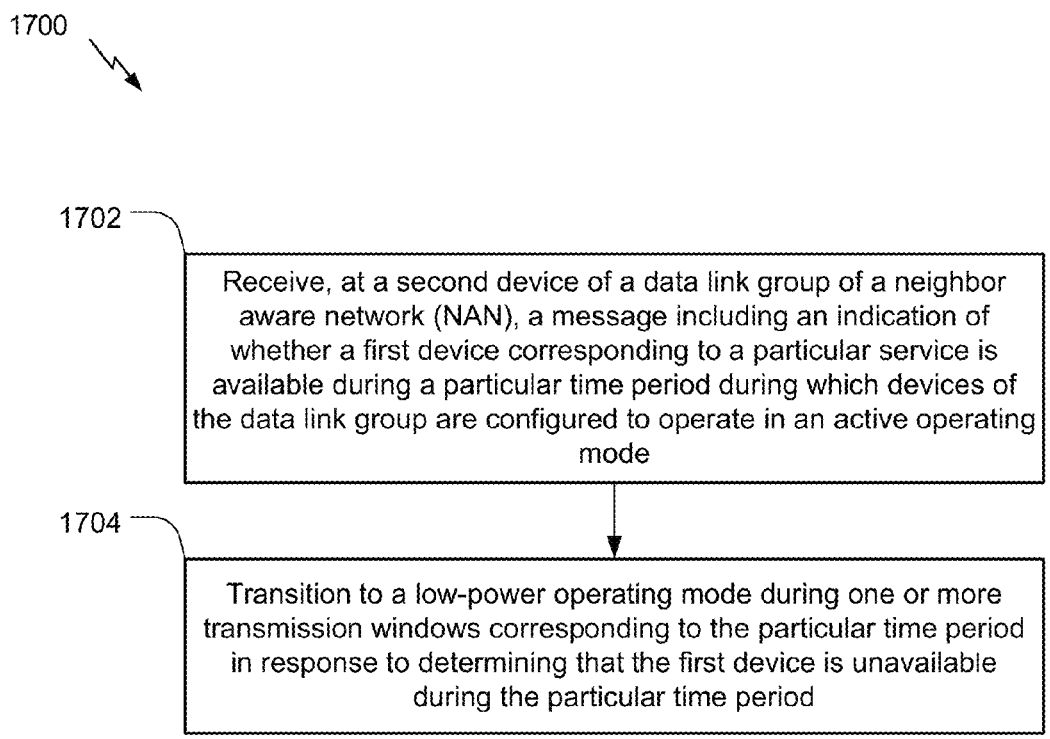
FIG. 17 is a flow diagram of another method of operation at a device of the system of FIG. 1.

Referring to FIG. 17, a particular aspect of a method of operation is shown and generally designated 1700. In a particular implementation, the method 1700 may be performed by the provider logic 130 of at least one of the devices 104, 106, 108, and 110 of the system 100 of FIG. 1.

The method 1700 includes receiving, at a second device of a data link group of a neighbor aware network (NAN), a message including an indication of whether a first device corresponding to a particular service is available during a particular time period during which devices of the data link group are configured to operate in an active operating mode, at 1702. For example, with reference to FIG. 1, the second device 106 may receive the paging message 128 or the service advertisement 120 from the first device 104. The paging message 128 or the service advertisement 120 may include an indication of whether the first device 104 is available during a particular time period. The particular time period may be a time period that is known to or detectable by devices of the data link group or the NAN. As one example, the particular time period may be represented by a particular logical channel, which identifies a particular communication channel and the particular time period.

The method 1700 further includes transitioning to a low-power operating mode during one or more transmission windows corresponding to the particular time period in response to determining that the first device is unavailable during the particular time period, at 1704. For example, with reference to FIG. 1, the second device 106 may transition into a low-power operating mode during one or more windows corresponding to the particular time period in response to determining that the paging message 128 or the service advertisement 120 indicates that the first device 104 is unavailable during the particular time period.

In a particular implementation, the method 1700 includes, if the second device is peered with other devices, determining that the other devices are unavailable during the particular time period prior to transitioning to the low-power operating mode. For example, if the second device 106 is peered with another device, such as the fourth device 110, the second device 106 may determine whether the fourth device 110 is also unavailable prior to transitioning to the low-power operating mode. The second device 106 may be peered with the fourth device 110 by performing connection set-up operations, such as association operations or negotiation operations.

In a particular implementation, the message includes a service advertisement, and the particular time period corresponds to a discovery window of the NAN. Devices of the NAN may be configured to operate in the active operating mode during the discovery window, and the devices of the NAN may include the devices of the data link group. To illustrate, the second device 106 may receive the service advertisement 120 from the first device 104 during a discovery window of the NAN 102. Alternatively, the message may include a paging message. Devices of the data link group may be configured to operate in the active operating mode during the paging window. To illustrate, the second device 106 may receive the paging message 128 from the first device 104 during a paging window corresponding to a data link group of the NAN 102.

In a particular implementation, the method 1700 may further include receiving, at the second device, a second message including a second indication of whether the first device is available for a second particular time period during which the devices of the data link group are configured to operate in the active operating mode. The method 1700 may also include performing one or more operations associated with a different device corresponding to another service during one or more transmission windows corresponding to the second particular time period. For example, the second device 106 may, instead of transitioning into a low-power operating mode, perform operations associated with a different provider device than the first device 104.

In some implementations, at least a portion of the second particular time period is identified by multiple logical channels. Each of the multiple logical channels corresponds to a communication channel and to a portion of the particular time period. For example, the service advertisement 120 may indicate the logical channels 150, or the paging message 128 may indicate the next N logical channels 164. In these examples, the multiple logical channels are represented by a number of logical channels, such as the next N logical channels 164. Each logical channel may correspond to (or represent) a particular time period and a particular communication channel. As one example, a first logical channel may correspond to a first time period and a first communication channel, a second logical channel may correspond to a second time period and the first communication channel, and a third logical channel may correspond to a third time period and a second logical channel. In some implementations, the first logical channel may correspond to a basic communication channel. In another particular implementation, the first logical channel may correspond to a supplemental communication channel of a plurality of supplemental communication channels referenced by the index of logical channels. Additionally, the multiple logical channels may represent communication channels and time periods, and indications of the communication channels may follow indications of the supplemental communication channel in the index of logical channels. Additional details of receiving messages indicating availability in relation to logical channels are described with reference to FIG. 18.

Figure 18:
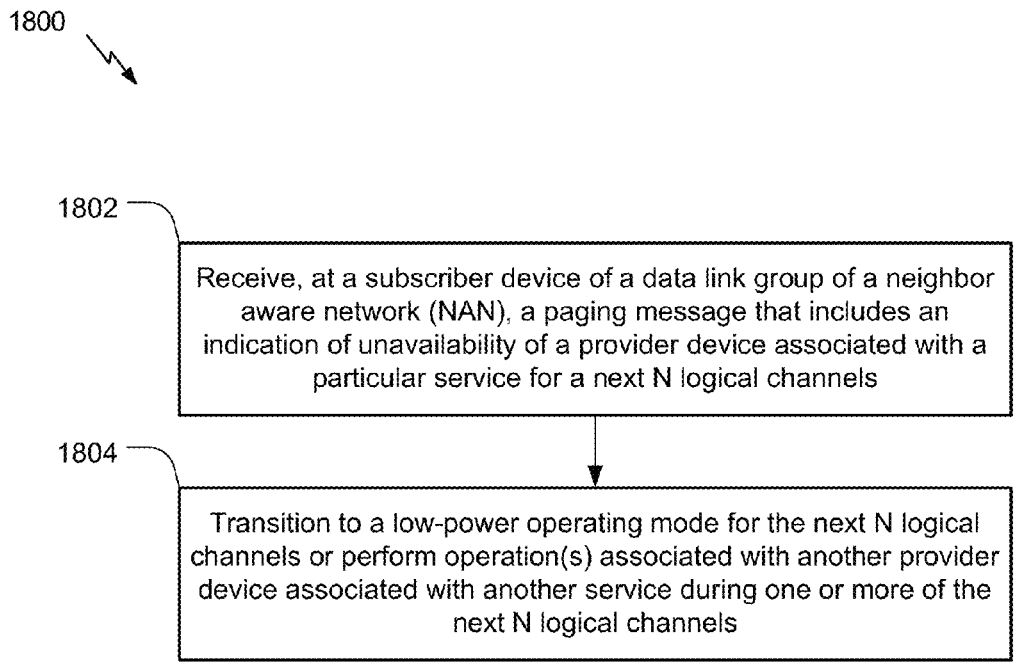
FIG. 18 is a flow diagram of another method of operation at a device of the system of FIG. 1.

Referring to FIG. 18, a particular aspect of a method of operation is shown and generally designated 1800. In a particular implementation, the method 1800 may be performed by the subscriber logic 134 of at least one of the devices 104, 106, 108, and 110 of the system 100 of FIG. 1. In some cases, the method 1800 may be performed if the availability information 116 received from a particular device during an association phase of communication of the NAN 102 indicates that the particular device is not "always" available for communication during a data window.

The method 1800 includes receiving, at a subscriber device of a data link group of a neighbor aware network (NAN), a paging message that includes an indication of unavailability of a provider device associated with a particular service for a next N logical channels, at 1802. For example, referring to FIG. 1, the second device 106 may operate as a subscriber device that subscribes to a service, and the first device 104 may operate as a service provider that provides a particular service. The subscriber logic 134 of the second device 106 may receive the paging message 128 from the first device 104, and the indication 162 included in the paging message 128 represents an indication of unavailability of the first device 104 for the next N logical channels 164. That is, the paging message 128 illustrated in FIG. 1 may represent a paging (traffic) announcement via a first logical channel, and the indication 162 of unavailability may represent other logical channels that follow the first logical channel in an index of logical channels for the particular data link group, as described further with respect to FIG. 2.

The method 1800 also includes transitioning to a low-power operating mode for the next N logical channels or performing one or more operations associated with another provider device associated with another service during one or more of the next N logical channels, at 1804.

In a particular implementation, the second device 106 may reduce power consumption by remaining in a low-power operating mode and refrain from waking to monitor the next N logical channels 164 (including paging windows). As an illustrative, non-limiting example, referring to FIG. 4, the second device 106 may receive the paging message 128 that includes the indication 162 of unavailability for the next N logical channels 164 in the paging window 324 of the transmission window 322 associated with the basic communication channel 306. That is, the second device 106 may receive the paging message 128 during a time period that begins at t2 and ends at t3. As an illustrative example, the indication 162 may indicate that the first device 104 is unavailable for the next 4 logical channels (i.e., N=4 in this case). Referring to FIG. 3, the second device 106 may refrain from monitoring the first supplemental channel 308 during the first paging window 332 (that begins at t5 and ends at t6), refrain from monitoring the second supplemental channel 310 during the first paging window 344 (that begins at t8 and ends at t9), refrain from monitoring the first supplemental channel 308 during the second paging window 336 (that begins at t11 and ends at t12), and refrain from monitoring the first supplemental channel 308 during the second paging window 342 (that begins at t14 and ends at t15).

As another example, referring to FIG. 5, the second device 106 may receive the paging message 128 that includes the indication 162 of unavailability for the next N logical channels 164 in the first paging window 332 associated with the first supplemental channel 308. That is, the second device 106 may receive the paging message 128 during a time period that begins at t5 and ends at t6. As an illustrative example, the indication 162 may indicate that the first device 104 is unavailable for the next 4 logical channels (i.e., N=4 in this case). Referring to FIG. 3, the second device 106 may refrain from monitoring the second supplemental channel 310 during the first paging window 344 (that begins at t8 and ends at t9), refrain from monitoring the first supplemental channel 308 during the second paging window 336 (that begins at t11 and ends at t12), and refrain from monitoring the second supplemental channel 310 during the second paging window 348 (that begins at t14 and ends at t15). Further, while not shown in FIG. 3, the second device 106 may refrain from monitoring the first supplemental channel 308 during a first paging window that occurs after the second discovery window 314. That is, in some cases, the second device 106 may refrain from monitoring one or more supplemental channels that are associated with other discovery period(s) after the discovery period 316 illustrated in FIG. 3.

In another implementation, the second device 106 may perform one or more operations associated with another provider device associated with another service during one or more of the next N logical channels. For example, if the second device 106 subscribes to multiple providers, the second device 106 may schedule power saving operation(s) or concurrency operation(s) based on an intersection of unavailability associated with each of the multiple providers. As an illustrative, non-limiting example, the second device 106 may subscribe to two providers, such as the first device 104 and another device. Depending on when both provider devices indicate unavailability, the second device 106 may schedule one or more power saving operations, one or more concurrency operations, or a combination thereof.

To illustrate, referring to FIG. 4, the second device 106 may receive the paging message 128 that includes the indication 162 of unavailability for the next N logical channels 164 in the paging window 324 of the transmission window 322 associated with the basic communication channel 306. In this case, the second device 106 may perform one or more operations associated with another data link group during one or more of the next N logical channels 164 (i.e., N=4 in this case). That is, the second device 106 may perform one or more operations during the first transmission window 328 associated with the first supplemental channel 308, the first transmission window 340 associated with the second supplemental channel 310, the second transmission window 330 associated with the first supplemental channel 308, the second transmission window 342 associated with the second supplemental channel 310, or a combination thereof.

As another example, referring to FIG. 5, the second device 106 may receive the paging message 128 that includes the indication 162 of unavailability for the next N logical channels 164 in the first paging window 332 associated with the first supplemental channel 308. In this case, the second device 106 may perform one or more operations associated with another data link group during one or more of the next N logical channels 164 (i.e., N=4 in this case). That is, the second device 106 may perform one or more operations associated with another data link group during the first transmission window 328 associated with the first supplemental channel 308, the first transmission window 340 associated with the second supplemental channel 310, the second transmission window 330 associated with the first supplemental channel 308, the second transmission window 342 associated with the second supplemental channel 310, or a combination thereof. Further, while not shown in FIG. 3, the second device 106 may perform one or more operations associated with another data link group during a first paging window that occurs after the second discovery window 314. That is, in some cases, the second device 106 may refrain from monitoring one or more supplemental channels that are associated with other discovery period(s) after the discovery period 316 illustrated in FIG. 3.

Figure 19:
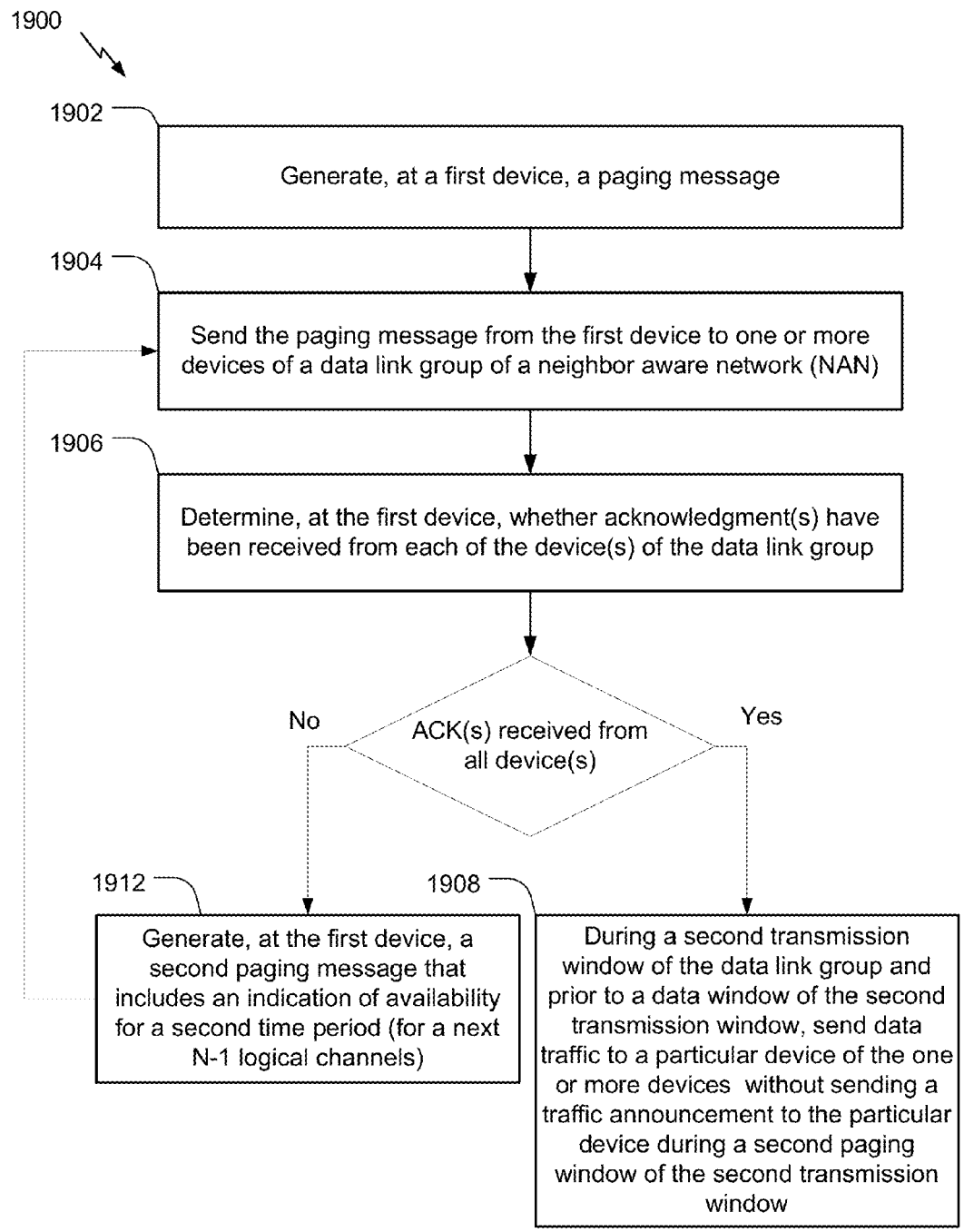
FIG. 19 is a flow diagram of another method of operation at a device of the system of FIG. 1.

Referring to FIG. 19, a particular aspect of a method of operation is shown and generally designated 1900. In a particular implementation, the method 1900 may be performed by the provider logic 130 of at least one of the devices 104, 106, 108, and 110 of the system 100 of FIG. 1. In some cases, the method 1900 may be performed if the availability information 116 received from a particular device during an association phase of communication of the NAN 102 indicates that the particular device is not "always" available for communication during a data window.

The method 1900 includes generating, at a first device, a paging message, at 1902. For example, referring to FIG. 1, the provider logic 130 of the first device 104 may generate the paging message 128. In some implementations, the paging message may include an indication of availability for a particular time period corresponding to a data link group of a neighbor aware network (NAN). For example, the indication 162 included in the paging message 128 represents an indication of availability of the first device 104 for a particular time period. The particular time period may correspond to a next N logical channels 164. That is, the paging message 128 illustrated in FIG. 1 may represent a paging (traffic) announcement via a first logical channel, and the indication 162 of availability may represent other logical channels that follow the first logical channel in an index of logical channels for the particular data link group, as described further with respect to FIG. 2.

As an illustrative, non-limiting example, the first logical channel may represent a first logical channel in the index, and the indication 162 may specify that the first device 104 is available for the next four logical channels (i.e., N=4). In this example, the first device 104 may be available from the first logical channel in the index through the fifth logical channel in the index. In a particular implementation, the indication 162 may identify availability via a bit value (e.g., 1) of the particular bit in the indication 162. For example, to indicate that the first device 104 is available for the next N logical channels 164, the indication may include [1, N], where N is an integer value (e.g., 4 in the case of availability for the next 4 logical channels), and where the particular bit has a second bit value (e.g., 1). However, it will be appreciated that alternative methods of identifying availability may be used.

The method 1900 also includes sending the paging message from the first device to one or more devices of a group (e.g., a data link group) of a neighbor aware network (NAN), at 1904. For example, referring to FIG. 1, the first device 104 may send the paging message 128 to at least the second device 106 during a first transmission window of the group. In this example, the first device 104 may operate as a service provider that provides a service, and the second device 106 may operate as a subscriber device that subscribes to the service. The paging message 128 illustrated in FIG. 1 may represent a paging (traffic) announcement via a first logical channel, and the indication 162 of availability may represent other logical channels that follow the first logical channel in an index of logical channels for the particular data link group, as described further with respect to FIG. 2.

The method 1900 also includes determining, at the first device, whether one or more acknowledgments (ACKs) have been received from each of the one or more subscriber devices of the data link group of the NAN, at 1906. That is, the first device 104 may wait to receive acknowledgment(s) from subscriber device(s) that indicate receipt of the indication 162 of availability. As an illustrative, non-limiting example, the first device 104 may provide the indication 162 of availability for a next four logical channels (i.e., N=4). For example, referring to FIG. 4, the indication 162 may be provided via the paging message 128 during the paging window 324 associated with the transmission window 322 of the basic communication channel 306. Alternatively, as described with respect to FIGS. 5-8, the indication 162 may be provided via the paging message 128 during the paging windows 332, 336 associated with the first supplemental channel 308 or during the paging windows 344, 348 associated with the second supplemental channel 310.

As a simplified example, the second device 106 may represent a single subscriber to a service provided by the first device 104. In this example, the first device 104 may determine, at 1906, whether an acknowledgment, such as a PS-POLL message, has been received from the second device 106 during a particular paging window associated with a first logical channel. To illustrate, referring to FIG. 4, the first device 104 may provide the indication 162 of availability for a next four logical channels (i.e., N=4) via the paging message 128 during the paging window 324 associated with the transmission window 322 of the basic communication channel 306. In this example, the first device 104 may determine, at 1906, whether an acknowledgment (ACK) of the indication 162 of availability has been received from the second device 106 during the paging window 324.

The method 1900 may include, at 1908, sending data traffic to a particular device of the one or more devices without sending a traffic announcement to the particular device during a second paging window of a second transmission window. At least a portion of the data traffic may be sent during the second transmission window of the group and prior to a data window of the second transmission window. For example, at least a portion of the data traffic may be sent during a paging window portion of the second transmission window or during a trigger window portion of the second transmission window. As illustrated in FIG. 19, the data traffic may be sent based on detecting, at the first device, receipt of one or more acknowledgments from each of the one or more devices of the data link group. The second transmission window may include or correspond to the next N logical channels.

In the event that the ACK has not been received from the second device 106 during the paging window 324, the method 1900 may include generating, at the first device (e.g., the first device 104), a second paging message including an indication of availability for a reduced number of logical channels, at 1912. The reduced number of logical channels may be next N−1 logical channels. For example, the indication may include [1, N−1], where N−1 is an integer value (e.g., 3 in this example when N=4).

The method 1900 may return to 1904, where the provider device sends the second paging message to device(s) of the data link group. For example, referring to FIG. 5, the indication 162 may be provided via the paging message 128 during the first paging window 324 of the first transmission window 328 associated with the first supplemental channel 308. In the simplified example where the second device 106 represents a single subscriber device to a particular service provided by the first device 104, the first device 104 may determine, at 1906, whether acknowledgment to the second paging message has been received from the second device 106 during the first paging window 324 of the first transmission window 328 associated with the first supplemental channel 308.

The method 1900 may include, in response to determining that the one or more acknowledgments to the second paging message have been received, refraining from sending traffic announcements in the paging windows corresponding to the reduced number of logical channels (the next N−1 logical channels). Further, the method 1900 may include sending data traffic in at least a portion of the paging windows in the reduced number of logical channels (the next N−1 logical channels), at 1910. In the event that the ACK has not been received from the second device 106 during the first paging window 324, the method 1900 may proceed to 1912, and the method 1900 may continue to generate paging message(s) until ACKs have been received from each of the device(s) of the data link group of the NAN.

In a particular implementation, the method 1900 may further include, prior to generating the paging message, starting a first countdown during a paging window based on a first contention parameter, and starting a second countdown during the paging window based on a second contention parameter. The second contention parameter may correspond to a longer time period than the first contention parameter. To illustrate, with reference to FIG. 9, the first countdown may be started based on the parameter CW_paging, and the second countdown may be started based on the parameter FixedCW_data_min. FixedCW_data_min corresponds to a longer time period than CW_paging. Additionally, the method 1900 may further include sending the paging message to the one or more devices in response to expiration of the first countdown, and sending the data traffic in response to expiration of the second countdown. Additionally or alternatively, the paging message may include a first traffic category field, and a data frame of the data traffic may include a second traffic category field. In one case, a value of the first traffic category field corresponds to a higher priority than a value of the second traffic category field. For example, with reference to FIG. 9, paging messages may include a first traffic category field having a higher priority than a second traffic category field that is included in data frames. Additionally, the first traffic category field and the second traffic category field may include quality of service (QoS) category fields. In another particular implementation, the method 1900 may include transmitting data during a trigger window, as further described with reference to FIG. 21.

Figure 20:
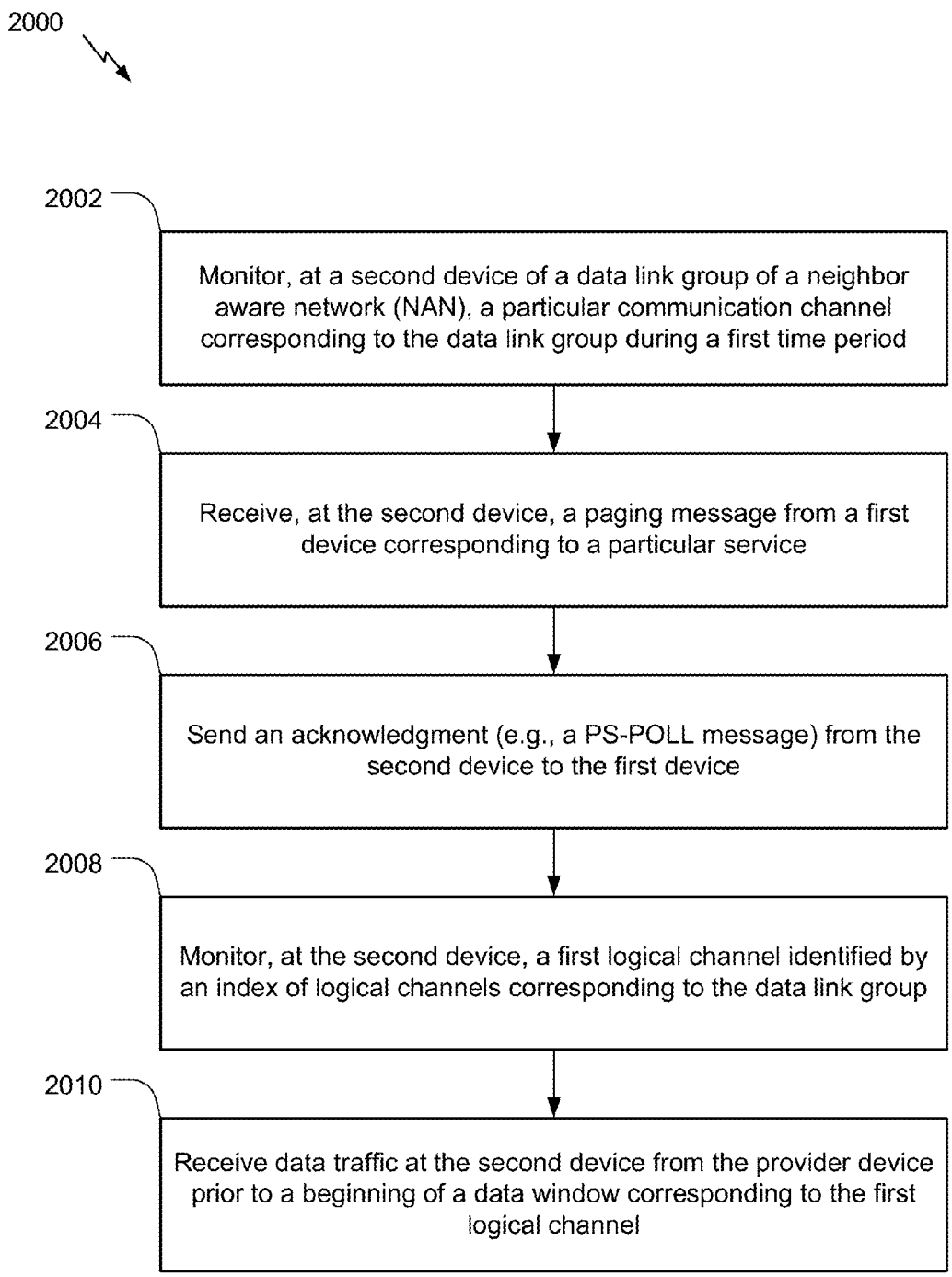
FIG. 20 is a flow diagram of another method of operation at a device of the system of FIG. 1.

Referring to FIG. 20, a particular aspect of a method of operation is shown and generally designated 2000. In a particular implementation, the method 2000 may be performed by the subscriber logic 134 of at least one of the devices 104, 106, 108, and 110 of the system 100 of FIG. 1. In some cases, the method 2000 may be performed if the availability information 116 received from a particular device during an association phase of communication of the NAN 102 indicates that the particular device is not "always" available for communication during a data window.

The method 2000 includes monitoring, at a second device of a data link group of a neighbor aware network (NAN), a particular communication channel corresponding to the data link group during the first time period, at 2002. A particular logical channel may represent or correspond to the particular time period and the particular logical channel. To illustrate, referring to FIG. 1, the second device 106 may operate as a subscriber device that subscribes to a service, and the first device 104 may operate as a service provider that provides a particular service. The particular logical channel may represent one of the logical channels referenced by an index of logical channels associated with the data link group, as described further with respect to FIG. 2. The subscriber logic 134 of the second device 106 may monitor the particular communication channel during a paging window corresponding to the particular logical channel.

The method 2000 also includes receiving, at the second device, a paging message from a first device corresponding to a particular service, at 2004. For example, referring to FIG. 1, the subscriber logic 134 of the second device 106 may receive the paging message 128 from the first device 104. In some implementations, the paging message includes an indication of availability of the provider device for a next N logical channels. For example, the indication 162 included in the paging message 128 represents an indication of availability of the first device 104 for the next N logical channels 164. That is, the paging message 128 illustrated in FIG. 1 may represent a paging (traffic) announcement via the particular logical channel, and the indication 162 of availability may represent other logical channels that follow the particular logical channel in the index of logical channels for the data link group.

As an illustrative, non-limiting example, referring to FIG. 4, the subscriber logic 134 of the second device 106 may receive the paging message 128 during the paging window 324 associated with the transmission window 322 of the basic communication channel 306. That is, the paging message 128 may be received during a paging window associated with a basic communication channel referenced by the index of logical channels, as described with respect to FIG. 2. Alternatively, as described with respect to FIGS. 5-8, the paging message 128 may be received during a paging window associated with one of the supplemental channels referenced by the index of logical channels. For example, referring to FIG. 5 and FIG. 7, the subscriber logic 134 of the second device 106 may receive the paging message 128 during the first paging window 332 associated with the first transmission window 328 or during the second paging window 336 associated with the second transmission window 330 of the first supplemental channel 308. As another example, referring to FIG. 6 and FIG. 8, the subscriber logic 134 of the second device 106 may receive the paging message 128 during the first paging window 344 associated with the first transmission window 340 or during the second paging window 348 associated with the second transmission window 342 of the second supplemental channel 310.

The method 2000 also includes sending an acknowledgment, such as a power-save poll (PS-POLL) message, from the second device to the first device, at 2006. For example, referring to FIG. 1, the subscriber logic 134 of the second device 106 may send an acknowledgment to the first device 104. The method 2000 further includes monitoring, at the second device, a first logical channel of the plurality of logical channels corresponding to the data link group, at 2008. The method 2000 may also include receiving data traffic at the second device from the first device prior to a beginning of a data window corresponding to the first logical channel, at 2010. In some implementations, the data traffic may be received during at least a portion of a paging window. In other implementations, the data traffic may be received during at least a portion of a trigger window. In other implementations, the paging message may be received during a paging window, and the method 2000 may include, during the paging window and before the data window, sending a trigger frame. To illustrate, various frames may be sent in a priority order such that paging messages are highest priority, trigger frames are lower priority than paging messages, and data frames are lower priority than trigger frames. For example, contention window values may be used to control priority of the various frames. In another example, traffic categories may be used to control priority of various frames.

To illustrate, referring to FIG. 3, the subscriber logic 134 of the second device 106 may send an ACK to the first device 104 during the paging window 324 associated with the transmission window 322 of the basic communication channel 306. In this example, the first logical channel referenced by the index of logical channels may be the first supplemental channel 308. As used herein in reference to FIG. 20, the "first" logical channel may not be an ordinal first logical referenced by the index of logical channels. Accordingly, the second device 106 may monitor the first supplemental channel 308 during the first paging window 332 associated with the first transmission window 328. Further, the second device 106 may receive data traffic from the first device 104 during the first paging window 332. Thus, the indication of availability received from the first device 104 during the paging window 324 may allow for data transfer during a paging portion of a transmission window associated with a first logical channel. For example, the data transfer may occur during the first paging window 332 of the first transmission window 328 associated with the first supplemental channel 308.

As another example, referring to FIG. 3, the subscriber logic 134 of the second device 106 may send an ACK to the first device 104 during the first paging window 332 associated with the first transmission window 328 of the first supplemental channel 308. In this case, the first logical channel referenced by the index of logical channels may be the second supplemental channel 310. The next logical channel may represent a next supplemental channel following the first supplemental channel 308 in the index of logical channels. Accordingly, the second device 106 may monitor the second supplemental channel 310 during the first paging window 344 associated with the first transmission window 340. Further, the second device 106 may receive data traffic from the first device 104 during the first paging window 344.

As a further example, referring to FIG. 3, the subscriber logic 134 of the second device 106 may send an ACK to the first device 104 during the first paging window 344 associated with the first transmission window 340 of the second supplemental channel 310. In this case, the first logical channel referenced by the index of logical channels may be the first supplemental channel 308. Accordingly, the second device 106 may monitor the first supplemental channel 308 during the second paging window 336 associated with the second transmission window 330. Further, the second device 106 may receive data traffic from the first device 104 during the second paging window 336.

As another example, referring to FIG. 3, the subscriber logic 134 of the second device 106 may send an ACK to the first device 104 during the second paging window 336 associated with the second transmission window 330 of the first supplemental channel 308. In this case, the first logical channel referenced by the index of logical channels may be the second supplemental channel 310. Accordingly, the second device 106 may monitor the second supplemental channel 310 during the second paging window 348 associated with the second transmission window 342. Further, the second device 106 may receive data traffic from the first device 104 during the second paging window 348.

In a particular implementation, the method 2000 further includes, prior to receiving the paging message, starting a first countdown during a particular paging window based on a first contention parameter and starting a second countdown during the particular paging window based on a second contention parameter. In at least one implementation, the second contention parameter corresponds to a longer time period than the first contention parameter. To illustrate, with reference to FIG. 9, the first countdown may be started based on the parameter CW_paging, and the second countdown may be started based on the parameter FixedCW_data_min. FixedCW_data_min corresponds to a longer time period than CW_paging. The method 1900 may further include transmitting a second paging message from the second device to other devices of the data link group in response to expiration of the first countdown and transmitting second data traffic to a third device of the data link group in response to expiration of the second countdown. The second paging message may be transmitted during the particular paging window, and the second data traffic may be transmitted prior to a beginning of a second data window.

Additionally or alternatively, the paging message may include a first traffic category field, and a data frame of the data traffic may include a second traffic category field. In one case, a value of the first traffic category field corresponds to a higher priority than a value of the second traffic category field. For example, with reference to FIG. 9, paging messages may include a first traffic category field having a higher priority than a second traffic category field that is included in data frames. Additionally, the first traffic category field and the second traffic category field may include quality of service (QoS) category fields.

In another particular implementation, the method 2000 includes monitoring, at the second device, the particular communication channel during a second time period, and receiving, at the second device, a second paging message from a third device corresponding to a second service. The second paging message may be received during a paging window portion of a transmission window corresponding to the second time period. The method 2000 may further include sending a trigger frame from the second device to the third device during a trigger window portion of the transmission window and receiving, at the second device, data traffic from the third device during the trigger window portion of the transmission window. The method 2000 may also include receiving, at the second device, data traffic from the third device during a data traffic portion of the transmission window. Receiving data during a trigger window is further described with reference to FIG. 22. In some implementations, the second time period corresponds to a particular logical channel included referenced by an index of logical channels, as described with reference to FIG. 3.

Thus, FIG. 20 illustrates that an indication of availability received from a provider device, such as the first device 104 in FIG. 1, during a particular paging window may allow for data transfer during a paging portion of a subsequent transmission window associated with a first logical channel referenced by an index of logical channels. Transmission of data during the paging portion of the transmission window may improve data throughput, as data transmission may be allowed not only in the data portion of the transmission window but also the paging portion.

Figure 21:
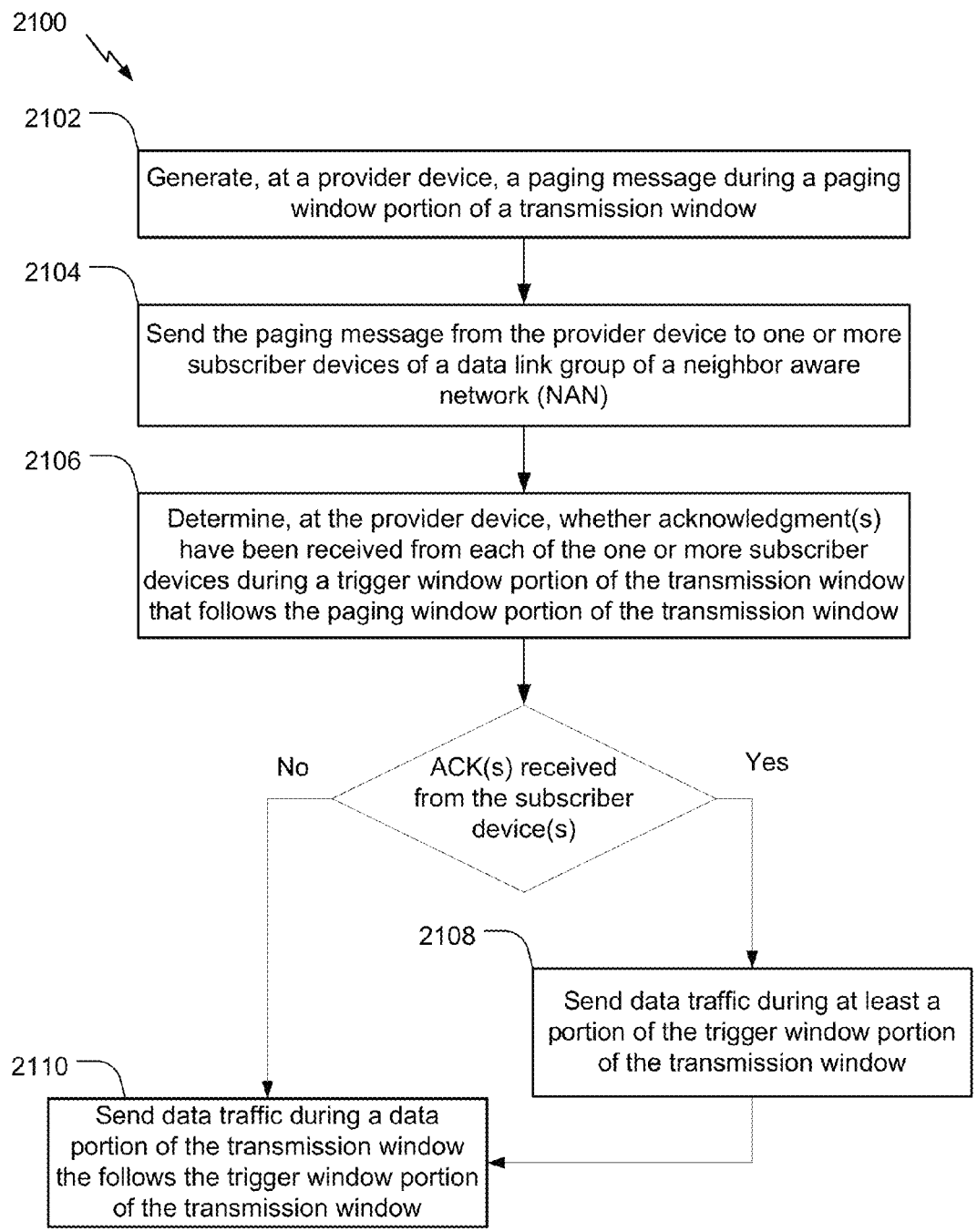
FIG. 21 is a flow diagram of another method of operation at a device of the system of FIG. 1.

Referring to FIG. 21, a particular aspect of a method of operation is shown and generally designated 2100. In a particular implementation, the method 2100 may be performed by the provider logic 130 of at least one of the devices 104, 106, 108, and 110 of the system 100 of FIG. 1. In some cases, the method 2100 may be performed if the availability information 116 received from a particular device during an association phase of communication of the NAN 102 indicates that the particular device is not "always" available for communication during a data window.

The method 2100 includes generating, at a provider device, a paging message during a paging window portion of a transmission window, at 2102. For example, referring to FIG. 1, the provider logic 130 of the first device 104 may generate the paging message 128 during a paging window portion of a transmission window. To illustrate, as described with respect to FIG. 10, the provider logic 130 of the first device 104 may generate the paging message 128 during the paging portion 1004 of the transmit window 1002 that represents a time period before PWB 1010 that separate the paging portion 1004 from the trigger portion 1006.

The method 2100 also includes sending the paging message from the provider device to one or more subscriber devices of a data link group of a neighbor aware network (NAN), at 2104. For example, referring to FIG. 1, the first device 104 may send the paging message 128 to at least the second device 106 of the NAN 102. Further, in some cases, multiple devices may subscribe to a particular service that is provided by the first device 104. To illustrate, the third device 108 may represent another device that subscribes to the particular service. In this case, the first device 104 may also send the paging message 128 to the third device 108 of the NAN 102.

The method 2100 includes determining, at the provider device, whether acknowledgments, such as trigger messages, have been received from each of the one or more subscriber devices during a trigger window portion of the transmission window that follows the paging window portion of the transmission window, at 2106. For example, the provider logic 130 of the first device 104 (see FIG. 1) may determine whether ACKs have been received from each of the subscriber device(s) during the trigger portion 1006 of the transmit window 1002 (see FIG. 10). To illustrate, in a simplified case where the second device 106 of FIG. 1 represents a single subscriber device on the NAN 102, the first device 104 may determine whether the trigger message has been received from the first device during the trigger portion 1006 of the transmit window 1002. As another example, in the event that the second device 106 and the third device 108 of FIG. 1 represent multiple subscriber devices, the first device 104 may determine whether trigger messages have been received from each of the second device 106 and the third device 108.

In the event that the ACKs, such as trigger messages, are received from the one or more subscriber devices during the trigger window portion of the transmission window, the method 2100 includes sending data traffic during at least a portion of the trigger window portion of the transmission window, at 2108. For example, the provider logic of the first device 104 may send the data 122 to the second device 106 and/or the third device 108 during at least a portion of the trigger portion 1006 of the transmit window 1002. As described further with respect to FIG. 10, contention window parameters may be used to allow data transmission to occur before the TrWB 1012.

Further, the method 2100 includes sending data traffic during a data portion of the transmission window that follows the trigger window portion of the transmission window, at 2110. For example, the provider logic of the first device 104 may send the data 122 to the second device 106 and/or the third device 108 during the data portion 1008 of the transmit window 1002.

In the event that the ACKs, such as trigger messages, are received from the one or more subscriber devices during the trigger window portion of the transmission window, the method 2100 may proceed directly to sending data traffic, at 2110. That is, data traffic may be sent during the data portion of the transmission window that follows the trigger window portion of the transmission window. As described further with respect to FIG. 10, the TrWB 1012 may represent a threshold amount of time for ACK(s) to be received, and data transfer may not occur during the trigger portion 1006 of the transmit window 1002 in the event that ACK(s) are not received from each of the one or more subscriber device(s).

Thus, FIG. 21 illustrates that a transmission window, such as the transmit window 1002 of FIG. 10, may include not only a paging portion but also a trigger portion. The trigger portion may be used for receiving ACK(s) from subscriber device(s). In the event that ACK(s) are received from each of the one or more subscriber devices during the trigger portion of the transmission window, data transfer may occur during the trigger portion of the transmission window. Transmission of data during the trigger portion of the transmission window may improve data throughput, as data transmission may be allowed not only in the data portion of the transmission window but also the trigger portion.

Figure 22:
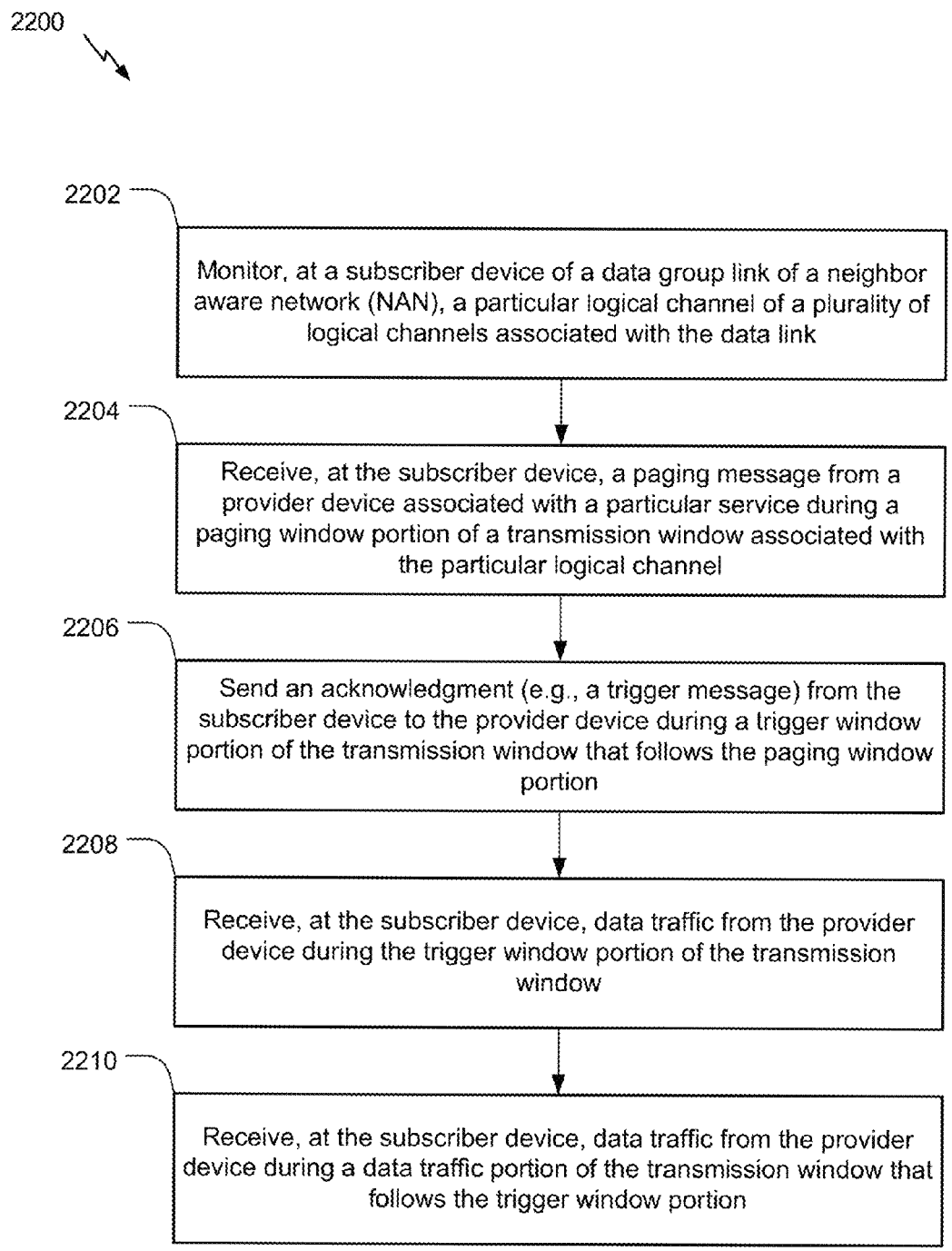
FIG. 22 is a flow diagram of another method of operation at a device of the system of FIG. 1.

Referring to FIG. 22, a particular aspect of a method of operation is shown and generally designated 2200. In a particular implementation, the method 2200 may be performed by the subscriber logic 134 of at least one of the devices 104, 106, 108, and 110 of the system 100 of FIG. 1. In some cases, the method 2200 may be performed if the availability information 116 received from a particular device during an association phase of communication of the NAN 102 indicates that the particular device is not "always" available for communication during a data window.

The method 2200 includes monitoring, at a subscriber device of a data link group of a neighbor aware network (NAN), a particular logical channel of a plurality of logical channels associated with the data link group, at 2202. For example, the subscriber logic 134 of the second device 106 may monitor a particular logic channel of the plurality of logical channels 150 that is associated with a data link group of the NAN 102.

The method 2200 also includes receiving, at the subscriber device, a paging message from a provider device associated with a particular service, at 2204. The subscriber device may receive the paging message during a paging window portion of a transmission window associated with the particular logical channel. For example, the subscriber logic 134 of the second device 106 may receive the paging message 128 during a paging window portion of a transmission window associated with the particular logical channel. As described further with respect to FIGS. 3-8, the paging message 128 may be received during the paging window 324 associated with the basic communication channel 306, during the first paging window 332 or the second paging window 336 associated with the first supplemental channel 308, or during the first paging window 344 or the second paging window 348 associated with the second supplemental channel 310.

The method 2200 further includes sending an acknowledgment, such as a trigger message, from the subscriber device to the provider device during a trigger window portion of the transmission window that follows the paging window portion, at 2206. For example, the subscriber logic 134 of the second device 106 may send an ACK to the first device 104 (see FIG. 1) during the trigger window portion that follows the paging window portion. For example, an ACK may be sent to the first device 104 during the trigger portion 1006 of the transmit window 1002 that follows the paging portion 1004 of the transmit window 1002 of FIG. 10.

The method 2200 may also include receiving, at the subscriber device, data traffic from the provider device during the trigger window portion of the transmission window, at 2208. For example, the subscriber logic 134 of the second device 106 may receive data traffic during the trigger window portion of the transmission window. To illustrate, the second device 106 may receive the data 122 during the trigger portion 1006 of the transmit window 1002 of FIG. 10. As described further with respect to FIG. 10, the TrWB 1012 may represent a threshold amount of time for ACK(s) to be received by a provider device, such as the first device 104, and data transfer may occur during the trigger portion 1006 of the transmit window 1002 in the event that ACK(s) are received from each of the one or more subscriber device(s).

The method 2200 may also include receiving, at the subscriber device, data traffic from the provider device during a data traffic portion of the transmission window that follows the trigger window portion, at 2210. For example, the subscriber logic 134 of the second device 106 may receive data traffic, such as the data 122, during the data portion 1008 of the transmit window 1002 of FIG. 10.

Figure 23:
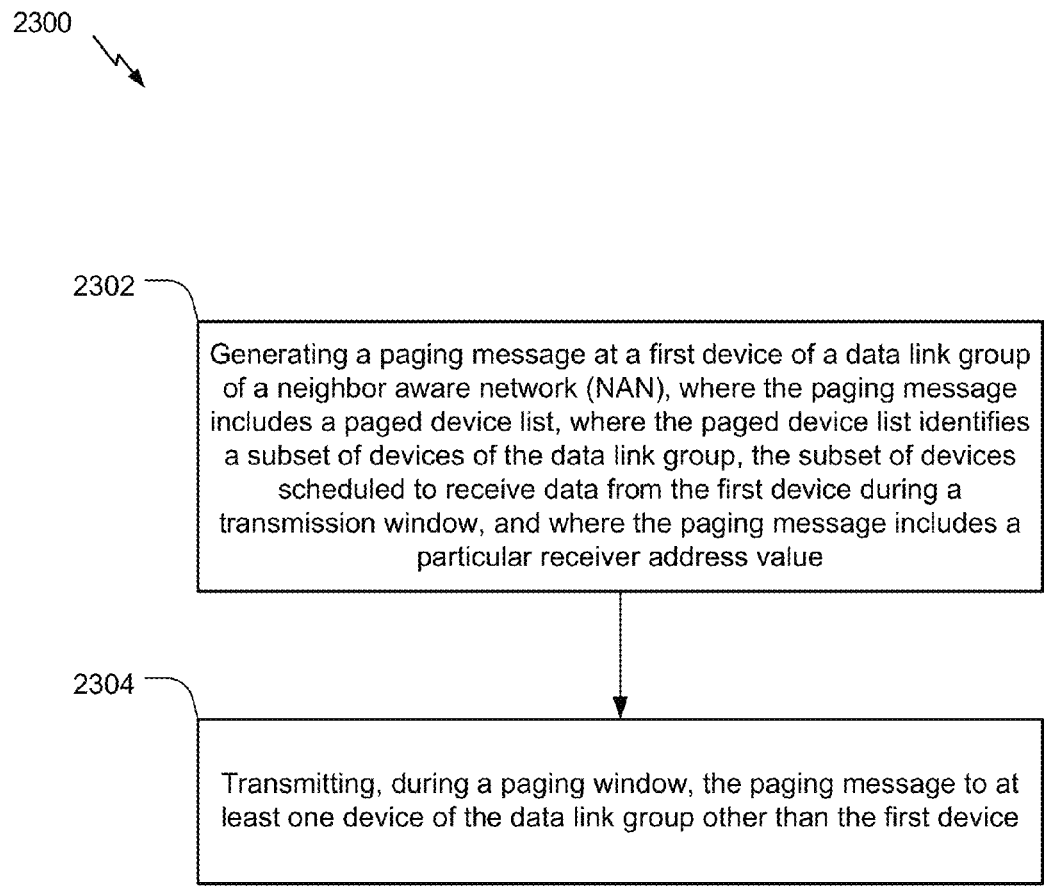
FIG. 23 is a flow diagram of another method of operation at a device of the system of FIG. 1.

Referring to FIG. 23, a particular aspect of a method of operation is shown and generally designated 2300. In a particular implementation, the method 2300 may be performed by the provider logic 130 of at least one of the devices 104, 106, 108, and 110 of the system 100 of FIG. 1. In some cases, the method 2300 may be performed when the first device 104 has data scheduled for transmission to at least one other device of the data link group of the NAN 102.

The method 2300 includes generating a paging message at a first device of a group (e.g., a data link group) of a neighbor aware network (NAN), at 2302. For example, the first device 104 (via the provider logic 130) may generate the paging message 128. The paging message includes a paged device list. The paged device list identifies a subset of devices of the group. The subset of devices is scheduled to receive data from the first device during a transmission window. The paging message includes a receiver address field having a particular receiver address value. To illustrate, the paging message 128 may include the PDL 174 that identifies a subset of devices of the data link group. The subset of devices may be scheduled to receive the data 122 from the first device 104. Additionally, the paging message 128 may include a receiver address field that has the particular receiver address value 170. In a particular implementation, the particular receiver address value is stored in a memory of the first device. For example, the particular receiver address value 170 may be stored in memories of the devices 104, 106, 108, and 110. In another particular implementation, the particular receiver address value includes a NAN cluster ID related to the NAN. For example, the particular receiver address value 170 may be the NAN cluster ID represented by the A3 field of the SDF 1100 of FIG. 11. In another particular implementation, the particular receiver address value includes a group identifier related to the group, such as a data link group identifier related to a data link group. For example, the particular receiver address value 170 may be the data link group ID field 1126. In another particular implementation, the particular receiver address value is defined by an Institute of Electrical and Electronics Engineers (IEEE) standard, a Wi-Fi Alliance standard, or both.

The method 2300 also includes transmitting, during a paging window, the paging message to at least one device of the group other than the first device. For example, the first device 104 may transmit the paging message 128 to the second device 106 and to the third device 108 during a paging window of the data link group. The paging message 128 may be transmitted if the first device 104 has data scheduled for transmission to one or more of the devices of the data link group.

In a particular implementation, the method 2300 includes receiving an acknowledgment from a second device of the group in response to sending the paging message. For example, the first device 104 may receive the ACK 180 from the second device 106 (or from the third device 108) in response to sending the paging message 128. The acknowledgment may be received after a short interframe space (SIFS) period. Additionally, the second device may be distinct from the subset of devices. For example, the first device 104 may receive the ACK 180 from the third device 108 even if the third device 108 is not included in the subset of devices indicated by the paging message 128.

In a particular implementation, the method 2300 includes receiving multiple acknowledgments from multiple devices of the group in response to sending the paging message. Additionally, the multiple acknowledgments may have the same waveform and may be received as a multipath transmission if the multiple devices generate the multiple acknowledgments based on the same scrambling seed, as described with reference to FIG. 1. Alternatively, the method 2300 may further include detecting receipt of multiple acknowledgments in response to detecting received waveform energy that exceeds a threshold. The received waveform energy is detected within a short interframe space (SIFS) period, and the multiple acknowledgments are generated based on different scrambling seeds. To illustrate, the first device 104 may monitor a wireless network during the SIFS period to detect a level of transmitted energy corresponding to multiple ACK waveforms as described with reference to FIG. 1. Upon detecting a level of transmitted energy that exceeds a threshold, the first device 104 may interpret the level of transmitted energy as indicative of receipt of multiple ACK waveforms. Detecting receipt of multiple ACKs based on the level of transmitted energy may enable the first device 104 to detect multiple ACKs even though the multiple ACKs are unable to be decoded due to interference from the multiple ACKs.

In a particular implementation, the paging message includes a management frame. In another particular implementation, the paging message includes an action frame. For example, the paging message 128 may include or correspond to a management frame or an action frame. In another particular implementation, the paging message includes a service discovery frame (SDF). For example, the paging message 128 may include or correspond to the SDF 1100 of FIG. 11.

The paging message may include a first attribute that includes the paged device list. For example, the paging message 128 may include the attribute 172 including the PDL 174 that identifies the subset of devices scheduled to receive the data 122 from the first device 104, as described with reference to FIG. 1. As another example, the SDF 1100 may include the first NAN attribute 1112 including the PDL 1150 that identifies the subset of devices scheduled to receive data. In a particular implementation, the PDL 174 (or the PDL 1150) may include a traffic indication map (TIM). In another particular implementation, the PDL 174 (or the PDL 1150) may include a Bloom filter. In another particular implementation, the PDL 174 (or the PDL 1150) may include a list of media access control (MAC) addresses.

Additionally, the method 2300 may include determining a type of traffic corresponding to the first data based on a traffic type indicator included in a paged device list control field of an attribute. For example, second set of bits 1162 of the PDL control field 1152 may include the traffic type indicator identifying a type of data corresponding to the list of devices 1154. One or more devices may determine the traffic type of data based on the second set of bits 1162 of the PDL control field 1152. The traffic type indicator may identify a quality of service (QoS) category corresponding to the first portion of the data. Additionally, the first NAN attribute 1112 may further include multiple paged device lists including the paged device list. For example, the sequence of PDLs 1130 may include multiple PDLs.

In another particular implementation, the first attribute includes a page attribute, and the page attribute includes a particular field that indicates a type of data structure that indicates the paged device list. The page attribute may include a traffic indicator identifying a type of traffic corresponding to a first portion of the data. To illustrate, the first NAN attribute 1112 may include the page attribute 1200 that includes the traffic type indicator 1212. Additionally, the paging message may include a second attribute that includes a second paged device list. The second attribute may include a second traffic type indicator identifying a type of traffic corresponding to a second portion of the data. The type of traffic corresponding to the first portion of the data may be different than the type of traffic corresponding to the second portion of the data. For example, the paging message 128 may include the second NAN attribute 1114, and the traffic type indicator 1212 of the second NAN attribute 1114 may indicate a type of data that is different than the type of data indicated by the traffic type indicator 1212 of the first NAN attribute 1112. As one example, the traffic type indicator 1212 of the first NAN attribute 1112 may indicate voice traffic, and the traffic type indicator 1212 of the second NAN attribute 1114 may indicate packet data traffic.

Additionally or alternatively, the attribute may include a page attribute. For example, the attribute 172, the first NAN attribute 1112, the second NAN attribute 1114, or a combination thereof, may include the page attribute 1120. The page attribute may include a page control field indicating a number of paged device lists included in the page attribute. For example, the page attribute 1120 may include the page control field 1128 that indicates a number of PDLs included in the page attribute 1120. Additionally or alternatively, the paged device list control field may identify a media access control (MAC) address of a particular device of the data link group if a set of bits of the page control field has a particular value. For example, if the third set of bits 1164 of the PDL control field 1152 has a particular value, the list of devices 1154 includes a MAC address of a device that has generated a new common group key (CGK) corresponding to the data link group. In another particular implementation, the first attribute may include a traffic announcement attribute, and the traffic announcement attribute may include a type length value (TLV) field that includes the paged device list. For example, the paging message 128 may include the traffic announcement attribute 1230 that includes a TLV field included in the PDL 1238.

In a particular implementation, the method 2300 includes sending a request to send (RTS) frame to a second device prior to sending the paging message. The second device is included in the subset of devices. To illustrate, the first device 104 may send the first RTS message 184 to the second device 106 prior to sending the paging message 128. Additionally, the method 2300 may include sending the paging message to the second device in response to receiving a clear to send (CTS) frame from the second device, the CTS frame received within a short interframe space (SIFS) period. For example, the first device 104 may send the paging message 128 to the second device 106 in response to receiving the first CTS message 186 from the second device 106 within the SIFS period. In a particular implementation, based on the second device transmitting the CTS frame, the paging message is a multicast message, and the paging message includes a second receiver address having a multicast address. For example, based on the second device 106 transmitting the first CTS message 186, the paging message 128 may be a multicast message and may include a second receiver address having a multicast address.

Alternatively, the method 2300 may further include sending a second RTS frame to a third device (included in the subset of devices) in response to determining that no clear to send (CTS) frame has been received from the second device. The paging message may be transmitted to the second device and to the third device in response to receiving a second CTS frame from the third device within a second SIFS period. For example, the first device 104 may send the second RTS message 188 to the third device 108 in response to determining that no CTS message has been received from the second device 106. The first device 104 may transmit the paging message 128 to the second device 106 and to the third device 108 in response to receiving the second CTS message 190 from the third device 108.

In a particular implementation, the method 2300 includes receiving a trigger frame from a second device of the group in response to sending the paging message. For example, the first device 104 may receive the trigger frame 182 from the second device 106 in response to sending the paging message 128. The second device 106 may transmit the trigger frame based on determining that the second device 106 is included in the subset of devices indicated by the paging message 128. The trigger frame may indicate that the second device 106 is scheduled to be in an active operating mode during the transmission window. Additionally, the trigger frame may be received at a beginning of a data window. For example, the trigger frame may be received during a trigger window that is at a beginning of a data window. In a particular implementation, the trigger frame may include a quality of service null (QoS_NULL) frame. In another implementation, the trigger frame may include a power save poll (PS_POLL) frame. For example, the trigger frame 182 may include or correspond to a QoS_NULL frame or a PS_POLL frame, as described with reference to FIG. 1. Additionally, the method 2300 may further include transmitting a portion of the data to the second device in response to receiving the trigger frame. For example, the first device 104 may transmit the data 122 (or a portion of the data 122 scheduled for the second device 106) to the second device 106 in response to receiving the trigger frame 182 from the second device 106.

In a particular implementation, the method 2300 includes detecting receipt of one or more availability indications from each of the one or more devices during a trigger window portion of a transmission window following a paging window portion of the transmission window. The paging message is sent during the paging window portion of the transmission window, and at least a portion of the data traffic is sent during the trigger window portion of the transmission window in response to detection of the one or more availability indications. For example, the first device 104 may detect receipt of one or more availability indications, such as trigger messages, from one or more devices including the second device 106.

Thus, FIG. 23 illustrates generating a paging message including a receiver address field that has a particular receiver address value. The particular receiver address value may enable the one or more devices to identify the received message as the paging message.

Figure 24:
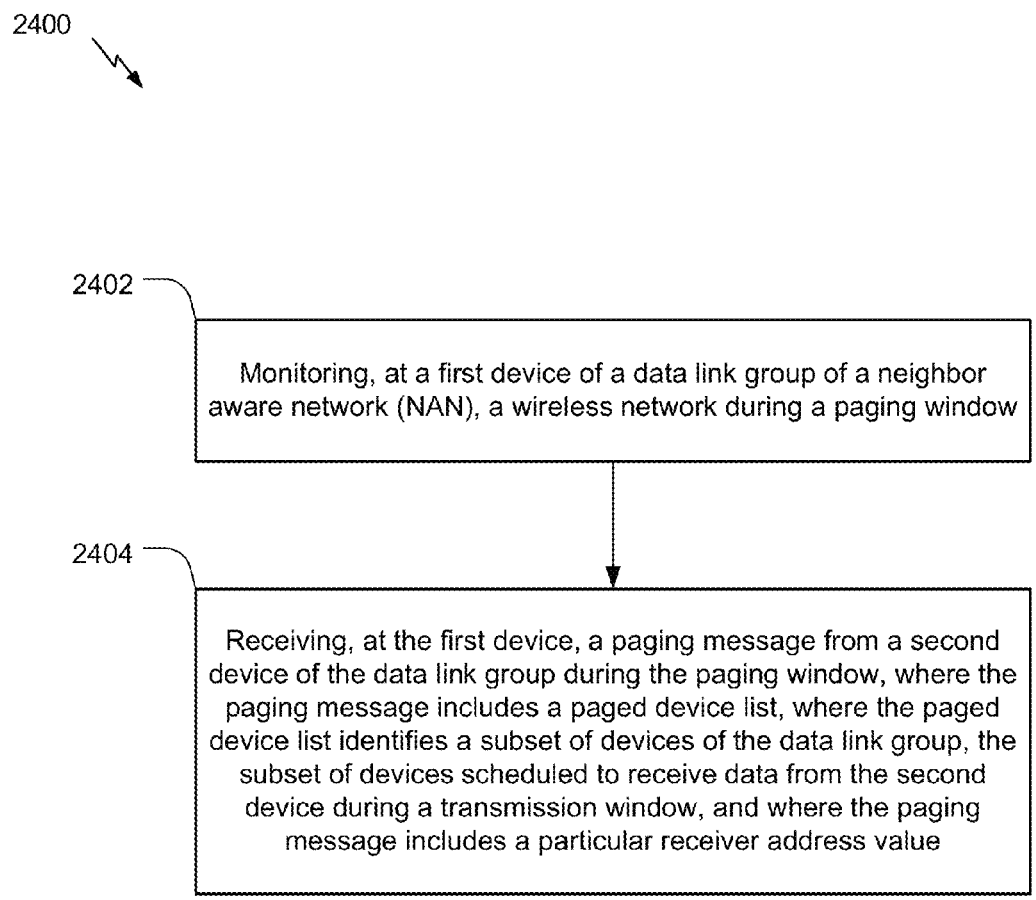
FIG. 24 is a flow diagram of another method of operation at a device of the system of FIG. 1.

Referring to FIG. 24, a particular aspect of a method of operation is shown and generally designated 2400. In a particular implementation, the method 2400 may be performed by the subscriber logic 134 of at least one of the devices 104, 106, 108, and 110 of the system 100 of FIG. 1. In some cases, the method 2400 may be performed during a paging window corresponding to the data link group of the NAN 102.

The method 2400 includes monitoring, at a first device of a data link group of a neighbor aware network (NAN), a wireless network during a paging window, at 2402. For example, the second device 106 of the data link group of the NAN 102 may monitor the data link group channel during a paging window.

The method 2400 also includes receiving, at the first device, a paging message from a second device of the data link group during the paging window, at 2404. For example, the second device 106 receives the paging message 128 from the first device 104 during the paging window. The paging message includes a paged device list. The paged device list identifies a subset of devices of the data link group. The subset of devices is scheduled to receive data from the second device during a transmission window. The paging message includes a receiver address field having a particular receiver address value. To illustrate, the paging message 128 may identify a subset of devices of the data link group as recipients of the data 122 from the first device 104 during a transmission window. The paging message 128 may include a receiver address field having the particular receiver address value 170. In a particular implementation, the particular receiver address value includes a stored value, a NAN cluster ID related to the NAN, or a data link group identifier related to the data link group. For example, the particular receiver address value 170 may be a stored value (at memories of the devices 104, 106, 108, and 110), the NAN cluster ID indicated by the A3 field of the SDF 1100, or the data link group ID field 1126 of the page attribute 1120.

In a particular implementation, the method 2400 includes processing a portion of the paging message to identify the particular receiver address value and transmitting an acknowledgment from the first device to the second device in response to identifying the particular receiver address value. For example, the second device 106 processes a portion of the paging message 128 that includes the receiver address field and, if the value of the receiver address field matches the particular receiver address value 170, the second device 106 transmits the ACK 180 to the first device 104. The third device 108 may also process the portion of the paging message 128 and transmit the ACK 180 to the first device 104. The paging message may include a service discovery frame (SDF), a management frame, or an action frame. For example, the paging message 128 may include or correspond to the SDF 1100, a management frame, or an action frame.

Additionally or alternatively, the paging message may include an attribute, and the attribute may include the paged device list. For example, the paging message 128 may include the attribute 172 that includes the PDL 174. The PDL 174 may identify the subset of devices scheduled to receive the data 122 from the first device 104. As another example, the SDF 1100 may include the first NAN attribute 1112 (and the second NAN attribute 1114) that includes the PDL 1150. The method 2400 may further include processing the paged device list to determine whether the first device is included in the subset of devices. The method 2400 may also include transmitting a trigger frame from the first device to the second device upon determining that the first device is included in the subset of devices. Additionally, the method 2400 may include transmitting the trigger frame at a beginning of a data window. For example, the trigger frame may be transmitted during a trigger window that is at a beginning of a data window.

For example, the second device 106 may continue processing the paging message 128 to identify the PDL 174 and to determine whether the second device 106 is included in the subset of devices indicated by the PDL 174. If the second device 106 is included in the subset of devices, the second device 106 transmits the trigger frame 182 to the first device 104. In a particular implementation, the trigger frame includes a quality of service null (QoS_NULL) frame, a power save poll (PS_POLL) frame, an ad-hoc traffic indication message (ATIM) frame, or another frame. For example, the trigger frame 182 may include or correspond to a QoS_NULL frame or a PS_POLL frame, as described with reference to FIG. 1.

Additionally or alternatively, the method 2400 may include determining a type of traffic corresponding to the data based on a traffic type indicator included in a paged device list control field of the attribute. For example, the second device 106 may determine a type of traffic corresponding to the data 122 based on the traffic type indicator included in the second set of bits 1162 of the PDL control field 1152 of the page attribute 1120 of FIG. 11. In at least one implementation, the trigger frame corresponds to high priority traffic. For example, a traffic type of the trigger frame 182 may correspond to high priority traffic, such as voice traffic. Additionally or alternatively, the method 2400 may further include determining whether a new common group key (CGK) corresponding to the data link group has been generated based on the first set of bits 1220 of the page control field 1208.

In particular implementation, the method 2400 further includes transmitting a multicast trigger frame from the first device to the second device and to a third device upon determining that the first device is included in the subset of devices and that the first device is included in a second subset of devices indicated by a second paging message received from the third device. For example, the second device 106 may receive the paging message 128 from the first device 104, and the second device 106 may receive a second paging message from a different device. Upon determining that the second device 106 is scheduled to receive traffic from both devices, the second device 106 may multicast the trigger frame 182 to both devices.

In a particular implementation, the second logical channel corresponds to a supplemental communication channel. The first logical channel represents a next supplemental communication channel, and an indication of the next supplemental communication channel follows the indication of the supplemental communication channel in the index of logical channels.

Thus, FIG. 24 illustrates that one or more devices may receive a message from a first device of a data link group and may determine whether the message is a paging message based on whether a receiver address has a particular receiver address value.

Figure 25:
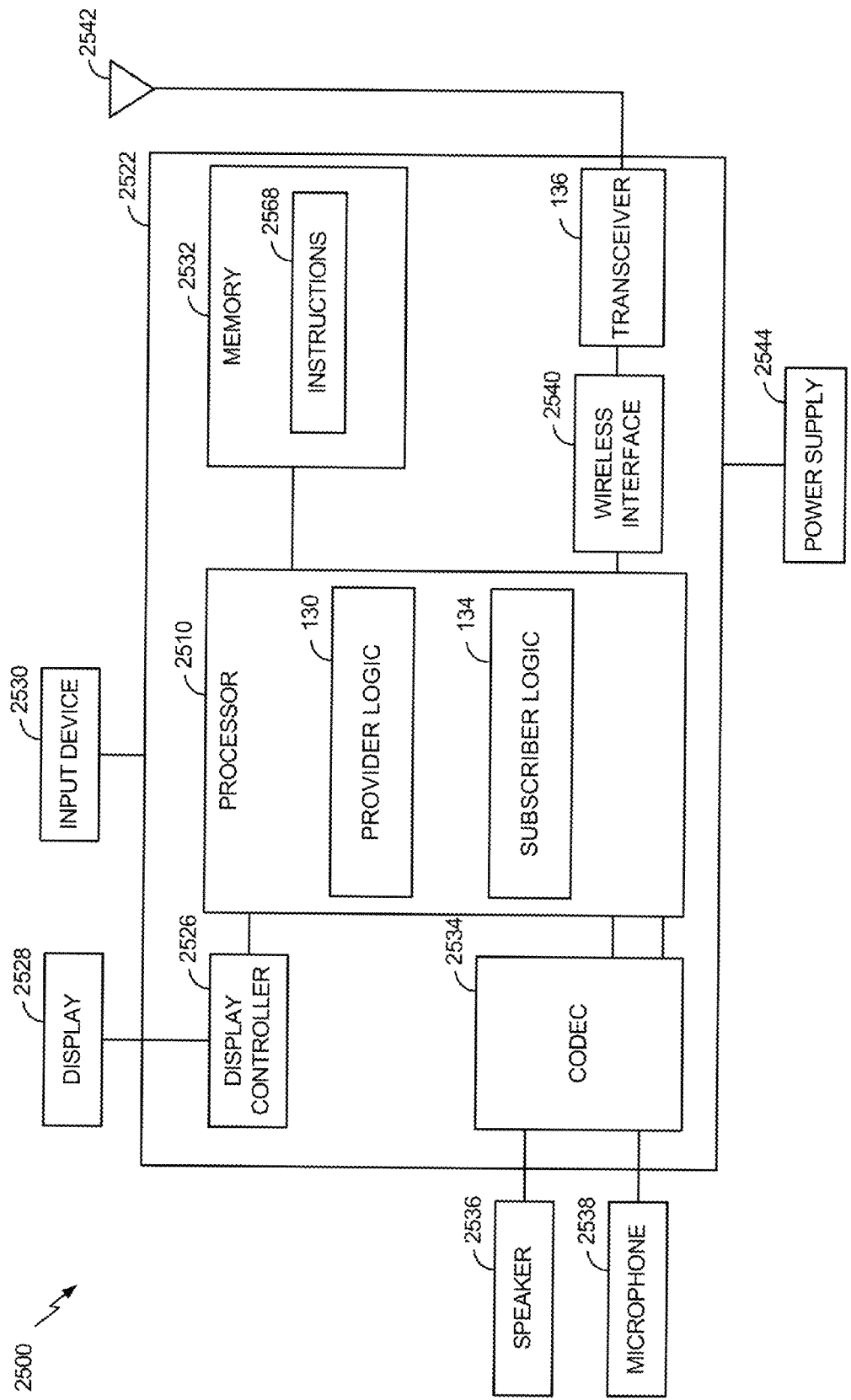
FIG. 25 is a diagram of a wireless device that is operable to support various aspects of one or more methods, systems, apparatuses, and/or computer-readable media disclosed herein.

Referring to FIG. 25, a particular illustrative aspect of a wireless communication device is depicted and generally designated 2500. The device 2500 includes a processor 2510, such as a digital signal processor, coupled to a memory 2532. In an illustrative implementation, the device 2500, or components thereof, may correspond to at least one of the devices 104, 106, 108, and 110 of FIG. 1, or components thereof. The processor 2510 may include the provider logic 130, the subscriber logic 134, or both.

The processor 2510 may be configured to execute software (e.g., a program of one or more instructions 2568) stored in the memory 2532. Additionally or alternatively, the processor 2510 may be configured to implement one or more instructions stored in a memory of a wireless interface 2540. The wireless interface 2540 may be an Institute of Electrical and Electronics Engineers (IEEE) 802.11 compliant interface. For example, the wireless interface 2540 may be configured to operate in accordance with one or more wireless communication standards, including one or more IEEE 802.11 standards and one or more NAN standards. In a particular implementation, the processor 2510 may be configured to perform one or more operations or methods described with reference to FIGS. 1-24. For example, the processor 2510 may be configured to perform operation(s) associated with the association exchange 112 of FIG. 1 (e.g., during an association phase of communication of the NAN 102). To illustrate, the processor 2510 may be configured to generate the capability information 114 and the availability information 116 of FIG. 1 and to send (or receive) the capability information 114 and the availability information 116. The processor 2510 may be further configured to generate the service advertisement 120 of FIG. 1 and to send (or receive) the service advertisement 120 via the NAN communication channel 304 of FIG. 3. The processor 2510 may be configured to receive (or send) the subscribe message 124 of FIG. 1. The processor 2510 may be configured to monitor one or more communication channels during one or more associated paging windows. The processor 2510 may be configured to send (or receive) data via one or more communication channels during one or more associated data transmission windows. The processor 2510 may be configured to refrain from monitoring one or more communication channels during one or more associated paging windows and/or data transmission windows.

The wireless interface 2540 may be coupled to the processor 2510 and to an antenna 2542. For example, the wireless interface 2540 may be coupled to the antenna 2542 via a transceiver 136, such that wireless data received via the antenna 2542 and may be provided to the processor 2510.

A coder/decoder (CODEC) 2534 may also be coupled to the processor 2510. A speaker 2536 and a microphone 2538 may be coupled to the CODEC 2534. A display controller 2526 may be coupled to the processor 2510 and to a display device 2528. In a particular implementation, the processor 2510, the display controller 2526, the memory 2532, the CODEC 2534, and the wireless interface 2540 are included in a system-in-package or system-on-chip device 2522. In a particular implementation, an input device 2530 and a power supply 2544 are coupled to the system-on-chip device 2522. Moreover, in a particular implementation, as illustrated in FIG. 25, the display device 2528, the input device 2530, the speaker 2536, the microphone 2538, the antenna 2542, and the power supply 2544 are external to the system-on-chip device 2522. However, each of the display device 2528, the input device 2530, the speaker 2536, the microphone 2538, the antenna 2542, and the power supply 2544 may be coupled to one or more components of the system-on-chip device 2522, such as one or more interfaces or controllers. In a particular implementation, the device 2500 may include at least one of a communications device, a music player, a video player, an entertainment unit, a navigation device, a personal digital assistant (PDA), a mobile device, a computer, a decoder, or a set top box.

In conjunction with the described aspects, an apparatus includes means for receiving availability information from a device during a connection set-up phase of communication of a NAN (or during a NAN discovery window), where the connection set-up phase includes an exchange of device capability information. For example, the means for receiving may include the transceiver 136, one or more other devices, circuits, modules, or instructions configured to transmit the subscribe message, or any combination thereof. The connection set-up phase may be an association phase or a negotiation phase, as non-limiting examples.

The apparatus further include means for sending data to the device during a transmission window without performing a message exchange to determine an availability of the device during the transmission window (based on the availability information indicating availability of the device during the transmission window). The apparatus may also include means for performing the message exchange (e.g., sending a polling message or receiving a trigger message) to determine the availability of the device before sending the data to the device (if the availability information does not indicate availability of the device during the data window). For example, the means for sending (and the means for receiving) may include the transceiver 136, one or more other devices, circuits, modules, or instructions configured to transmit the subscribe message, or any combination thereof.

Further, in conjunction with the described aspects, a second apparatus (a device) includes means for sending availability information to a second device during a connection set-up phase of communication of a NAN. The connection set-up phase includes an exchange of device capability information, and the availability information indicates an availability during a transmission window. For example, the means for sending and the means for receiving may include the transceiver 136, one or more other devices, circuits, modules, or instructions configured to transmit the subscribe message, or any combination thereof.

The second apparatus further includes means for receiving data from the second device during the transmission window without performing a message exchange to provide an indication of availability to the second device (based on the availability information indicating availability of the device during the transmission window). The second apparatus may also include means for performing the message exchange (e.g., means for sending a message responsive to a polling message or means for sending a trigger message) if the availability information does not indicate availability of the device during the transmission window. For example, the means for receiving (and means for sending) may include the transceiver 136, one or more other devices, circuits, modules, or instructions configured to transmit the subscribe message, or any combination thereof. The connection set-up phase may be an association phase or a negotiation phase, as non-limiting examples.

In conjunction with the described aspects, a third apparatus includes means for generating a paging message at a first device of a data link group of a neighbor aware network (NAN). For example, the means for generating may include the first device 104, the provider logic 130 of FIG. 1, the processor 2510 programmed to execute the instructions 2568, the wireless interface 2540, the provider logic 130 of FIG. 25, one or more other devices, circuits, modules, or instructions to generate the paging message, or any combination thereof. The paging message includes a paged device list. The paged device list identifies a subset of devices of the data link group. The subset of devices is scheduled to receive data from the first device during a transmission window. The paging message includes a receiver address field having a particular receiver address value.

The third apparatus also includes means for transmitting, during a paging window, the paging message to devices other than the first device. For example, the means for transmitting may include the first device 104, the transceiver 136 of FIG. 1, the transceiver 136 of FIG. 25, one or more other devices, circuits, modules, or instructions to transmit the paging message, or any combination thereof.

In conjunction with the described aspects, a fourth apparatus includes means for monitoring, at a first device of a data link group of a neighbor aware network (NAN), a wireless network during a paging window. For example, the means for monitoring may include the second device 106, the third device 108, the subscriber logic 134 of FIG. 1, the processor 2510 programmed to execute the instructions 2568, the wireless interface 2540, the subscriber logic 134 of FIG. 25, one or more other devices, circuits, modules, or instructions to monitor the wireless network during the paging window, or any combination thereof.

The fourth apparatus also includes means for receiving, at the first device, a paging message from a second device of the data link group during the paging window. For example, the means for receiving may include the second device 106, the third device 108, the transceiver 136 of FIG. 1, the transceiver 136 of FIG. 25, one or more other devices, circuits, modules, or instructions to receive the paging message, or any combination thereof. The paging message includes a paged device list. The paged device list identifies a subset of devices of the data link group. The subset of devices is scheduled to receive data from the second device during a transmission window. The paging message includes a receiver address field having a particular receiver address value.

In conjunction with the described aspects, a fifth apparatus includes means for generating, at a first device, a message including an indication of whether the first device is available during a particular time period corresponding to a data link group of a neighbor aware network (NAN) or corresponding to the NAN. For example, the means for generating may include the first device 104, the provider logic 130 of FIG. 1, the processor 2510 programmed to execute the instructions 2568, the wireless interface 2540, the provider logic 130 of FIG. 25, one or more other devices, circuits, modules, or instructions to generate the message, or any combination thereof.

The fifth apparatus also includes means for sending the message from the first device to one or more devices of the data link group. For example, the means for sending may include the first device 104, the transceiver 136 of FIG. 1, the transceiver 136 of FIG. 25, one or more other devices, circuits, modules, or instructions to send the message, or any combination thereof.

In conjunction with the described aspects, a sixth apparatus includes means for receiving, at a second device of a data link group of a neighbor aware network (NAN), a message including an indication of whether a first device corresponding to a particular service is available during a particular time period corresponding to the data link group or corresponding to the NAN. For example, the means for receiving may include the second device 106, the subscriber logic 134 of FIG. 1, the processor 2510 programmed to execute the instructions 2568, the wireless interface 2540, the subscriber logic 134 of FIG. 25, one or more other devices, circuits, modules, or instructions to receive the message, or any combination thereof.

The sixth apparatus also includes means for transitioning to a low-power operating mode during one or more transmission windows corresponding to the particular time period in response to determining that the first device is unavailable during the particular time period. For example, the means for transitioning may include the second device 106, the subscriber logic 134 of FIG. 1, the processor 2510 programmed to execute the instructions 2568, the subscriber logic 134 of FIG. 25, one or more other devices, circuits, modules, or instructions to transition to a low-power operating mode, or any combination thereof.

One or more of the disclosed aspects may be implemented in a system or an apparatus, such as the device 2500, that may include a communications device, a personal digital assistant (PDA), a mobile phone, a cellular phone, a computerized watch, a navigation device, a computer, a portable computer, a desktop computer, or any combination thereof. As other examples, the device 2500 may include a set top box, an entertainment unit, a fixed location data unit, a mobile location data unit, a monitor, a computer monitor, a television, a tuner, a system or a component that is integrated within or communicatively coupled to a vehicle, or any combination thereof. As other examples, the device 2500 may include a radio, a satellite radio, a music player, a digital music player, a portable music player, a video player, a digital video player, a digital video disc (DVD) player, a portable digital video player, or any other device that stores or retrieves data or computer instructions, or any combination thereof.

Although one or more of FIGS. 1-25 may illustrate systems, apparatuses, and/or methods according to the teachings of the disclosure, the disclosure is not limited to these illustrated systems, apparatuses, and/or methods. One or more functions or components of any of FIGS. 1-25 as illustrated or described herein may be combined with one or more other portions of another of FIGS. 1-25. Accordingly, no single implementation described herein should be construed as limiting and implementations of the disclosure described with reference to one figure may be suitably combined with implementations described with reference to other figures without departing from the teachings of the disclosure.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A method of communication comprising:
synchronizing a clock at a first device of a data link group based on a synchronization operation associated with a first wireless network corresponding to a neighbor aware network (NAN) associated with the data link group;
generating a paging message at the first device, wherein the paging message is associated with a second wireless network designated for communications that include data transmissions corresponding to the data link group, wherein the paging message includes a paged device list, wherein the paged device list identifies a subset of devices of the data link group, the subset of devices scheduled to receive data from the first device during a transmission window, and wherein the paging message includes a receiver address field having a particular value; and
transmitting, via the second wireless network during a paging window determined based on the synchronized clock, the paging message to at least one device of the data link group other than the first device.

2. The method of claim 1, further comprising sending a request to send (RTS) frame via the second wireless network to a second device prior to sending the paging message, wherein the second device is included in the subset of devices.

3. The method of claim 2, wherein the paging message is sent to the second device in response to receiving a clear to send (CTS) frame via the second wireless network from the second device, the CTS frame received within a short interframe space (SIFS) period after sending the paging message.

4. The method of claim 3, wherein, based on the second device transmitting the CTS frame, the paging message is generated as a multicast message, and wherein the paging message includes a second receiver address field having a multicast address.

5. The method of claim 2, further comprising sending a second RTS frame via the second wireless network to a third device in response to determining that no clear to send (CTS) frame has been received from the second device prior to sending the paging message, wherein the third device is included in the subset of devices, and wherein the paging message is sent to the second device and to the third device in response to receiving a second CTS frame from the third device within a second SIFS period.

6. The method of claim 1, wherein the particular value includes at least one of a NAN cluster ID associated with the NAN, a group identifier associated with the data link group, a value defined by an Institute of Electrical and Electronics Engineers (IEEE) standard, and a value defined by a Wi-Fi Alliance specification.

7. The method of claim 1, further comprising receiving an acknowledgment via the second wireless network from a second device of the data link group in response to sending the paging message, wherein the second device is distinct from the subset of devices.

8. The method of claim 1, further comprising receiving multiple acknowledgments via the second wireless network from multiple devices of the data link group in response to sending the paging message, wherein the multiple acknowledgments have the same waveform and are received as a multipath transmission if the multiple devices generate the multiple acknowledgments based on the same scrambling seed.

9. The method of claim 1, further comprising detecting receipt of multiple acknowledgments from multiple devices of the data link group in response to detecting, at the first device, received waveform energy that exceeds a threshold, wherein the received waveform energy is detected within a short interframe space (SIFS) period after sending the paging message, and wherein the multiple acknowledgments are associated with different scrambling seeds.

10. The method of claim 1, wherein the paging message includes a first attribute, the first attribute including the paged device list, and wherein the paged device list includes at least one of a traffic indication map (TIM), a Bloom filter, and a list of media access control (MAC) addresses.

11. The method of claim 10, further comprising determining a type of traffic corresponding to the data based on a traffic type indicator included in a paged device list control field of the first attribute, wherein the traffic type indicator identifies a quality of service (QoS) category corresponding to the data.

12. The method of claim 10, wherein the first attribute includes a page attribute, and wherein the page attribute includes:
a page control field indicating a number of paged device lists included in the page attribute, or
a particular field that indicates a type of data structure that indicates the paged device list and a traffic indicator identifying a type of traffic corresponding to a first portion of the data.

13. The method of claim 10, wherein the first attribute includes a traffic announcement attribute, and wherein the traffic announcement attribute includes a type length value (TLV) field that includes a representation of paged devices.

14. The method of claim 1, further comprising:
after sending the paging message, receiving trigger messages via the second wireless network from a plurality of devices of the subset of devices; and
sending acknowledgements of the trigger messages via the second wireless network to each device of the plurality of devices based on a determination that the size of a transmission window is insufficient to send an entirety of the data to each device of the plurality of devices, wherein the transmission window includes the paging window and a portion subsequent to the paging window.

15. The method of claim 1, wherein the data is generated at the first device and is associated with a service provided by the first device to devices of the data link group.

16. The method of claim 1, wherein the particular value corresponds to a non-address value that indicates to the devices of the data link group that the paging message includes paging information.

17. The method of claim 1, further comprising transmitting, via the second wireless network, at least a portion of the data to a device of the subset of devices during a portion of the transmission window that is subsequent to the paging window.

18. An apparatus comprising:
a processor; and
a memory coupled to the processor, wherein the memory stores instructions that are executable by the processor to perform operations comprising:
synchronizing a clock at a first device of a data link group based on a synchronization operation associated with a first wireless network corresponding to a neighbor aware network (NAN) associated with the data link group;
generating a paging message at the first device, wherein the paging message is associated with a second wireless network designated for communications that include data transmissions corresponding to the data link group, wherein the paging message includes a paged device list, wherein the paged device list identifies a subset of devices of the data link group, the subset of devices scheduled to receive data from the first device during a transmission window, and wherein the paging message includes a receiver address field having a particular value; and
initiating transmission, via the second wireless network during a paging window determined based on the synchronized clock, of the paging message to at least one other device of the data link group.

19. The apparatus of claim 18, wherein the paging message includes a multicast indicator.

20. The apparatus of claim 18, wherein the paging message comprises a service discovery frame (SDF) or an action frame.

21. The apparatus of claim 18 wherein the operations further comprise receiving a trigger frame via the second wireless network from a second device of the data link group, wherein the trigger frame indicates that the second device is scheduled to be in an active operating mode during the transmission window, and wherein the trigger frame is associated with a highest priority value.

22. A method of communication comprising:
synchronizing a clock at a first device of a data link group based on a synchronization operation associated with a first wireless network corresponding to a neighbor aware network (NAN) associated with the data link group;
monitoring, at the first device, a second wireless network during a paging window determined based on the synchronized clock, wherein the second wireless network is designated for communications that include data transmissions corresponding to the data link group; and
receiving, during the paging window at the first device, a paging message via the second wireless network from a second device of the data link group, wherein the paging message includes a paged device list, wherein the paged device list identifies a subset of devices of the data link group, the subset of devices scheduled to receive data from the second device during a transmission window that includes the paging window, and wherein the paging message includes a receiver address field having a particular value.

23. The method of claim 22, further comprising:
processing the paged device list included in an attribute of the paging message to determine whether the first device is included in the subset of devices; and
transmitting a trigger frame from the first device via the second wireless network to the second device upon determining that the first device is included in the subset of devices.

24. The method of claim 23, wherein the trigger frame comprises at least one of a quality of service null (QoS_NULL) frame, a power-save poll (PS_POLL) frame, and an ad-hoc traffic indication message (ATIM) frame.

25. The method of claim 23, further comprising determining a type of traffic corresponding to the data based on a traffic type indicator included in a paged device list control field of the attribute.

26. The method of claim 23, wherein a first priority corresponding to the trigger frame and a second priority corresponding to the data are the same.

27. The method of claim 22, further comprising:
receiving a second paging message via the second wireless network from a third device of the data link group, wherein the second paging message indicates a second subset of devices that is scheduled to receive second data from the third device; and
transmitting a multicast trigger frame from the first device via the second wireless network to the second device and to the third device the first device being included in the subset of devices and in the second subset of devices.

28. The method of claim 22, further comprising receiving, at the first device during a portion of the transmission window that is subsequent to the paging window, at least a portion of the data from the second device, wherein the data is associated with a service provided by the second device to devices of the data link group.

29. An apparatus comprising:
a processor; and
a memory coupled to the processor, wherein the memory stores instructions that are executable by the processor to perform operations comprising:
synchronizing a clock at a first device of a data link group based on a synchronization operation associated with a first wireless network corresponding to a neighbor aware network (NAN) associated with the data link group;
monitoring, at the first device, a second wireless network during a paging window determined based on the synchronized clock, wherein the second wireless network is designated for communications that include data transmissions corresponding to the data link group; and
receiving, at the first device, a paging message via the second wireless network from a second device of the data link group during the paging window, wherein the paging message includes a paged device list, wherein the paged device list identifies a subset of devices of the data link group, the subset of devices scheduled to receive data from the second device during a transmission window that includes the paging window, and wherein the paging message includes a receiver address field having a particular value.

30. The apparatus of claim 29, wherein the operations further comprise:
determining a contention window parameter based on the paging message; and
transmitting a trigger frame to the second device based on the contention window parameter.

* * * * *